(12) United States Patent
Ambrozy et al.

(10) Patent No.: US 8,166,906 B2
(45) Date of Patent: May 1, 2012

(54) STIMULUS INDICATING DEVICE EMPLOYING POLYMER GELS

(76) Inventors: Rel S. Ambrozy, Arlington, VA (US);
Jade Litcher, Raleigh, NC (US);
Raymond C. Jones, Leesburg, VA (US);
Chao Zhu, Denville, NJ (US); Bani H. Cipriano, Vernon, NJ (US); Srinivasa R. Raghavan, Silver Spring, MD (US)

( * ) Notice: Subject to any disclaimer, the term of this patent is extended or adjusted under 35 U.S.C. 154(b) by 17 days.

(21) Appl. No.: 11/954,520

(22) Filed: Dec. 12, 2007

(65) Prior Publication Data

US 2008/0295761 A1    Dec. 4, 2008

Related U.S. Application Data

(63) Continuation-in-part of application No. 11/580,241, filed on Oct. 13, 2006, now Pat. No. 8,077,554, and a continuation-in-part of application No. 11/486,969, filed on Jul. 14, 2006, now Pat. No. 7,940,605, application No. 11/954,520, which is a continuation-in-part of application No. 11/414,254, filed on May 1, 2006.

(60) Provisional application No. 60/874,248, filed on Dec. 12, 2006, provisional application No. 60/725,648, filed on Oct. 13, 2005, provisional application No. 60/725,649, filed on Oct. 13, 2005, provisional application No. 60/698,984, filed on Jul. 14, 2005, provisional application No. 60/675,882, filed on Apr. 29, 2005.

(51) Int. Cl.
*G01N 33/00*    (2006.01)
*G01N 25/02*    (2006.01)
*G01K 11/12*    (2006.01)

(52) U.S. Cl. ............ 116/206; 116/216; 374/106
(58) Field of Classification Search ............ 116/206, 116/207, 216, 217, 218, 219, 220; 374/106, 374/161, 162; 422/55, 56
See application file for complete search history.

(56) References Cited

U.S. PATENT DOCUMENTS

| | | | |
|---|---|---|---|
| 2,850,393 A | 9/1958 | Romito | |
| RE25,499 E * | 12/1963 | Fenity et al. | 116/201 |
| 3,615,719 A * | 10/1971 | Michel | 426/88 |
| 3,665,770 A | 5/1972 | Sagi et al. | |
| 3,695,903 A | 10/1972 | Telkes et al. | |
| 3,888,631 A | 6/1975 | Sturzinger | |
| 3,922,917 A | 12/1975 | Ayres | |
| 3,954,011 A | 5/1976 | Manske | |

(Continued)

FOREIGN PATENT DOCUMENTS

GB    1212859    11/1970
(Continued)

OTHER PUBLICATIONS

*VITSAB®: A Technical Short Course.* Available from website, 1998. Vitsab Indicator marketing information.

(Continued)

*Primary Examiner* — R. A. Smith
(74) *Attorney, Agent, or Firm* — Dewey & LeBoeuf LLP; Jeff E. Schwartz

(57) ABSTRACT

The present invention relates to a stimulus-indicating device. More particularly, the present invention relates to an apparatus for evidencing when a stimulus sensitive product has been exposed to a designated or predetermined stimulus for a certain period of time, and the invention relates to a method for manufacturing aspects of that apparatus.

22 Claims, 10 Drawing Sheets

U.S. PATENT DOCUMENTS

| | | | | |
|---|---|---|---|---|
| 3,962,920 | A | 6/1976 | Manske | |
| 3,967,579 | A | 7/1976 | Seiter | |
| 3,999,946 | A | 12/1976 | Patel et al. | |
| 4,064,827 | A | 12/1977 | Darringer et al. | |
| 4,118,370 | A | 10/1978 | Sannes et al. | |
| 4,148,748 | A | 4/1979 | Hanlon et al. | |
| 4,175,207 | A | 11/1979 | Elliott | |
| 4,280,361 | A | 7/1981 | Sala | |
| 4,327,117 | A | 4/1982 | Lenack et al. | |
| 4,439,346 | A | 3/1984 | Patel et al. | |
| 4,588,491 | A * | 5/1986 | Kreisher et al. | 204/620 |
| 4,601,588 | A | 7/1986 | Takahara et al. | |
| 4,657,409 | A | 4/1987 | Wiggin et al. | |
| 4,732,930 | A | 3/1988 | Tanaka et al. | |
| 4,737,463 | A | 4/1988 | Bhattacharjee et al. | |
| 4,812,053 | A | 3/1989 | Bhattacharjee | |
| 4,892,677 | A | 1/1990 | Preziosi et al. | |
| 4,917,503 | A | 4/1990 | Bhattacharjee | |
| 4,925,314 | A | 5/1990 | Claudy et al. | |
| 5,000,579 | A | 3/1991 | Kumada et al. | |
| 5,053,339 | A | 10/1991 | Patel | |
| 5,057,434 | A | 10/1991 | Prusik et al. | |
| 5,076,197 | A | 12/1991 | Darringer et al. | |
| 5,077,033 | A | 12/1991 | Viegas et al. | |
| 5,085,802 | A | 2/1992 | Jalinski | |
| 5,100,933 | A | 3/1992 | Tanaka et al. | |
| 5,153,036 | A * | 10/1992 | Sugisawa et al. | 428/34.1 |
| 5,198,148 | A | 3/1993 | Nakano | |
| 5,242,491 | A | 9/1993 | Mamada et al. | |
| 5,267,794 | A | 12/1993 | Holzer | |
| 5,274,018 | A | 12/1993 | Tanaka et al. | |
| 5,281,570 | A | 1/1994 | Hasegawa et al. | |
| 5,336,057 | A | 8/1994 | Fukuda et al. | |
| 5,348,813 | A * | 9/1994 | Bohmer et al. | 429/91 |
| 5,360,682 | A * | 11/1994 | Bohmer | 429/91 |
| 5,403,893 | A | 4/1995 | Tanaka et al. | |
| 5,404,834 | A | 4/1995 | Murphy | |
| RE35,068 | E | 10/1995 | Tanaka et al. | |
| 5,476,792 | A | 12/1995 | Ezrielev et al. | |
| 5,580,929 | A | 12/1996 | Tanaka et al. | |
| 5,602,804 | A | 2/1997 | Haas | |
| 5,622,137 | A | 4/1997 | Lupton, Jr. et al. | |
| 5,630,372 | A | 5/1997 | Ramsey et al. | |
| 5,633,835 | A | 5/1997 | Haas et al. | |
| 5,667,303 | A | 9/1997 | Arens et al. | |
| 5,694,806 | A * | 12/1997 | Martin et al. | 73/73 |
| 5,709,472 | A * | 1/1998 | Prusik et al. | 374/106 |
| 5,922,186 | A * | 7/1999 | Shukla et al. | 204/606 |
| 5,964,181 | A | 10/1999 | Pereyra et al. | |
| 5,997,927 | A | 12/1999 | Gics | |
| 6,030,442 | A | 2/2000 | Kabra et al. | |
| 6,143,138 | A | 11/2000 | Becker | |
| 6,180,288 | B1 | 1/2001 | Everhart et al. | |
| 6,214,623 | B1 | 4/2001 | Simons et al. | |
| 6,231,229 | B1 | 5/2001 | Halderman | |
| 6,244,208 | B1 | 6/2001 | Qiu et al. | |
| 6,295,167 | B1 * | 9/2001 | Uematsu et al. | 359/665 |
| 6,399,387 | B1 * | 6/2002 | Stenholm et al. | 436/1 |
| 6,435,128 | B2 | 8/2002 | Qiu et al. | |
| 6,472,214 | B2 * | 10/2002 | Patel | 436/2 |
| 6,570,053 | B2 | 5/2003 | Roe et al. | |
| 6,593,588 | B1 * | 7/2003 | Reimer | 250/573 |
| 6,614,728 | B2 | 9/2003 | Spevacek | |
| 6,694,913 | B2 | 2/2004 | Cooperman | |
| 6,741,523 | B1 | 5/2004 | Bommarito et al. | |
| 6,773,637 | B1 | 8/2004 | DiSalvo et al. | |
| 6,782,909 | B1 * | 8/2004 | Ragless | 137/78.3 |
| 6,863,437 | B2 | 3/2005 | Ohnishi et al. | |
| 6,863,859 | B2 | 3/2005 | Levy et al. | |
| 6,916,116 | B2 | 7/2005 | Diekmann et al. | |
| 6,968,804 | B1 * | 11/2005 | Barbieri et al. | 116/219 |
| 7,313,917 | B2 * | 1/2008 | Yeghiazarian et al. | 60/527 |
| 7,314,584 | B2 * | 1/2008 | Tsutsui et al. | 252/583 |
| 7,343,872 | B2 | 3/2008 | Taylor et al. | |
| 7,435,479 | B2 | 10/2008 | Tsutsui et al. | |
| 7,571,695 | B2 | 8/2009 | Taylor et al. | |
| 7,624,698 | B2 | 12/2009 | Taylor et al. | |
| 7,940,605 | B2 * | 5/2011 | Ambrozy et al. | 368/327 |
| 8,077,554 | B2 * | 12/2011 | Ambrozy et al. | 368/327 |
| 2002/0031841 | A1 * | 3/2002 | Asher et al. | 436/518 |
| 2002/0068019 | A1 | 6/2002 | Fujiwara et al. | |
| 2003/0053377 | A1 | 3/2003 | Spevacek | |
| 2003/0207466 | A1 | 11/2003 | Lee | |
| 2004/0171740 | A1 | 9/2004 | Ruberti et al. | |
| 2006/0262828 | A1 | 11/2006 | Ambrozy et al. | |
| 2007/0036038 | A1 * | 2/2007 | Ambrozy et al. | 368/327 |
| 2007/0195652 | A1 * | 8/2007 | Ambrozy et al. | 368/327 |
| 2009/0010803 | A1 * | 1/2009 | Ambrozy et al. | 422/58 |

FOREIGN PATENT DOCUMENTS

| | | | |
|---|---|---|---|
| GB | 2397022 | | 7/2004 |
| JP | 2004301529 A * | | 10/2004 |
| JP | 2004301530 A * | | 10/2004 |
| JP | 2005003616 A * | | 1/2005 |
| WO | WO-87/02163 | | 4/1987 |
| WO | WO 92/02005 | | 2/1992 |
| WO | WO 0129525 A1 * | | 4/2001 |
| WO | WO 2004/062699 | | 7/2004 |

OTHER PUBLICATIONS

VITSAB® *The sign of freshness. Time Temperature Indicator Tags—The Key To Consumer Involvement In Food Safety and Quality.* Telatemp. Vitsab Indicator marketing information. 1997. Accessed: Jan. 15, 1998.

*VITSAB® TTI Frequently Asked Questions.* Telatemp. Vitsab Indicator marketing information. 1997. Accessed: Oct. 17, 1998.

*TTI Indicators—The Time Has Come.* Telatemp. Vitsab Indicator marketing information. 1997. Accessed: Oct. 17, 1998.

*VITSAB® Freeze Temperature Checkers.* Vitsab Indicator marketing information. Telatemp. 1997. Accessed: Oct. 17, 1998.

*Temperature Labels.* Telatemp. Telatemp marketing information. 1993. Accessed: Oct. 17, 1998.

LifeLines Indicator Marketing information. LifeLines Technology. Oct. 17, 1998.

*Hallcrest: Leading the Way in Temperature-Indicating Technology.* Hallcrest, Inc. Hallcrest Indicator Marketing information. 1997. Accessed: Oct. 17, 1998.

*3M Monitor Mark: High Temperature and Customer Activated Threshold Indicators.* 3M. 3M Indicator Marketing information. 1997. Accessed: Oct. 17, 1998.

*Tempil Temperature Indicators.* Tempil, Inc. Tempil Indicator Marketing information. 1996.

*Measure-Tech Australia: Innovations in Measuring Technology.* Measure-Tech Indicator Marketing information. Measure-Tech Australia Pty Ltd. 1997. Accessed: Oct. 17, 1998.

TempTales3®. Sensitech, Inc. TempTales Indicator Marketing information. 1996-1997. Accessed: Oct. 17, 1998.

*IceWatch.* IceWatch Indicator Marketing information. Timeticket. 1997. Accessed: Oct. 17, 1998.

Marianne E. Harmon, Mary Tang, Curtis W. Frank; A Microfludic Actuator Based On Thermoresponsive Hydrogels; Polymer; vol. 44 (2003) 4547-4556; Elsevier Science Inc.; USA.

Stevin H. Gehrke, Julie Robeson; James Fred Johnson, and Nitin Vaid; Protein Isolation by Solution-Controlled Gel Sorption; Biotechnol. Prog.; vol. 7; No. 4 (1991); 355-358; American Chemical Society and American institute of Chemical Engineers; USA.

Bhagwati G. Kabra, Stevin H. Gehrke, and Richard J. Spontak; Microporous, Responsive Hydroxypropyl Cellulose Gels 1. Synthesis and Microstructure; Macromolecules; vol. 31; No. 7; (1998); 2166-2173; American Chemical Society; USA.

Seiji Katayama; Chemical Condition Responsible for Thermoswelling or Thermoshrinking Type of Volume Phase Transition in Gels—Effect of Relative Amounts of Hydrophobic to Hydrophilic Groups in the Side Chain; Journal Physical Chemistry; vol. 96; No. 13 (1992); 5209-5210; American Chemical Society; USA.

M.R. Guilherme, R. Silva, E.M. Girotto, A.F. Rubira, E.C.Muniz; Hydrogels Based On PAAm Network With PNIPAAm Included: Hydrophilic—Hydrophobic Transition Measured By The Partition of Orange II and Methylene Blue In Water; Polymer; 44 (2003); 4213-4219; Elsevier Science Ltd.

Tae Gwan Park, Allan S. Hoffman; Sodium Chloride-Induced Phase Transition in Nonionic Poly(N-isopropylacrylamide) Gel; Macromolecules vol. 26; No. 19; (1993); 5045-5048; American Chemical Society; USA.
Yoshitsugu Hirokawa and Toyoichi Tanaka; Volume Phase Transition In A Nonionic Gel; Journal Chemical Physics; vol. 81, No. 12, Pt. 11; (1984); 6379-6380; American Institute of Physics; USA.
Toyoichi Tanaka; Gels; Scientific American; vol. 244; No. 1; (1981); pp. 124-138; USA.
Shunsuke Hirotsu, Yoshitsugu Hirokawa, and Toyoichi Tanaka; Volume-Phase Transitions of Ionized N-isopropylacrylamide Gels; Journal of Chemical Physics; vol. 87, No. 2 (1987); 1392-1395; The American Institute of Physics; USA.
Akira Mamda, Toyoichi Tanaka, Dawan Kungwatchakun, and Masahiro Irie; Photoinduced Phase Transition of Gels; Macromolecules; vol. 23; No. 5 (1990); 1517-1519; American Chemical Society; USA.
Etsuo Kokufuta and Toyoichi Tanaka; Biochemically Controlled Thermal Phase Transition Gels; Macromolecules; vol. 24; No.7 (1991); 1605-1607; American Chemical Society; USA.
Yanhie Zhang, Steven Furyk, David E. Bergbreiter and Paul S. Cremer; Specific Ion Effects On The Water Solubility Of Macromolecules: PNIPPAm And Hofmeister Series; Journal Of The American Chemical Society; vol. 127; No. 41; (2005); pp. 14505-14510; USA.
Franck Ilmain, Toyoichi Tanaka & Etsuo Kokufuta; Volume Transition In A Gel Driven By Hydrogen Bonding; Nature; vol. 349; (Jan. 1991); 400-401; USA.
Toyoichi Tanaka, David Fillmore, Shao-Tang Sun, Izumi Nishio, Gerald Swislow and Arati Shah; Phase Transitions in Ionic Gels; Physical Review Letters; vol. 45, No. 20; (1980); 1636-1639; The American Physical Society; USA.
Toyoichi Tanaka, David J. Filmore; Kinetics Of Swelling Of Gels; Journal Of Chemical Physics; vol. 70; No. 3; (1979); pp. 1214-1218; American Institute of Physics; USA.
PCT/US06/16521 International Search Report, Jan. 30, 2007.
PCT/US06/27564 International Search Report, Apr. 27, 2007.
PCT/US06/39874 International Search Report, Sep. 13, 2007.
Abandoned U.S. Appl. No. 08/636,133; filed Apr. 22, 1996; first named inventor was Litcher (application not included).
Information Disclosure Statement For U.S. Appl. No. 08/636,133 dated Jun. 16, 1997.
Notice of References Cited For U.S. Appl. No. 08/636,133 dated Jun. 16, 1997.
Information Disclosure Statement For U.S. Appl. No. 08/636,133 dated Aug. 2, 1999.
Notice of References Cited for U.S. Appl. No. 08/636,133 dated Aug. 22, 1999.
Office Action For U.S. Appl. No. 11/486,969-Mailed Apr. 5, 2007.
Oct. 5, 2007 Reply To Office Action For U.S. Appl. No. 11/486,969.
PCT/US07/87080 International Search Report Jun. 26, 2008.
PCT/US08/55880 International Search Report Aug. 29, 2008.
Office Action for U.S. Appl. No. 11/580,241 (Mailed Mar. 5, 2008).
Reply to OA for U.S. Appl. No. 11/580,241 (Mailed Sep. 4, 2008).
Office Action for U.S. Appl. No. 11/580,241 (Mailed Nov. 19, 2009).
Reply to OA for U.S. Appl. No. 11/580,241 (Mailed Apr. 19, 2010).
Office Action for U.S. Appl. No. 11/414,254 (Mailed Apr. 28, 2009).
Reply to OA for U.S. Appl. No. 11/414,254 (Mailed Oct. 28, 2008).
Office Action for U.S. Appl. No. 11/414,254 (Mailed Feb. 2, 2010).
Declaration of Bruce Hounsell, submitted in U.S. Appl. No. 11/486,969 (Mailed Jun. 20, 2008).
Amendment/Reply to Office Action for U.S. Appl. No. 11/414,254 (Mailed Jul. 2, 2010).
Amendment/Reply to Office Action for U.S. Appl. No. 11/486,969 (Mailed Jul. 19, 2010).
Office Action for U.S. Appl. No. 12/042,528 (Mailed Aug. 6, 2010).
Notice of Allowance for U.S. Appl. No. 11/486,969 (Mailed Dec. 29, 2010).
Notice of Allowance for U.S. Appl. No. 11/580,241 (Mailed Jan. 4, 2011).
Letter Requesting Acknowledgement of Previously Filed Amendments and Request for Issuance of Supplemental Notice of Allowability for U.S. Appl. No. 11/580,241 (Mailed Jan. 10, 2011).
Notice of Non-Compliant Amendment for U.S. Appl. No. 11/414,254 (Mailed Jul. 6, 2010).
Response to Notice of Non-Compliant Amendment for U.S. Appl. No. 11/414,254, filed Jul. 27, 2010).
Response to Rule 312 Communication for U.S. Appl. No. 11/580,241 (mailed Jan. 19, 2011).
Supplemental Amendment filed with RCE for U.S. Appl. No. 11/580,241, filed Apr. 1, 2011).
Notice of Allowance for U.S. Appl. No. 11/580,241 (Mailed Apr. 11, 2011).
Notice of Allowance for U.S. Appl. No. 11/580,241 (Mailed Jul. 19, 2011).
Amendment/Reply to Office Action for U.S. Appl. No. 12/042,528, filed Feb. 7, 2011).
Final Office Action for U.S. Appl. No. 12/042,528 (Mailed Apr. 13, 2011).

* cited by examiner

STIMULUS INDICATING DEVICE EMPLOYING POLYMER GELS

RELATED APPLICATIONS

This application claims the benefit under 35 U.S.C. §119, of U.S. provisional patent application Ser. No. 60/874,248, filed Dec. 12, 2006, entitled "Stimulus Indicating Device Employing Polymer Gels" which is hereby incorporated by reference in its entirety; and this application is a continuation-in-part and claims the benefit under 35 U.S.C. §120, of U.S. patent application Ser. No. 11/580,241 filed Oct. 13, 2006 now U.S. Pat. No. 8,007, 554, entitled "Stimulus Indicating Device Employing Polymer Gels" which is related to and claims the benefit under 35 U.S.C. §119 of both U.S. provisional patent application Ser. No. 60/725,648, and U.S. provisional patent application Ser. No. 60/725,649, both filed Oct. 13, 2005, which are all hereby incorporated by reference in their entirety; and this application is a continuation-in-part, and claims the benefit under 35 U.S.C. §120, of U.S. patent application Ser. No. 11/486,969, filed Jul. 14, 2006 now U.S. Pat. No. 7,940, 605, entitled "Stimulus Indicating Device Employing Polymer Gels" which is related to and claims the benefit under 35 U.S.C. §119, of U.S. provisional patent application Ser. No. 60/698,984, filed Jul. 14, 2005, which are all hereby incorporated by reference in their entirety; and this application is a continuation-in-part, and claims the benefit under 35 U.S.C. §120, of U.S. patent application Ser. No. 11/414,254, filed May 1, 2006, entitled "Stimulus Indication Employing Polymer Gels," which is related to and claims the benefit under 35 U.S.C. §119, of U.S. provisional patent application No. 60/675,882, filed Apr. 29, 2005, which are all hereby incorporated by reference in their entirety.

FIELD OF THE INVENTION

The present invention relates to a stimulus-indicating device. More particularly, the present invention relates to an apparatus for evidencing when a stimulus sensitive product has been exposed to a designated or predetermined stimulus for a certain period of time, and the invention relates to a method for manufacturing aspects of that apparatus.

RELATED PRIOR ART

It is well known in the art that the useful life of a perishable product is a function of its cumulative exposure to a harmful stimulus over a period of time. The types of stimuli that advance the degradation of stimulus-sensitive products over time include not only temperature, but also light, pH, humidity, electromagnetic radiation, visible light, radiation, solvent composition, ionic strength, etc.

The useful life of a temperature sensitive product is a function of its cumulative time-temperature exposure—a combination of the temperature to which a product is exposed and the duration of the exposure. For stimulus sensitive products, degradation generally occurs faster at a higher stimulus (i.e., temperature) than at lower stimulus (i.e., temperature). For example, often a temperature-perishable product will typically have a longer useful life if it is exposed to lower temperatures than if it is exposed to higher temperatures. In particular, pre-packaged chicken will spoil if it is exposed to a temperature of 40-41° F. or above for an extended period of time. However, exposure to high temperatures is not always the cause of the problem because certain stimulus sensitive products will degrade sooner at a lower stimulus (especially freezing temperatures) than at a higher stimulus. For example, a malaria vaccine will degrade faster below 2° C. than if stored in the range of 3° C. to 7° C. Thus the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines. Many manufacturers mark their products with printed expiration dates in an attempt to provide an indication of when the useful life of a perishable product lapses. These dates, however, are only estimates and may be unreliable because they are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. The manufacturer cannot always predict or control, however, the stimulus exposure of a product through each step of the supply chain that delivers the product to the consumer. If the product is actually exposed to stimulus higher than those on which the expiration date is based, the perishable product may degrade or spoil before the printed expiration date. When this happens, the expiration date may mislead the consumer into believing that the perishable product is still usable when, in fact, its useful life has lapsed.

Marking a stimulus sensitive product with an expiration date is useful nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, many of these time-temperature indicators require the active agents to be kept separate from one another until the indicator is attached to the product it is monitoring. If the active ingredients are not kept separate they will begin to interact prematurely, thereby giving a premature indication of spoilage. As a result, these types of indicators require manual activation, but manual activation is not always feasible when the indicator is being used with a product that is mass-produced in high-volume.

It is also well known that certain polymer gels reversibly swell and contract (i.e., expand and shrink) when exposed to predetermined stimuli. Such gels are known as stimulus sensitive gels or are known as stimulus reactive gels. However, this phase transition is fully reversible and, a stimulus sensitive gel that has undergone its phase transition upon exposure to a predetermined stimulus (by way of example only, the stimulus sensitive gel collapsed or shrank upon exposure to a stimulus extreme, such as temperature, or the stimulus sensitive gel expanded or swelled upon exposure to a stimulus extreme) will return to its original volume if the predetermined stimulus is removed. Accordingly, it is necessary to develop indicating devices with irreversibility built into the stimulus-sensitive or stimulus-indicating or stimulus-reactive operation of the indicator. Such irreversibility would provide a permanent indication of exposure to a predetermined stimulus, regardless of whether the predetermined stimulus is later removed and the stimulus sensitive gel returns to its original form when the predetermined stimulus is removed.

There is also a need for an indicator that indicates when a stimulus sensitive product has been exposed to a deleterious stimulus extreme (i.e., a predetermined stimulus) for a predetermined amount of time. There is also a need for a stimulus indicator that does not contain active agents that will begin to interact prior to being attached to the product being monitored, thereby resulting in false indications of spoilage.

SUMMARY OF THE INVENTION

The present invention is directed to a stimulus indicator device, which substantially overcomes one or more of the above-mentioned problems arising from limitations and disadvantages of the related art.

Single Compartment

To achieve these and other advantages and in accordance with the purpose of the invention, as embodied and broadly described, and as shown in FIG. 1A and FIG. 1B, the preferred embodiment of the invention is a single compartment device, with the single compartment containing a stimulus sensitive gel and a color changing absorbent material. Prior to exposure of the stimulus indicating device to a predetermined stimulus, the color changing absorbent material is a first color, visible through the indicator window or display portion.

The single compartment of the preferred embodiment is formed by the backing layer on the bottom of the device and an upper layer on the top of the stimulus indicating device. The top layer of the stimulus indicating device is formed by at least the indicator window and the top portion of the top layer. Both the backing layer and the upper layer should be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the compartment, although variations in these dimensions are within the scope of the present invention. The upper layer can preferably be made of a clear material, such as plastic, so that the user of the stimulus indicating device can view at least some portion of the backing material or color changing absorbent material. The upper layer can also be able to accept paint or ink so as to allow for coloring or concealing at least some portion of the first compartment.

Although at least some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled. Along with this liquid, at least some of the constituent parts required for detection of unfavorable stimulus exposure, which are incorporated into the polymer network during the initial preparation, will be expelled as well.

By way of example only, the color changing absorbent material could be divalent cation test paper, litmus paper or any equivalent color changing absorbent material. What is important is that the color changing absorbent material has: 1) an affinity for the liquid and constituent parts contained in, and then expelled from, the stimulus sensitive gel; and 2) that at least a portion of the color changing absorbent material changes color upon coming into contact with the expelled liquid and/or constituent parts. More specifically, at least some of the constituent parts carried by the expelled liquid permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts remain bound or trapped in the color changing absorbent material.

By way of example only, the constituent parts contained in the polymer matrix of the swollen stimulus sensitive gel, and then expelled along with and carried by the expelled liquid until both come into contact with the color changing absorbent material, could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel.

Then, when the expelled constituent parts (e.g., divalent cations (by way of example only, $Mg^{2+}$ or $Ca^{2+}$)) carried by the expelled liquid came into contact with the color changing absorbent material, at least a portion of the color changing absorbent material would not only change from a first color to a second color, but the constituent parts would permanently bind to the color changing absorbent material. It is important that the color changing absorbent material be reactive to the expelled constituent parts. Thus, because the constituent parts in the preferred embodiment preferably consist of divalent cations, the color changing absorbent material must be reactive to those divalent cations, and can include by way of example only, divalent cationic paper. Examples of such divalent cationic paper that can be used as the color changing absorbent material includes a total-hardness indicator paper or test stick that is available from Sigma-Aldrich under the tradename QUANTOFIX®, is manufactured by Macherey-Nagel under the trade name Aquadure, and that changes color from blue to red upon coming into contact with expelled liquid containing the constituent parts (by way of example only, $Mg^{2+}$ or $Ca^{2+}$). Preferably the color changing absorbent material operates in at least a semi-quantitative capacity.

By the expelled constituent parts (e.g., divalent cations (by way of example only, Mg2+ or Ca2+)) permanently binding to the color changing absorbent material (e.g., by way of example only, divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent material or cationic paper, and the color changing absorbent material (by way of example only cationic paper) would remain permanently colored the second color.

Although the preferred embodiment discussed herein employs divalent cation test paper as the color changing absorbent material, alternative color changing absorbent materials could also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid would not only be expelled from the swollen stimulus sensitive gel, but the $H^+$ would also be expelled along with that liquid. Then when the expelled constituent parts (by way of example only, $H^+$) contained in the expelled liquid subsequently come into physical contact with the color changing absorbent material, such as litmus paper (by way of example only, $H^+$ concentration indicator), at least a portion of the color changing absorbent material could react to the expelled constituent parts (by way of example only, $H^+$), and change from a first color to a second color. Such litmus paper that is suitable for use as a color changing absorbent material could include by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) would permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) would remain permanently bound to the color changing absorbent material, and the color changing absorbent material would permanently remain colored the second color.

Preferably the stimulus sensitive gel is attached at an attachment point that is preferably located opposite the location of the indicator window. In this way, the stimulus sensitive gel is secured to one location and cannot float or move within the first compartment and cover up the color changing absorbent material at any time. In addition, if the color changing absorbent material is capable of wicking the liquid and constituent parts out of the polymer matrix of the swollen stimulus sensitive gel simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or protons) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not.

More than One Compartment with Neck

To achieve these and other advantages and in accordance with the purpose of the invention, as embodied and broadly described, another embodiment of the invention could be as shown in FIG. 2A and FIG. 2B and FIG. 2C, a multi-compartment device that includes a first compartment with an indicator window through which a color changing absorbent material is visible, and at least a second compartment containing a stimulus sensitive gel. The first compartment and the second compartment are formed by the backing layer on the bottom of the stimulus indicating device and an upper layer on the top of the stimulus indicating device, as shown in FIG. 2A and FIG. 2B and FIG. 2C. The first compartment and the second compartment are additionally formed and differentiated from one another by a nozzle portion, a neck portion, a constricting portion, or any combination thereof. Thus, the first compartment and the second compartment could be formed in the shape of an hour-glass wherein the two compartments are connected by the constricting region or neck portion, as shown in FIG. 2D, or the shape of two squares or rectangles connected by the constricting region or neck portion formed as a channel as shown in FIG. 2A. Other shapes are contemplated within the scope of the invention. Prior to exposure to a predetermined stimulus, in this embodiment a stimulus sensitive gel is preferably contained in just the second compartment. And prior to exposure of the stimulus indicating device to a predetermined stimulus, the color changing absorbent material is a first color, visible through the indicator window or display portion.

Both the backing layer and the upper layer should be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the first compartment, although variations in these dimensions are within the scope of the present invention. The upper layer can preferably be made of a clear material, such as plastic, so that the user of the stimulus indicating device can view at least some portion of the backing material or color changing absorbent material. The upper layer can also be able to accept paint or ink so as to allow for coloring or concealing at least some portion of the first compartment.

Although some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, will be expelled as well.

By way of example only, the color changing absorbent material could be divalent cation test paper, litmus paper or any equivalent color changing absorbent material. What is important is that the color changing absorbent material has: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts remain bound or trapped in the color changing absorbent material.

By way of example only, the constituent parts contained in the polymer matrix of the swollen stimulus sensitive gel, and then expelled along with and carried by the expelled liquid through the neck portion until both come into contact with the color changing absorbent material, could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel. Then as the expelled constituent parts (e.g., divalent cations (by way of example only, $Mg^{2+}$ or $Ca^{2+}$)) carried by the expelled liquid came into contact with the color changing absorbent material, at least a portion of the color changing absorbent material would not only change from a first color to a second color, but the constituent parts would permanently bind to the color changing absorbent material. It is important that the color changing absorbent material be reactive to the expelled constituent parts. Thus, because the constituent parts in the preferred embodiment preferably consist of divalent cations, the color changing absorbent material must be reactive to those divalent cations, and can include by way of example only, divalent cationic paper. Examples of such divalent cationic paper that can be used as the color changing absorbent material includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid containing the constituent parts (by way of example only, $Mg^{2+}$ or $Ca^{2+}$). Preferably the color changing absorbent material operates in at least a semi-quantitative capacity.

By the expelled constituent parts (e.g., divalent cations (by way of example only, Mg2+ or Ca2+)) permanently binding to the color changing absorbent material (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent material or cationic paper, and the color changing absorbent material or cationic paper would remain permanently colored the second color.

Although this alternative embodiment with a neck portion discussed herein employs a divalent cation test paper as the color changing absorbent material, alternative color changing absorbent materials could also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid would not only be expelled from the swollen stimulus sensitive gel, but $H^+$ would also be expelled along with that liquid. Then when the expelled constituent parts (by way of example only, $H^+$) contained in the expelled liquid subsequently comes into physical contact with the color changing absorbent material, such as litmus paper (by way of example only, a $H^+$ concentration indicator), at least a portion of the color changing absorbent material would react to the expelled constituent parts (by way of example only, $H^+$), and change from a first color to a second color. Such litmus paper that is suitable for use as a color changing absorbent material includes by way of example only, the pH-indicator strips manufactured by EMD Chemicals Inc. What is important is that the litmus paper changes from a first color to a second color upon coming into contact with the expelled constituent parts.

In addition to changing from a first color to a second color, the expelled constituent parts (by way of example only, $H^+$) would permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) would remain permanently bound to the color changing absorbent material, and the color changing absorbent material would permanently remain colored the second color.

Moreover, because the constricting portion keeps the stimulus sensitive gel in the second compartment, the stimulus sensitive gel preferably does not move into the first compartment at any time, and is thereby prevented from covering up the color changing absorbent material at all times. Preferably, the stimulus sensitive gel would also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the neck portion keeps the keeps the stimulus sensitive gel and the color changing absorbent material physically separated, such false indications are avoided.

As an alternative to this embodiment, the swollen stimulus sensitive gel could initially be placed in the first compartment with the color changing absorbent material, although preferably not touching the color changing absorbent material, and the swollen stimulus sensitive gel would be attached to an attachment point in the second compartment. Then when the swollen stimulus sensitive gel was exposed to the predetermined stimulus, the swollen stimulus sensitive gel would expel liquid and constituent parts directly into the first compartment, thereby allowing the expelled constituent parts to come into contact with the color changing absorbent material much easier than if they had only been expelled in the second compartment. Because the color changing absorbent material would preferably be attached to the attachment point in the second compartment, it would retreat from and preferably exit the first compartment as it collapsed or shrank.

More than One Compartment with Permeable Membrane

To achieve these and other advantages and in accordance with the purpose of the invention, as embodied and broadly described, another embodiment of the invention could be as shown in FIG. 3A and FIG. 3B, a multi-compartment device that includes a first compartment with an indicator window through which a color changing absorbent material is visible, and at least a second compartment containing a stimulus sensitive gel. The first compartment and the second compartment are formed by the backing layer on the bottom of the stimulus indicating device and an upper layer on the top of the stimulus indicating device, as shown in FIG. 3A and FIG. 3B. The first compartment and the second compartment are additionally formed and differentiated from one another by a permeable membrane that is strong and resilient to twisting, bending and breaking. Alternately, as shown in FIG. 3C an alternate embodiment could position the first compartment above the second compartment separated by the permeable membrane. Other shapes are contemplated within the scope of the invention as previously described in prior applications or as understood by one of ordinary skill in the art.

Prior to exposure to a predetermined stimulus, in this embodiment a stimulus sensitive gel is preferably contained in just the second compartment. And prior to exposure of the stimulus indicating device to the predetermined stimulus the color changing absorbent material is a first color, visible through the indicator window or display portion.

Both the backing layer and the upper layer should be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the first compartment, although variations in these dimensions are within the scope of the present invention. The upper layer can preferably be made of a clear material, such as plastic, so that the user of the stimulus indicating device can view at least some portion of the backing material or color changing absorbent material. The upper layer can also be able to accept paint or ink so as to allow for coloring or concealing at least some portion of the first compartment.

Although some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, will be expelled as well.

By way of example only, the color changing absorbent material could be divalent cation test paper, litmus paper or any equivalent color changing absorbent material. What is important is that the color changing absorbent material has: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts remain bound or trapped in the color changing absorbent material.

By way of example only, the constituent parts contained in the polymer matrix of the swollen stimulus sensitive gel, and then expelled along with and carried by the expelled liquid through the permeable membrane until both come into contact with the color changing absorbent material, could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel.

Then as the expelled constituent parts (e.g., divalent cations (by way of example only, $Mg^{2+}$ or $Ca^{2+}$)) carried by the expelled liquid came into contact with the color changing absorbent material, at least a portion of the color changing absorbent material would not only change from a first color to a second color, but the constituent parts would permanently bind to the color changing absorbent material. It is important that the color changing absorbent material be reactive to the expelled constituent parts. Thus, because the constituent parts in the preferred embodiment preferably consist of divalent cations, the color changing absorbent material must be reactive to those divalent cations, and can include by way of example only, divalent cationic paper. Examples of such divalent cationic paper that can be used as the color changing absorbent material includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid containing the constituent parts (by way of example only, $Mg^{2+}$ or $Ca^{2+}$). Preferably the color changing absorbent material operates in at least a semi-quantitative capacity.

By the expelled constituent parts (e.g., divalent cations (by way of example only, $Mg2+$ or $Ca2+$)) permanently binding to the color changing absorbent material (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent material or cationic paper, and the color changing absorbent material or cationic paper would remain permanently colored the second color.

Although this alternative embodiment with a permeable membrane discussed herein employs a divalent cation test paper as the color changing absorbent material, alternative color changing absorbent materials could also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid would not only be expelled from the swollen stimulus sensitive gel, but $H^+$ would also be expelled along with that liquid. Then when the expelled constituent parts (by way of example only, $H^+$) contained in the expelled liquid subsequently comes into physical contact with the color changing absorbent material, such as litmus paper (by way of example only, $H^+$ concentration indicator), at least a portion of the color changing absorbent material would react to the expelled constituent parts (by way of example only, $H+$), and change from a first color to a second color. Such litmus paper that is suitable for use as a color changing absorbent material includes by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) would permanently bind to the color changing absorbent material. Accordingly, even if the expelled liquid were ultimately reabsorbed by the collapsed or shrunken stimulus sensitive gel so as to become a partially or fully re-swollen stimulus sensitive gel, the expelled constituent parts (by way of example only, $H^+$) would remain permanently bound to the color changing absorbent material, and the color changing absorbent material would permanently remain colored the second color.

Moreover, because the permeable membrane keeps the stimulus sensitive gel in the second compartment, the stimulus sensitive gel preferably does not move into the first compartment at any time, and is thereby prevented from covering up the color changing absorbent material at all times. Preferably, the stimulus sensitive gel would also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the permeable membrane keeps the stimulus sensitive gel and the color changing absorbent material physically separated, such false indications are avoided.

It should be noted that by manipulating the permeability of the permeable membrane connecting the first compartment to the second compartment the time required for the expelled liquid to move from the second compartment into the first compartment can be varied. Such manipulation of the permeable membrane includes increasing or decreasing its thickness and/or increasing or decreasing its surface area facing the first compartment and/or second compartment and/or increasing or decreasing its wicking ability, so as to control the speed at which the expelled liquid and the constituent parts travel from the second compartment, through the permeable membrane, and enter the first compartment.

An advantage of using such an embodiment is that both the exposure to a predetermined stimulus as well as the time of exposure can be indicated. As an example, if the predetermined stimulus occurs for just a short period of time, and is removed before the expelled liquid and constituent parts have completely moved from the second compartment through the permeable membrane and into the first compartment, then the expelled liquid and constituent parts will be wicked or drawn back into the second compartment by the shrunken stimulus sensitive gel as the shrunken stimulus sensitive gel re-expands. The reason this happens is because the permeable membrane allows the expelled liquid and expelled constituent parts to pass in both directions. And so in this case, no irreversible indication of exposure to the predetermined stimulus will be indicated by color changing absorbent material because the time of exposure to the predetermined stimulus was too brief to enable enough expelled liquid and constituent parts to pass completely through the permeable membrane, react with the color changing absorbent material, and cause it to change from a first color to a second color.

More than One Compartment with Semi-Permeable Membrane

To achieve these and other advantages and in accordance with the purpose of the invention, as embodied and broadly described, another embodiment of the invention could be as shown in FIG. 4A and FIG. 4B, a multi-compartment device that includes a first compartment with an indicator window through which a color changing absorbent material is visible, and at least a second compartment containing a stimulus sensitive gel. The first compartment and the second compartment are formed by the backing layer on the bottom of the stimulus indicating device and an upper layer on the top of the stimulus indicating device, as shown in FIG. 4A and FIG. 4B. The first compartment and the second compartment are additionally formed and differentiated from one another by a semi-permeable membrane that is strong and resilient to twisting, bending and breaking. Alternately, as shown in FIG. 4C an alternate embodiment could position the first compartment above the second compartment separated by the permeable membrane. Other shapes are contemplated within the scope of the invention as previously described in prior applications or as understood by one of ordinary skill in the art.

Prior to exposure to a predetermined stimulus, in this embodiment a stimulus sensitive gel is preferably contained in just the second compartment. And prior to exposure of the stimulus indicating device to the predetermined stimulus the color changing absorbent material is a first color, visible through the indicator window or display portion.

Both the backing layer and the upper layer should be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the first compartment, although variations in these dimensions are within the scope of the present invention. The upper layer can preferably be made of a clear material, such as plastic, so that the user of the stimulus indicating device can view at least some portion of the backing material or color changing absorbent material. The upper layer can also be able to accept paint or ink so as to allow for coloring or concealing at least some portion of the first compartment.

Although some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, will be expelled as well.

By way of example only, the color changing absorbent material could be divalent cation test paper, litmus paper or any equivalent color changing absorbent material. What is important is that the color changing absorbent material has: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts remain bound or trapped in the color changing absorbent material.

By way of example only, the constituent parts contained in the polymer matrix of the swollen stimulus sensitive gel, and then expelled along with and carried by the expelled liquid through the semi-permeable membrane until both come into contact with the color changing absorbent material, could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel.

Then as the expelled constituent parts (e.g., divalent cations (by way of example only, $Mg^{2+}$ or $Ca^{2+}$)) carried by the expelled liquid came into contact with the color changing absorbent material, at least a portion of the color changing absorbent material would not only change from a first color to a second color, but the constituent parts would permanently bind to the color changing absorbent material. It is important that the color changing absorbent material be reactive to the expelled constituent parts. Thus, because the constituent parts in the preferred embodiment preferably consist of divalent cations, the color changing absorbent material must be reactive to those divalent cations, and can include by way of example only, divalent cationic paper. Examples of such divalent cationic paper that can be used as the color changing absorbent material includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid containing the constituent parts (by way of example only, $Mg^{2+}$ or $Ca^{2+}$). Examples of such divalent cationic paper includes a total-hardness indicator paper or test stick that is available from Sigma-Aldrich under the tradename QUANTOFIX®. Preferably the color changing absorbent material operates in at least a semi-quantitative capacity.

By the expelled constituent parts (e.g., divalent cations (by way of example only, Mg2+ or Ca2+)) permanently binding to the color changing absorbent material (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent material or cationic paper, and the color changing absorbent material or cationic paper would remain permanently colored the second color.

Although this alternative embodiment with a semi-permeable membrane discussed herein employs a divalent cation test paper as the color changing absorbent material, alternative color changing absorbent materials could also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid would not only be expelled from the swollen stimulus sensitive gel, but $H^+$ would also be expelled along with that liquid. Then when the expelled constituent parts (by way of example only, $H^+$) contained in the expelled liquid subsequently comes into physical contact with the color changing absorbent material, such as litmus paper (by way of example only, $H^+$ concentration indicator), at least a portion of the color changing absorbent material would react to the expelled constituent parts (by way of example only, $H^+$), and change from a first color to a second color. Such litmus paper that is suitable for use as a color changing absorbent material includes by way of example only, the pH-indicator strips manufactured by EMI Chemicals Inc. What is important is that the litmus paper changes from a first color to a second color upon coming into contact with the constituent parts.

In addition to changing from a first color to a second color, the expelled constituent parts (by way of example only, $H^+$) would permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) would remain permanently bound to the color changing absorbent material, and the color changing absorbent material would permanently remain colored the second color.

Moreover, because the semi-permeable membrane keeps the stimulus sensitive gel in the second compartment, the stimulus sensitive gel preferably does not move into the first compartment at any time, and is thereby prevented from covering up the color changing absorbent material at all times. Preferably, the stimulus sensitive gel would also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the semi-permeable membrane keeps the stimulus sensitive gel and the color changing absorbent material physically separated, such false indications are avoided.

It should be noted that by manipulating the permeability of the semi-permeable membrane connecting the first compartment to the second compartment the time required for the expelled liquid to move from the second compartment into the first compartment can be varied. Such manipulation of the semi-permeable membrane includes increasing or decreasing its thickness and/or increasing or decreasing its surface area facing the first compartment and/or second compartment and/or increasing or decreasing its wicking ability, so as to control the speed at which the expelled liquid and the constituent parts travel from the second compartment, through the semi-permeable membrane, and enter the first compartment.

There is a difference between the permeable membrane discussed herein and the semi-permeable membrane discussed herein that needs to be appreciated. The permeable membrane allows the expelled liquid and constituent parts to repeatedly travel freely from the second compartment into the first compartment, and then back again into the second compartment. In comparison, the semi-permeable membrane would preferably be designed so that it not only allows the constituent parts of the expelled liquid (by way of example only, the $Mg^{2+}$) to pass from the at least second compartment into the first compartment, but it would prevent the constituent parts (by way of example only, the $Mg^{2+}$) from passing back into the at least second compartment from the first compartment. The semi-permeable membrane could also prohibit the expelled liquid from traveling back into the second compartment, but doing so is not as important as trapping the constituent parts in the first compartment.

An advantage of using such an embodiment is that both the exposure to a predetermined stimulus as well as the time of exposure can be indicated. As an example, if the predetermined stimulus occurs for just a short period of time, and is removed before the expelled liquid and constituent parts have completely moved from the second compartment through the semi-permeable membrane and into the first compartment, then the expelled liquid and constituent parts will remain within the semi-permeable membrane. Only when the predetermined stimulus returns and causes the stimulus sensitive gel to continue to undergo its phase transition will additional liquid be expelled along with additional constituent parts. When enough expelled liquid and enough constituent parts are present so as to completely pass through the semi-permeable membrane, contact and react with the color changing absorbent material, the color changing absorbent material will change from the first color to the second color, thereby indicating the stimulus sensitive product attached to the stimulus indicating device had been exposed to a predetermined stimulus.

More than One Compartment with Capillaries or Narrow Channels

To achieve these and other advantages and in accordance with the purpose of the invention, as embodied and broadly described, another embodiment of the invention could be as shown in FIG. 5A and FIG. 5B, a multi-compartment device that includes a first compartment with an indicator window through which a color changing absorbent material is visible, and at least a second compartment containing a stimulus sensitive gel. The first compartment and the second compartment are formed by the backing layer on the bottom of the stimulus indicating device and an upper layer on the top of the stimulus indicating device, as shown in FIG. 5A and FIG. 5B. The first compartment and the second compartment are additionally formed and differentiated from one another by small channel(s), capillary(-ies) or tube(s), such as capillary tubes that are strong and resilient to twisting, bending and breaking. Alternately, as shown in FIG. 5C an alternate embodiment could position the first compartment above the second compartment separated by the permeable membrane. Other shapes are contemplated within the scope of the invention as previously described in prior applications or as understood by one of ordinary skill in the art.

Prior to exposure to a predetermined stimulus, in this embodiment a stimulus sensitive gel is preferably contained in just the second compartment. And prior to exposure of the stimulus indicating device to a predetermined stimulus the color changing absorbent material is a first color, visible through the indicator window or display portion.

Both the backing layer and the upper layer should be constructed of a strong, resilient. leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the first compartment, although variations in these dimensions are within the scope of the present invention. The upper layer can preferably be made of a clear material, such as plastic, so that the user of the stimulus indicating device can view at least some portion of the hacking material or color changing absorbent material. The upper layer can also be able to accept paint or ink so as to allow for coloring or concealing at least some portion of the first compartment.

Although some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, will be expelled as well.

By way of example only, the color changing absorbent material could be divalent cation test paper, litmus paper or any equivalent color changing absorbent material. What is important is that the color changing absorbent Material has: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid permanently bind onto the color changing absorbent material so as to cause the color changing absorbent material to change color so that even if the expelled liquid is subsequently reabsorbed by the shrunken stimulus sensitive gel when the predetermined stimulus is removed, those constituent parts remain bound or trapped in the color changing absorbent material.

By way of example only, the constituent parts contained in the polymer matrix of the swollen stimulus sensitive gel, and then expelled along with and carried by the expelled liquid through the capillaries or tubes until both come into contact with the color changing absorbent material, could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel.

Then as the expelled constituent parts (e.g., divalent cations (by way of example only, $Mg^{2+}$ or $Ca^{2+}$)) carried by the expelled liquid came into contact with the color changing absorbent material, at least a portion of the color changing absorbent material would not only change from a first color to a second color, but the constituent parts would permanently bind to the color changing absorbent material. It is important that the color changing absorbent material be reactive to the expelled constituent parts. Thus, because the constituent parts in the preferred embodiment preferably consist of divalent cations, the color changing absorbent material must be reactive to those divalent cations, and can include by way of example only, divalent cationic paper. Examples of such divalent cationic paper that can be used as the color changing absorbent material includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid containing the constituent parts (by way of example only, $Mg^{2+}$ or $Ca^{2+}$). Preferably the color changing absorbent material operates in at least a semi-quantitative capacity.

By the expelled constituent parts (e.g., divalent cations (by way of example only, Mg2+ or Ca2+)) permanently binding to the color changing absorbent material (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent material or cationic paper, and the color changing absorbent material or cationic paper would remain permanently colored the second color.

Although this alternative embodiment with capillaries or tubes discussed herein employs a divalent cation test paper as the color changing absorbent material, alternative color changing absorbent materials could also be used, so long as they are reactive to the expelled constituent parts. By way of example only, the liquid held in the polymer matrix of the swollen stimulus sensitive gel could contain protons ($H^+$). And as the swollen stimulus sensitive gel undergoes its phase transition due to exposure to a predetermined stimulus, the liquid would not only be expelled from the swollen stimulus sensitive gel, but $H^+$ would also be expelled along with that liquid. Then when the expelled constituent parts (by way of example only, $H^+$) contained in the expelled liquid subsequently comes into physical contact with the color changing absorbent material, such as litmus paper (by way of example only, $H^+$ concentration indicator), at least a portion of the color changing absorbent material would react to the expelled constituent parts (by way of example only, $H^+$), and change from a first color to a second color. Such litmus paper that is suitable for use as a color changing absorbent material includes by way of example only, the pH-indicator strips manufactured by EMD Chemicals Inc. What is important is that the litmus paper changes from a first color to a second color upon coming into contact with the constituent parts.

In addition to changing from a first color to a second color, the expelled constituent parts (by way of example only, $H^+$) would permanently bind to the color changing absorbent material. Accordingly, even if the expelled liquid were ultimately reabsorbed by the collapsed or shrunken stimulus sensitive gel, so as to become a partially or fully re-swollen stimulus sensitive gel, the expelled constituent parts (by way of example only, $H^+$) would remain permanently bound to the color changing absorbent material, and the color changing absorbent material would permanently remain colored the second color.

Moreover, because the capillaries or tubes keep the stimulus sensitive gel in the second compartment, the stimulus sensitive gel preferably does not move into the first compartment at any time, and is thereby prevented from covering up the color changing absorbent material at all times. Preferably, the stimulus sensitive gel would also be held in the second compartment by an attachment point. In addition, if the color changing absorbent material is capable of wicking the liquid and constituent parts out of the polymer matrix of the swollen stimulus sensitive gel, simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or protons) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. Because the channel(s), capillary(-ies) or tube(s) keep the stimulus sensitive gel and the color changing absorbent material physically separated, such false indications are avoided.

It should be noted that by manipulating the geometry of the channel(s), capillary(-ies) or tube(s) connecting the first compartment to the second compartment the time required for the expelled liquid to move from the second compartment into the first compartment can be varied. Such manipulation of the geometry of the channel(s), capillary(-ies) or tube(s) includes increasing or decreasing its length and/or increasing or decreasing its width and/or increasing or decreasing the wicking ability of the material that makes up the channel(s), capillary(-ies) or tube(s), so as to control the speed at which the expelled liquid and the constituent parts travel from the second compartment, through the channel(s), capillary(-ies) or tube(s), and enter the first compartment.

An advantage of using such an embodiment is that both the exposure to a predetermined stimulus as well as the time of exposure can be indicated. As an example, if the predetermined stimulus occurs for just a short period of time, and is removed before the expelled liquid and constituent parts have completely moved from the second compartment through the channel(s), capillary(-ies) or tube(s) and into the first compartment, then the expelled liquid and constituent parts will be wicked or drawn back into the second compartment by the shrunken stimulus sensitive gel as the shrunken stimulus sensitive gel re-expands or swells. In this case, no irreversible indication of exposure to the predetermined stimulus will be indicated by color changing absorbent material because the time of exposure to the predetermined stimulus was too brief to enable enough expelled liquid and constituent parts to pass completely through the channel(s), capillary(-ies) or tube(s), react with the color changing absorbent material, and cause it to change from a first color to a second color.

More than One Compartment with Semi-Permeable Membrane as the Color Changing Absorbent Material To achieve these and other advantages and in accordance with the purpose of the invention, as embodied and broadly described, another embodiment of the invention could be as shown in FIG. 6A and FIG. 6B, a device with at least a single compartment that includes an indicator window through which a color changing absorbent material is visible, as well as a stimulus sensitive gel. The at least single compartment is formed by the backing layer on the bottom of the stimulus indicating device and an upper layer on the top of the stimulus indicating device. As shown in FIG. 6A the indicator window is positioned above the color changing absorbent material, wherein the color changing absorbent material is comprised of a semi-permeable material, which is strong and resilient to twisting, bending and breaking. Alternately, as shown in FIG. 6C an alternate embodiment could position a first compartment above a second compartment separated by the permeable membrane. Other shapes are contemplated within the scope of the invention as previously described in prior applications or as appreciated by one of ordinary skill in the art.

Prior to exposure to a predetermined stimulus, in this embodiment the color changing absorbent material, is a first color, visible through the indicator window or display portion.

Both the backing layer and the upper layer should be constructed of a strong, resilient leak-proof material, such as plastic or other polymer material, so as to provide for the twisting or bending that might occur during transportation of the stimulus sensitive product without tearing, breaking or leaking. The backing layer and the upper layer may also be made of a material that preferably allows them to be joined and sealed together, such as by heat stamping or other suitable means. The backing layer and the upper layer can both approximate the length and width of the first compartment, although variations in these dimensions are within the scope of the present invention. The upper layer can preferably be made of a clear material, such as plastic, so that the user of the stimulus indicating device can view at least some portion of the backing material or color changing absorbent material. The upper layer can also be able to accept paint or ink so as to allow for coloring or concealing at least some portion of the first compartment.

Although some portion of the upper layer can also accept paint or ink for coloring, it is preferable that the indicator window portion of the upper layer remain free from ink or coloring so that the user of the stimulus indicating device can observe the first compartment through the indicator window as explained herein. The backing layer should also be able to accept paste, glue or other suitable adhesive on the surface not facing the first compartment, so as to allow it to be attached to a stimulus sensitive product.

Upon exposure of the stimulus sensitive gel to a predetermined stimulus, the stimulus sensitive gel undergoes its phase transition in reaction to the predetermined stimulus. As the swollen stimulus sensitive gel undergoes its phase transition, the volume of the swollen stimulus sensitive gel changes by collapsing or shrinking due at least to a portion of the liquid contained in the polymer network being expelled, and at least some of the constituent parts contained in the polymer network being expelled as well. Along with this liquid, at least some of the constituent parts required for detection of unfavorable stimulus exposure, which are incorporated into the polymer network during the initial preparation, will be expelled as well.

By way of example only, the color changing absorbent material could be any semi-permeable material that allows the expelled liquid and the constituent parts to pass through it, and more particularly to migrate through it, from one end of the semi-permeable material to the other. What is important is that the color changing absorbent material has: 1) an affinity for the liquid and constituent parts contained in, and then expelled from, the stimulus sensitive gel; and 2) that at least a portion of the color changing absorbent material changes color upon coming into contact with that expelled liquid and/or constituent parts. More specifically, at least some of the constituent parts carried by the expelled liquid become trapped in the semi-permeable membrane.

The semi-permeable membrane when it is used as the color changing absorbent material can change color by any number of ways. For example, the expelled constituent parts could be colored a color different from the color of the semi-permeable membrane. And as the expelled constituent parts migrate through the semi-permeable membrane, they change it from a first color to a second color. Alternatively, the semi-permeable membrane could be reactive to the expelled constituent parts and as the constituent parts migrate through the semi-permeable membrane/color changing absorbent material, it changes from a first color to a second color.

By way of example only, the constituent parts contained in the polymer matrix of the swollen stimulus sensitive gel, and then expelled along with and carried by the expelled liquid through the semi-permeable membrane could be divalent cations (by way of example only, $Mg^{2+}$ or $Ca^{2+}$). More specifically, as the stimulus sensitive gel undergoes its phase transition due to exposure to a predetermined stimulus, the swollen stimulus sensitive gel would not only expel the liquid contained in the polymer matrix, but would also expel the constituent parts, such as divalent cations (by way of example only, $Mg^{2+}$ or $Ca^{2+}$) also contained in the polymer matrix of the swollen stimulus sensitive gel.

Then as the expelled constituent parts (e.g., divalent cations (by way of example only, $Mg^{2+}$ or $Ca^{2+}$)) carried by the expelled liquid came into contact with the color changing absorbent material which is the semi-permeable membrane, at least a portion of the color changing absorbent material would not only change from a first color to a second color, but the constituent parts would permanently bind to the color changing absorbent material. It is important that the color changing absorbent material/semi-permeable membrane be reactive to the expelled constituent parts. Thus, because the constituent parts in the preferred embodiment preferably consist of divalent cations, the color changing absorbent material must be reactive to those divalent cations.

By the expelled constituent parts (e.g., divalent cations (by way of example only, Mg2+ or Ca2+)) permanently binding to the color changing absorbent material as the expelled constituent parts migrate through the semi-permeable membrane (e.g., divalent cationic paper), even if the expelled liquid were ultimately reabsorbed by the collapsed or shrunken stimulus sensitive gel so as to become a partially or fully re-swollen stimulus sensitive gel, the expelled constituent parts would remain permanently bound to the color changing absorbent a al/semi-permeable membrane, and the color changing absorbent material/semi-permeable membrane would remain permanently colored the second color.

Preferably, the stimulus sensitive gel would also be held in place by an attachment point. In addition, if the color changing absorbent material/permeable membrane is capable of wicking the liquid and constituent parts out of the polymer matrix of the swollen stimulus sensitive gel, simply by being in physical contact with the swollen stimulus sensitive gel, then the color changing absorbent material should be physically separated from the swollen stimulus sensitive gel. Otherwise, the color changing absorbent material would wick and absorb the constituent parts (divalent cations or hydrogen ions) from the swollen stimulus sensitive gel even if the stimulus indicating device had not been exposed to a predetermined stimulus, resulting in a false indication that the stimulus sensitive product attached to the stimulus indicating device had been exposed to a predetermined stimulus, when in fact it had not. If the color changing absorbent material/semi-permeable membrane does not wick the constituent parts out of the swollen stimulus sensitive gel, then the color changing absorbent material/semi-permeable membrane can be in physical contact with the swollen stimulus sensitive gel.

It should be noted that by manipulating the permeability of the semi-permeable membrane the time required for the expelled liquid to move through the length of the semi-permeable membrane and into the indicator window can be varied. Such manipulation of the semi-permeable membrane includes increasing or decreasing its thickness and/or increasing or decreasing its surface area facing the first compartment and/or second compartment and/or increasing or decreasing its wicking ability, so as to control the speed at which the expelled liquid and expelled constituent parts travel through the semi-permeable membrane, and enter the indicator window.

It should also be noted that the semi-permeable membrane/color changing absorbent material would preferably be designed so that it not only allows the constituent parts of the expelled liquid (by way of example only, the $Mg^{2+}$) to pass through the length of the semi-permeable membrane, but it would prevent the constituent parts (by way of example only, the $Mg^{2+}$) from passing in reverse and away from the indicator window.

An advantage of using such an embodiment is that both the exposure to a predetermined stimulus as well as the time of exposure can be indicated. As an example, if the predetermined stimulus occurs for just a short period of time, and is removed before the expelled liquid and constituent parts have moved completely through the semi-permeable membrane and into the indicator window, then the expelled liquid and constituent parts will remain within the semi-permeable membrane. Only when the predetermined stimulus returns and causes the stimulus sensitive gel to continue to undergo its phase transition will additional liquid be expelled along with additional constituent parts. When enough expelled liquid and enough constituent parts are expelled and present so as to completely pass through the semi-permeable membrane, it will cause that portion of the color changing absorbent material/semi-permeable membrane that is visible in the indicator to change from a first color to a second color, thereby indicating the stimulus sensitive product attached to the stimulus indicating device had been exposed to a predetermined stimulus.

ALL EMBODIMENTS

For all of the embodiments discussed herein, the color change in the color changing absorbent material is preferably accomplished by the color changing absorbent material changing from a first color to a second color. This change in color is visible to the user of the stimulus indicating device through the indicator window. The portion of the color changing absorbent material that is sensitive to the constituent parts contained in the expelled liquid could be shaped in any number of ways. For example, the color changing absorbent material could be shaped like an "X" or any other symbol or glyph, so long as the change in color indicates to the user that the stimulus sensitive product had been exposed to a predetermined stimulus.

For all of the embodiments discussed herein, it is preferable that only the color changing absorbent material be visible through the indicator window. Moreover, it is preferable that the stimulus sensitive gel not be visible to the user of the stimulus indicating device. Preferably, the stimulus sensitive gel is hidden under the top portion of the stimulus indicator device and thus is not visible to the user through the indicator window either before exposure to the predetermined stimulus, or after exposure to the predetermined stimulus regardless of whether the predetermined stimulus is removed or not.

In accordance with the purpose of the invention, as embodied and broadly described, another embodiment of the invention is a device that indicates when a stimulus sensitive product has potentially or conclusively undergone a physical change in response to exposure to a predetermined stimulus extreme.

In accordance with the purpose of the invention, as embodied and broadly described, another embodiment of the invention is a device that indicates when a stimulus sensitive product has potentially or conclusively undergone a physical change in response to exposure to a predetermined stimulus extreme over a predetermined period of time.

In accordance with the purpose of the invention, as embodied and broadly described, other embodiments of the invention are methods to manufacture stimulus sensitive gels that can indicate exposure to a predetermined stimulus extreme.

It is to be understood that both the foregoing general description and the following detailed description are exemplary and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings in FIG. 1A and FIG. 1B, as well as other embodiments of the invention with reference to the remaining drawings, in which.

DETAILED DESCRIPTION OF EMBODIMENTS OF THE INVENTION

Figure 1A:
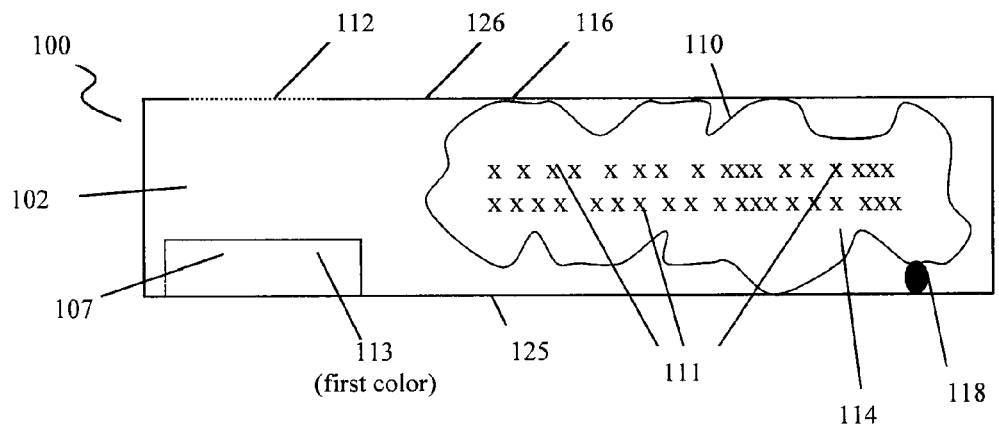
FIG. 1A is a side cross-sectional view of an embodiment of the invention before exposure to a predetermined stimulus extreme.

Referring now to the drawings, and more specifically to all the embodiments discussed herein, it is well known that the collapsing and/or swelling of polymer gels is dictated by equilibrium thermodynamics. Therefore, a stimulus sensitive gel that has undergone its phase transition upon exposure to a predetermined stimulus (i.e., the stimulus sensitive gel collapsed or shrank upon exposure to a stimulus extreme, such as temperature, or the stimulus sensitive gel expanded or swelled upon exposure to a stimulus extreme) will return to its original volume if the predetermined stimulus is removed. The term "predetermined stimulus" as used herein means a certain stimulus (by way of example only, electromagnetic radiation, temperature, pH, etc.) that is known to cause a stimulus sensitive gel to undergo its phase transition. Accordingly, it is necessary to develop indicating devices with irreversibility built into the stimulus-sensitive or stimulus-indicating or stimulus-reactive operation of the indicator. Such irreversibility would provide a permanent indication of exposure to a predetermined stimulus, regardless of whether the predetermined stimulus is later removed and the stimulus sensitive gel returns to its original form when the predetermined stimulus is removed.

Disclosed herein are embodiments that ensure an irreversible, reliable visual indication of exposure to a pre-determined stimulus. The types of stimulus that induce phase transition are well known in the art and include by way of example only, temperature, humidity, radiation, visible light, solvent composition, pH, ionic strength, etc. For ease of discussion purposes only, the embodiments discussed herein will focus on exposure to a pre-determined temperature stimulus.

In regard to all the embodiments of the stimulus indicating device discussed herein being "irreversible" or "permanent", what is meant is that once the stimulus indicating device provides an indication of exposure to an adverse stimulus extreme (which is also referred to herein as a predetermined stimulus), that exposure indication does not change, even though the adverse stimulus extreme or predetermined stimulus might be removed in the future.

Single Compartment

Figure 1B:
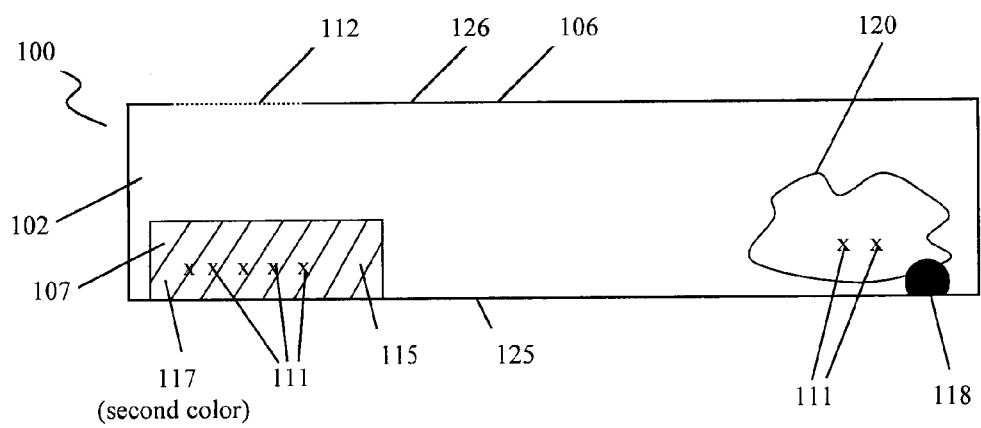
FIG. 1B is a side cross-sectional view of the embodiment in FIG. 1A after exposure to a predetermined stimulus extreme.

The preferred embodiment of the stimulus indicating device 100, as shown in FIG. 1A and FIG. 1B, preferably employs a single chamber device 102 that contains a color changing absorbent material 107 and a stimulus sensitive gel 110 and 120. The first compartment 102 is formed by the backing layer 125 on the bottom of the stimulus indicating device 100 and an upper layer 126 on the top of the stimulus indicating device 100. The top layer 126 of the stimulus indicating device 100 is formed by at least the indicator window 112 and the top portion 116 of the top layer 126. This color changing absorbent material 107 can be viewed through an indicator window 112 located in the upper layer 126 of the stimulus indicating device 100.

Both the backing layer 125 and the upper layer 126 may be constructed of a strong, resilient leak-proof material, such as plastic or other polymer material, so as to provide for the twisting or bending that might occur during transportation of the stimulus sensitive product without tearing, breaking or leaking. The backing layer 125 and the upper layer 126 may also be made of a material that preferably allows them to be joined and sealed together, such as by heat stamping or other suitable means. The backing layer 125 and the upper layer 126 can both approximate the length and width of the first compartment 102, although variations in these dimensions are within the scope of the present invention. The upper layer 126 can preferably be made of a clear material, such as plastic, so that the user of the stimulus indicating device 100 can view at least some portion of the backing material or color changing absorbent material 107. The upper layer 126 can also be able to accept paint or ink so as to allow for coloring or concealing at least some portion of the first compartment 102.

Although some portion of the upper layer 126 can also accept paint or ink for coloring, it is preferable that the indicator window 112 portion of the upper layer 126 remain free from ink or coloring so that the user of the stimulus indicating device 100 can observe the first compartment 102 through the indicator window 112 as explained herein. The backing layer 125 should also be able to accept paste, glue or other suitable adhesive on the surface not facing the first compartment 102, so as to allow it to be directly or indirectly attached to a stimulus sensitive product.

By way of example only, the color changing absorbent material 107 could be cationic paper, litmus paper or any equivalent absorbent material that is reactive to a certain ion, element or similar substance. In regard to all the embodiments of the stimulus indicating device discussed herein being "reactive", what is meant is that the color changing absorbent material 107 should change its observable properties (by way of example only, its size, its color, etc.) in reaction to coming into contact with the constituent parts 111 expelled from the swollen stimulus sensitive gel 110 as described herein. Thus it is important that the color changing absorbent material 107 has both an affinity for the expelled liquid 115 and constituent parts 111 previously contained in, and expelled from, the swollen stimulus sensitive gel 110; and that at least a portion of the color changing absorbent material 107 changes properties upon coming into contact with the expelled liquid 115 and constituent parts 111, so as to change from a first color 113 to a second color 117. Preferably the color changing absorbent material 107 can operate in a semi-quantitative capacity.

In the preferred alternative of the preferred embodiment, the color changing absorbent material 107 is a divalent cationic paper that is reactive to constituent parts 111 such as by way of example only, divalent cations (by way of example only, $Mg^{2+}$ or $Ca^{2+}$). As discussed herein, a suitable color changing absorbent material 107, such as a total-hardness indicator paper or test stick will indicate a change from a first color 113 to a second color 117 upon exposure to constituent parts 111 carried by the expelled liquid 115 after both are expelled from the swollen stimulus sensitive gel 110. Examples of such divalent cationic paper that can be used as the color changing absorbent material 107 includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid 115 containing the constituent parts 111 (by way of example only, $Mg^{2+}$ or $Ca^{2+}$). Preferably the color changing absorbent material 107 operates in at least a semi-quantitative capacity.

As discussed herein, one method for incorporating the constituent parts 111 that are reactive with the color changing absorbent material 107 is to swell the swollen stimulus sensitive gel 110 in a bath containing constituent parts 111 that are specifically reactive with the selected color changing absorbent material 107, including by way of example only, divalent cation salts (by way of example only $Mg^{2+}$ or $Ca^{2+}$ salts), and/or varying concentrations of $H^+$.

In the preferred embodiment, as the swollen stimulus sensitive gel 110 undergoes its phase transition in reaction to exposure to a predetermined stimulus, its volume changes by collapsing or shrinking due at least to a portion of the liquid 114 and constituent parts 111 (by way of example only $Mg^{2+}$) contained in the polymer network of the swollen stimulus sensitive gel 110 being expelled. As the swollen stimulus sensitive gel 110 expels even a portion of the liquid 114 and the constituent parts 111, it collapses and shrinks so that it resembles the shrunken stimulus sensitive gel 120 shown in FIG. 1B. Once a portion of the liquid 114 and the constituent parts 111 are expelled from the swollen stimulus sensitive gel 110, the expelled liquid 115 and the expelled constituent parts 111 subsequently come into contact with and are absorbed by the color changing absorbent material 107. Because of the design of the color changing absorbent material 107, as the constituent parts 111 are absorbed by the color changing absorbent material 107, the color changing absorbent material 107 changes from a first color 113 to a second color 117 due to the reaction between chemical moieties on the color changing absorbent material 107 and the constituent parts 111 carried by the expelled liquid 115. Because of the design of the color changing absorbent material 107, at least part of the color changing absorbent material 107, and preferably all of the color changing absorbent material 107 will change from a first color 113 to a second color 117 upon coming into contact with the constituent parts 111.

Moreover, upon being absorbed by the color changing absorbent material 107, the constituent parts 111 are permanently bound to the color changing absorbent material 107 thereafter. Thus, even if the predetermined stimulus is removed and the expelled liquid 115 is subsequently reabsorbed by the shrunken stimulus sensitive gel 120 so as to become a partially or fully re-swollen stimulus sensitive gel 110, those constituent parts 111 remain bound to or trapped in the color changing absorbent material 107, and thus that color changing absorbent material 107 permanently remains colored the second color 117.

Although the decrease in volume of the swollen stimulus sensitive gel 110 in all of the embodiments of the stimulus indicating device 100 discussed herein can be by any amount so long as it is noticeable, preferably the decrease in volume of the swollen stimulus sensitive gel 110 would be between at least a 1/10 reduction in original volume, and up to a 500 times decrease in original volume. In regard to all embodiments of the stimulus indicating device 100 discussed herein as they pertain to the decrease in the volume being "noticeable" what is meant is that the volume change of the swollen stimulus sensitive gel 110 expels enough liquid 114 and constituent parts 111 to permanently cause at least a partial color change in the color changing absorbent material 107 from a first color 113 to a second color 117.

In an alternative of the preferred embodiment, the color changing absorbent material 107 could be pH-indicator strips manufactured by EMD Chemicals Inc. These pH-indicator strips can react to and indicate exposure to constituent parts 111 such as and by way of example only, $H^+$ ions, by permanently changing from a first color 113 to a second color 117. Preferably the pH-indicator strips are manufactured in such a way that there is a noticeable spectrum of colors that match the range of possible pH concentrations. For example, the first color 113 of the color changing absorbent material 107 could be colored red prior to the stimulus indicating device 100 being exposed to a predetermined stimulus. Then upon exposure to a predetermined stimulus, the swollen stimulus sensitive gel 110 would expel liquid 114 and constituent parts 111 (by way of example only $H^+$) which, upon contact with the color changing absorbent material 107, causes the color changing absorbent material 107 to change to a second color 117 such as blue.

Altering the pH of the expelled liquid 115 and the content of the constituent parts 111 (by way of example only $H^+$) will allow the first color 113 and second color 117 of the color changing absorbent material 107 to be manipulated. For example, if the swollen stimulus sensitive gel 110 was manufactured so that it was swollen with an aqueous solution of either high pH (for example a pH of 14), or low pH (for example a pH of 1), the most significant color contrast can be achieved between the first color 113 and second color 117 of the color changing absorbent material 107.

As shown in FIG. 1A the irreversible stimulus indicating device 100 would preferably have a single compartment 102. Within the single compartment 102 is the stimulus sensitive gel in its expanded or swollen state 110, and the color changing absorbent material 107. At least a portion of this color changing absorbent material 107 would be visible to a user through the indicator window 112. Although the swollen stimulus sensitive gel 110 is preferably hidden from the user below the paint applied to the top portion 116 of the stimulus sensitive device 100, it could also be visible to the user. If the swollen stimulus sensitive gel 110 were visible to the user, it is preferred that it be the same color as the color changing absorbent material 107 prior to the color changing absorbent material 107 coming into contact with the constituent parts 111.

If the color changing absorbent material 107 has the ability to wick liquid 114 and/or constituent parts 111 from the swollen stimulus sensitive gel 110 simply by the color changing absorbent material 107 being in contact with the swollen stimulus sensitive gel 110, then it is preferred that the color changing absorbent material 107 and the swollen stimulus sensitive gel 110 not be in physical contact with each other. Thus, in the preferred embodiment the swollen stimulus sensitive gel 110 is physically separated from the color changing absorbent material 107 so as to prevent the liquid 114 and the constituent parts 111 contained in the swollen stimulus sensitive gel 110 from being wicked into the color changing absorbent material 107. Doing so prevents the stimulus sensitive device 100 from giving a false indication of exposure to a predetermined stimulus.

Figure 1C:
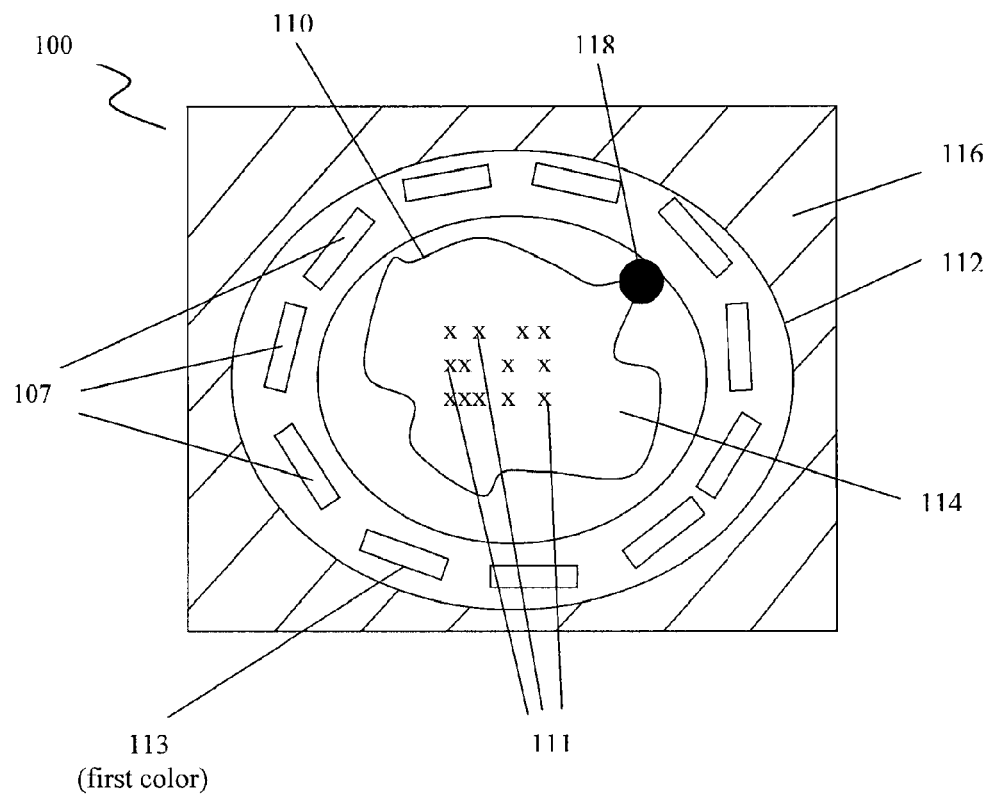
FIG. 1C is a top down view of an embodiment of the invention before exposure to a predetermined stimulus extreme.
Figure 1D:
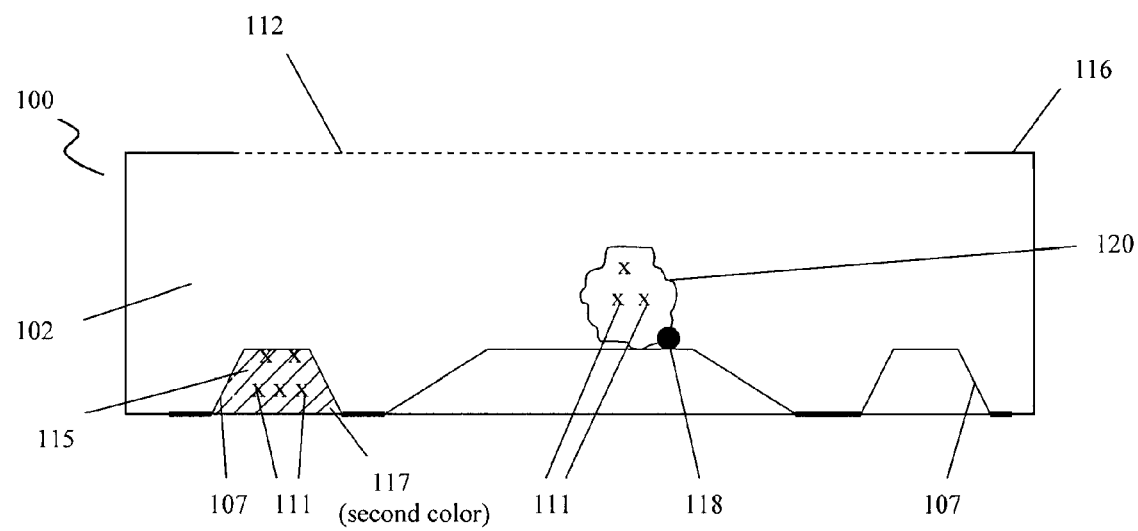
FIG. 1D is a side cross-sectional view of the embodiment in FIG. 1C after exposure to a predetermined stimulus extreme.
Figure 1E:
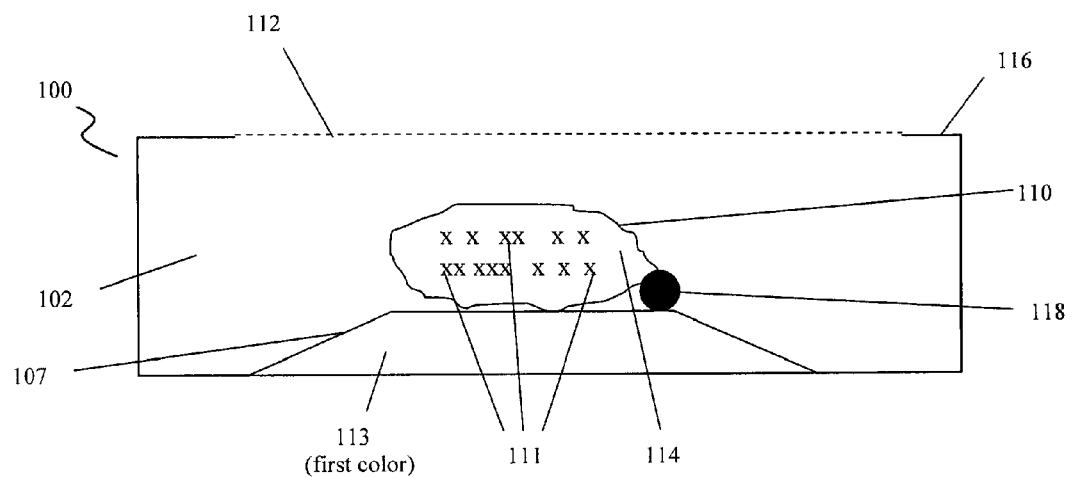
FIG. 1E is a side cross-sectional view of an embodiment of the invention before exposure to a predetermined stimulus extreme.
Figure 1F:
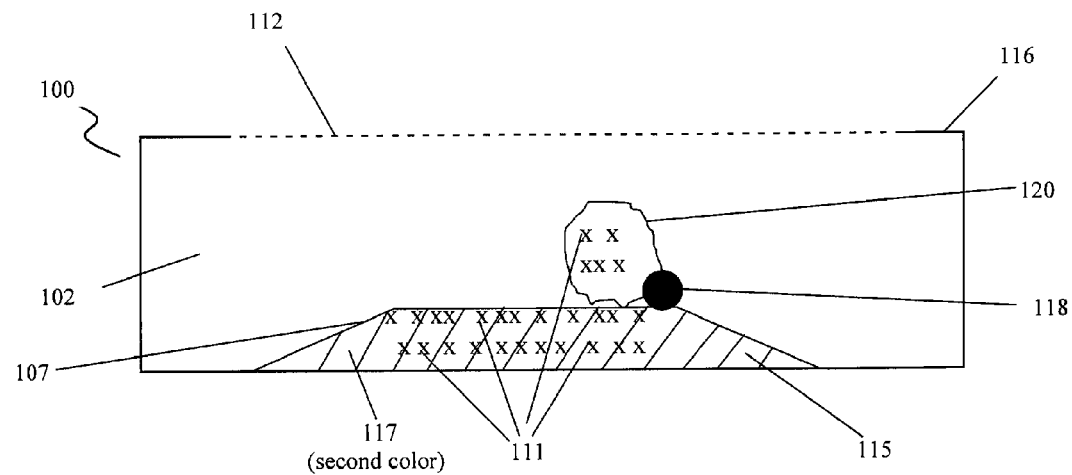
FIG. 1F is a side cross-sectional view of the embodiment in FIG. 1E after exposure to a predetermined stimulus extreme.

For all the embodiments of the stimulus indicating device 100 discussed herein, an alternate way to position the swollen stimulus sensitive gel 110 would be, as shown in FIG. 1C and FIG. 1D, to surround the swollen stimulus sensitive gel 110 with the color changing absorbent material 107. Doing so helps to ensure that the constituent parts 111 and the expelled liquid 115 can more easily come into contact with the color changing absorbent material 107 once the swollen stimulus sensitive gel 110 undergoes its phase transition upon being exposed to a predetermined stimulus. Positioning the swollen stimulus sensitive gel 110 so that it is surrounded by color changing absorbent material 107 would help to eliminate or minimize problems that might be caused by gravity preventing the constituent parts 111 and the expelled liquid 115 from contacting the color changing absorbent material 107 and providing an indication that the stimulus indicating device 100 had been exposed to a predetermined stimulus. An alternative to the structure/arrangement taught by FIG. 1C and FIG. 1D is shown in FIG. 1E and FIG. 1F, wherein the swollen stimulus sensitive gel 110 is positioned directly atop the color changing absorbent material 107 prior to the stimulus indicating device being exposed to a predetermined stimulus. Note this alternative structure/embodiment shown in FIG. 1E and FIG. 1F works best if the color changing absorbent material 107 does not wick the liquid 114 and constituent parts 111 out of the stimulus sensitive gel 110 and 120 as discussed herein in regard to other embodiments. It is also possible that a permeable membrane could separate the color changing absorbent material 107 from the stimulus sensitive gel 110 and 120 in FIG. 1E and FIG. 1F to prevent such wicking.

For the embodiment shown in FIG. 1E it would be necessary that the first color 113 of the color changing absorbent material 107 be the same or similar to the coloring of the swollen stimulus sensitive gel 110 prior to exposure to a predetermined stimulus; then after exposure of the stimulus indicating device 100 to the predetermined stimulus the color changing absorbent material 107 would change to a second color 117 that is visible through the indicator window 112, as shown in FIG. 1F. Alternatively, for the embodiment shown in FIG. 1E and FIG. 1F the swollen stimulus sensitive gel 110 could be translucent so that it does not have a color component to it, so long as it contained enough constituent parts 111 to cause the color changing absorbent material 107 to change from a first color 113 to a second color 117.

Preferably, the stimulus sensitive gel 110 and 120 would be fixed or secured at the attachment point 118, or at more than one attachment point if desired. The stimulus sensitive gel 110 and 120 may be fixed to the attachment point 118 with a suitable epoxy, glue, or it could be heat stamped upon creation of the stimulus indicating device 100. Attaching the stimulus sensitive gel 110 and 120 to the attachment point 118 helps to ensure that the swollen stimulus sensitive gel 110 collapses or shrinks in a desired direction—preferably away from the color changing absorbent material 107 and the indicator window 112. Moreover, securing or fixing the stimulus sensitive gel 110 and 120 to the attachment point ensures that the stimulus sensitive gel 110 and 120 does not cover the color changing absorbent material 107 after it had changed from a first color to a second color. Securing or fixing the stimulus sensitive gel 110 and 120 to the attachment point 118 prevents the stimulus sensitive gel 110 and 120 from floating or moving within the compartment and covering up the color changing absorbent material 107 at all times.

All embodiments discussed herein of the stimulus indicating device 100 containing the swollen stimulus sensitive gel 110 and the shrunken stimulus sensitive gel 120 may be based on any type of stimulus sensitive gel that undergoes a phase transition upon exposure of the stimulus sensitive gel to a predetermined stimulus. The preferred types of stimulus sensitive gels include a polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 110 and 120 used in all the embodiments of the stimulus indicating device 100 discussed herein can be selected to occur with either cooling or heating beyond a specific stimulus. For example, some stimulus sensitive gels 110 and 120 such as and by way of example only, PAAm gels, collapse or shrink when cooled below a predetermined or trigger temperature, and are said to have an "Upper Critical Solution Temperature" or UCST. Conversely, other stimulus sensitive gels 110 and 120 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933 and incorporated herein by reference, the predetermined stimulus, such as temperature, at which a stimulus sensitive gel 110 and 120 undergoes its phase transition and changes volume, can be "tuned" to a particular value by adding salts, surfactants, or other substances to the gel matrix.

One of ordinary skill in the art will understand that although the stimulus sensitive gel 110 and 120 discussed herein in regard to all embodiments of the stimulus indicating device 100 may have been of the LCST type of gel, in that the swollen stimulus sensitive gel 110 collapsed or shrank to become the shrunken stimulus sensitive gel 120 upon exposure to its predetermined stimulus of a warmer temperature, the range and scope of this invention includes and envisions the swollen stimulus sensitive-gel 110 and the shrunken stimulus sensitive gel also being of the UCST type of gel. Moreover, it should be noted that all the variations of the different embodiments discussed herein can be combined with the variations of other embodiments described herein and that are known in the art, as would be understood to one of ordinary skill in the art.

At Least Two Compartments with a Neck Portion

Figure 2A:
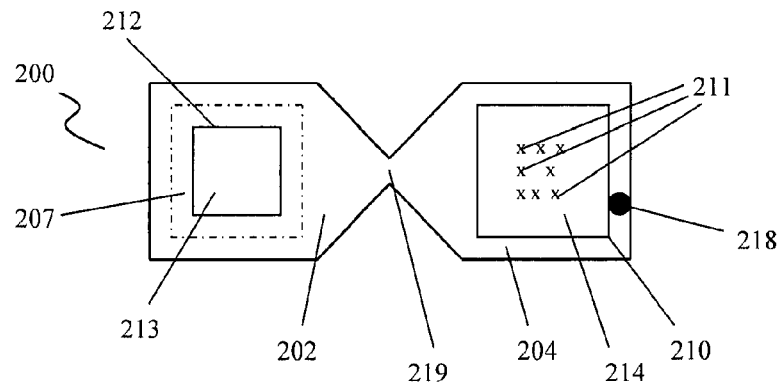
FIG. 2A is a top-down view of a multi-compartment embodiment of the invention before exposure to a predetermined stimulus extreme.
Figure 2B:
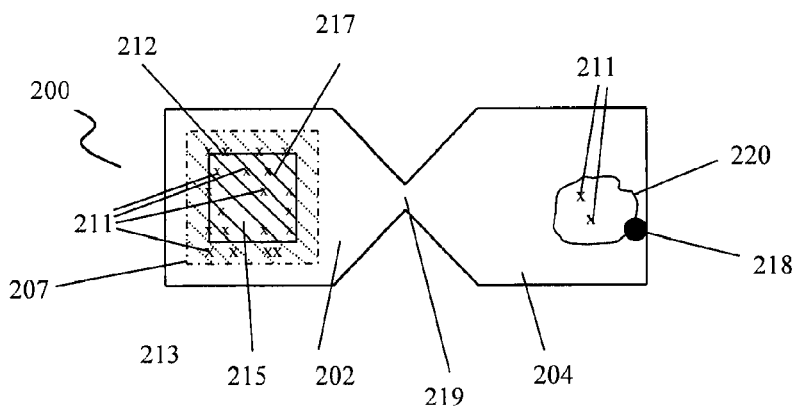
FIG. 2B is a top-down view of the multi-compartment embodiment in FIG. 2A after exposure to a predetermined stimulus extreme.
Figure 2C:
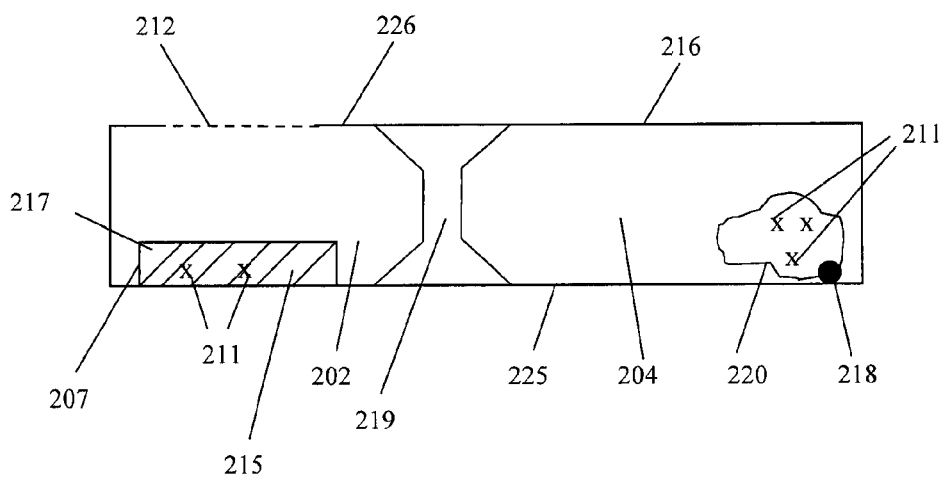
FIG. 2C is a side cross-sectional view of the multi-compartment embodiment in FIG. 2A after exposure to a predetermined stimulus extreme.
Figure 2D:
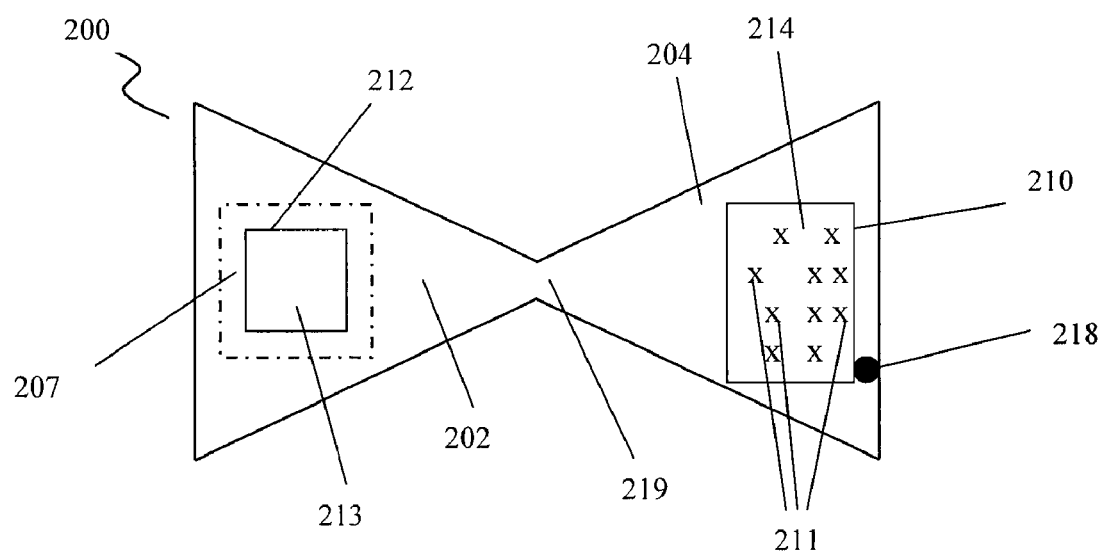
FIG. 2D is a top-down view of an alternate structure of the embodiment in FIG. 2A, before exposure to a predetermined stimulus extreme.

In an alternative embodiment, as shown in FIG. 2A and FIG. 2B, a multi-compartment device could be used to keep the color changing absorbent material 207 and the liquid 214 and constituent parts 211 contained in the swollen stimulus sensitive gel 210, separate from each other. More specifically, as shown in FIG. 2A and FIG. 2B, the color changing absorbent material 207 is in the first compartment 202 and can be viewed through an indicator window 212. The swollen stimulus sensitive gel 210 is in the second compartment 204. The first compartment 202 and the second compartment 204 are formed by the backing layer 225 on the bottom of the stimulus indicating device 200 and an upper layer 226 on the top of the stimulus indicating device 200, as shown in FIG. 2C. The first compartment 202 and the second compartment 204 are additionally formed and differentiated from one another by a nozzle portion 219 or a neck portion 219 or a constricting portion 219, or any combination thereof. Thus, the first compartment 202 and the second compartment 204 could be formed in the shape of an hourglass wherein the two compartments are connected by the neck portion 219, as shown in FIG. 2D, or the shape of two squares or rectangles connected by the neck portion 219 formed as a channel as shown in FIG. 2A. Other shapes are contemplated within the scope of the invention.

Prior to exposure to a predetermined stimulus, in this embodiment a swollen stimulus sensitive gel 210 is contained in only the second compartment 204. And prior to exposure of the stimulus indicating device 200 to a predetermined stimulus, the color changing absorbent material 207 is a first color 213, visible through the indicator window 212 or display portion 212.

Both the backing layer 225 and the upper layer 226 may be constructed of a strong, resilient leak-proof material, such as plastic or other polymer material, so as to provide for the twisting or bending that might occur during transportation of the stimulus sensitive product without tearing, breaking or leaking. The backing layer 225 and the upper layer 226 may also be made of a material that preferably allows them to be joined and sealed together, such as by heat stamping or other suitable means. The backing layer 225 and the upper layer 226 can both approximate the length and width of the first compartment 202, although variations in these dimensions are within the scope of the present invention. The upper layer 226 can preferably be made of a clear material, such as plastic, so that the user of the stimulus indicating device 200 can view at least some portion of the backing material or color changing absorbent material 207. The upper layer 226 can also be able to accept paint or ink so as to allow for coloring or concealing at least some portion of the first compartment 202.

Although some portion of the upper layer 226 can also accept paint or ink for coloring, it is preferable that the indicator window 212 portion of the upper layer 226 remain free from ink or coloring so that the user of the stimulus indicating device 200 can observe the first compartment 202 through the indicator window 212 as explained herein. The backing layer 225 should also be able to accept paste, glue or other suitable adhesive on the surface not facing the first compartment 202, so as to allow it to be directly or indirectly attached to a stimulus sensitive product.

By way of example only, the color changing absorbent material 207 could be cationic paper, litmus paper or any equivalent absorbent material that is reactive to a certain ion, element or similar substance. In regard to all the embodiments of the stimulus indicating device discussed herein being "reactive", what is meant is that the color changing absorbent material 207 should change its observable properties (by way of example only, its size, its color, etc.) in reaction to coming into contact with the constituent parts 211 expelled from the swollen stimulus sensitive gel 210 as described herein. Thus it is important that the color changing absorbent material 207 has both an affinity for the expelled liquid 215 and constituent parts 211 previously contained in, and expelled from, the swollen stimulus sensitive gel 210; and that at least a portion of the color changing absorbent material 207 changes properties upon coming into contact with the expelled liquid 215 and constituent parts 211, so as to change from a first color 213 to a second color 217. Preferably the color changing absorbent material 207 can operate in a semi-quantitative capacity.

In this alternative embodiment, the color changing absorbent material 207 is a divalent cationic paper that is reactive to constituent parts 211 such as by way of example only, divalent cations (by way of example only, $Mg^{2+}$ or $Ca^{2+}$). As discussed herein, a suitable color changing absorbent material 207, such as a total-hardness indicator paper or test stick will indicate a change from a first color 213 to a second color 217 upon exposure to constituent parts 211 carried by the expelled liquid 215 after both are expelled from the swollen stimulus sensitive gel 210. Examples of such divalent cationic paper that can be used as the color changing absorbent material 207 includes a total-hardness indicator paper or test stick that is available from Sigma-Aldrich under the tradename QUANTOF1X®, is manufactured by Macherey-Nagel under the trade name Aquadur®, and that changes color from blue to red upon coming into contact with expelled liquid 215 containing the constituent parts 211 (by way example only $Mg^{2+}$ or $Ca^{2+}$). Preferably the color changing absorbent material 207 operates in at least a semi-quantitative capacity.

As discussed herein, one method for incorporating the constituent parts 211 that are reactive with the color changing absorbent material 207 is to swell the swollen stimulus sensitive gel 210 in a bath containing constituent parts 211 that are specifically reactive with the selected color changing absorbent material 207, including by way of example only, divalent cation salts (by way of example only $Mg^{2+}$ or $Ca^{2+}$ salts), and/or varying concentrations of $H^+$.

In this alternative embodiment, as the swollen stimulus sensitive gel 210 undergoes its phase transition in reaction to exposure to a predetermined stimulus, its volume changes by collapsing or shrinking due at least to a portion of the liquid 214 and constituent parts 211 (by way of example only $Mg^{2+}$) contained in the polymer network of the swollen stimulus sensitive gel 210 being expelled. As the swollen stimulus sensitive gel 210 expels even a portion of the liquid 214 and the constituent parts 211, it collapses and shrinks so that it resembles the shrunken stimulus sensitive gel 220 shown in FIG. 2B. Once a portion of the liquid 214 and the constituent parts 211 are expelled from the swollen stimulus sensitive gel 210, the expelled liquid 215 and the expelled constituent parts 211 subsequently come into contact with and are absorbed by the color changing absorbent material 207.

Once the liquid 214 and the constituent parts 211 are expelled from the swollen stimulus sensitive gel 210, they pass through the neck portion 219 of the stimulus indicating device 200, they come into contact with and are absorbed by the color changing absorbent material 207. Because of the design of the color changing absorbent material 207, as the constituent parts 211 are absorbed by the color changing absorbent material 207, the color changing absorbent material 207 changes from a first color 213 to a second color 217 due to the reaction between chemical moieties on the color changing absorbent material 207 and the constituent parts 211 carried by the expelled liquid 215. Because of the design of the color changing absorbent material 207, at least part of the color changing absorbent material 207, and preferably all of the color changing absorbent material 207, will change from a first color 213 to a second color 217 upon coming into contact with the constituent parts 211.

Moreover, upon being absorbed by the color changing absorbent material 207, the constituent parts 211 are permanently bound to the color changing absorbent material 207 thereafter. Thus, even if the predetermined stimulus is removed and the expelled liquid 215 is subsequently reabsorbed by the shrunken stimulus sensitive gel 220 so as to become a partially or fully re-swollen stimulus sensitive gel 210, those constituent parts 211 remain bound to or trapped in the color changing absorbent material 207, and thus that color changing absorbent material 207 permanently remains colored the second color 217.

Although the decrease in volume of the swollen stimulus sensitive gel 210 in all of the embodiments of the stimulus indicating device 200 discussed herein can be by any amount so long as it is noticeable, preferably the decrease in volume of the swollen stimulus sensitive gel 210 would be between at least a 1/10 reduction in original volume, and up to a 500 times decrease in original volume. In regard to all embodiments of the stimulus indicating device 200 discussed herein as they pertain to the decrease in the volume being "noticeable" what is meant is that the volume change of the swollen stimulus sensitive gel 210 expels enough liquid 214 and constituent parts 211 to permanently cause at least a partial color change in the color changing absorbent material 207 from a first color 213 to a second color 217.

In an alternative of this embodiment with a neck portion, the color changing absorbent material 207 could be pH-indicator strips manufactured by EMD Chemicals Inc. These pH-indicator strips can react to and indicate exposure to constituent parts 211 such as and by way of example only, $H^+$ ions, by permanently changing from a first color 213 to a second color 217. Preferably the pH-indicator strips are manufactured in such a way that there is a noticeable spectrum of colors that match the range of possible pH concentrations. For example, the first color 213 of the color changing absorbent material 207 could be colored red prior to the stimulus indicating device 200 being exposed to a predetermined stimulus. Then upon exposure to the predetermined stimulus, the swollen stimulus sensitive gel 210 would expel liquid 214 and constituent parts 211 (by way of example only $H^+$) which, upon contact with the color changing absorbent material 207, causes the color changing absorbent material 207 to change to a second color 217, such as blue. Altering the pH of the expelled liquid 215 and the content of the constituent parts 211 (by way of example only $H^+$) will allow the first color 213 and second color 217 of the color changing absorbent material 207 to be manipulated. For example, if the swollen stimulus sensitive gel 210 was manufactured so that it was swollen with an aqueous solution of either high pH (for example a pH of 14), or low pH (for example a pH of 1), the most significant color contrast can be achieved between the first color 213 and second color 217 of the color changing absorbent material 207.

As shown in FIG. 2A and discussed herein, this embodiment of the irreversible stimulus indicating device 200 would have at least two compartments 202 and 204. In this alternative embodiment the color changing absorbent material 207 is preferably located within the first compartment 202 and is positioned below the indicator window 212, so that at least a portion of the color changing absorbent material 207 can be seen through the indicator window 212. Preferably the swollen stimulus sensitive gel 210 is located in the second compartment 204 and is kept separate from the color changing absorbent material 207 by the neck portion 219. Although the swollen stimulus sensitive gel 210 is preferably hidden from the user below the paint applied to the top portion 216 of the stimulus sensitive device 200, it could also be visible to the user. If the swollen stimulus sensitive gel 210 were visible to the user, it is preferred that it be the same color as the color changing absorbent material 207 prior to the color changing absorbent material 207 coming into contact with the constituent pacts 211.

If the color changing absorbent material 207 has the ability to wick liquid 214 and/or constituent parts 211 from the swollen stimulus sensitive gel 210 simply by the color changing absorbent material 207 being in contact with the swollen stimulus sensitive gel 210, then it is preferred that the neck portion 219 be used to keep the color changing absorbent material 207 and the swollen stimulus sensitive gel 210 physically apart from each other. Thus, in this alternative embodiment the swollen stimulus sensitive gel 210 is physically separated from the color changing absorbent material 207 by the neck portion 219 to prevent the liquid 214 and the constituent parts 211 contained in the swollen stimulus sensitive gel 210 from being wicked into the color changing absorbent material 207. Doing so prevents the stimulus sensitive device 200 from giving a false indication of exposure to a predetermined stimulus.

Although employing an embodiment with a neck portion 219 reduces, or depending on the size of the shrunken stimulus sensitive gel 220, eliminates the need for attaching or securing the stimulus sensitive gel 210 and 220 within the stimulus indicating device 200, it may still be preferable for the stimulus sensitive gel 210 and 220 to be fixed or secured at the attachment point 218 in the second compartment. 204, or at more than one attachment point if desired. Preferably, the stimulus sensitive gel 210 and 220 would be fixed or secured at the attachment point 218, or at more than one attachment point if desired. The stimulus sensitive gel 210 and 220 may be fixed to the attachment point 218 with a suitable epoxy, glue, or it could be heat stamped upon creation of the stimulus indicating device 200. Attaching the stimulus sensitive gel 210 and 220 to the attachment point 218 helps to ensure that the stimulus sensitive gel 210 and 220 collapses or shrinks in a desired direction—preferably away from the color changing absorbent material 207 and the indicator window 212. Moreover, by securing or fixing the stimulus sensitive gel 210 and 220 to the attachment point ensures that the stimulus sensitive gel 210 and 220 does not cover the color changing absorbent material 207 after it had changed from a first color to a second color. Securing or fixing the stimulus sensitive gel 210 and 220 to the attachment point 218 prevents the stimulus sensitive gel 210 and 220 from floating or moving within the compartment and covering up the color changing absorbent material 207 at all times.

All embodiments discussed herein of the stimulus indicating device 200 containing the swollen stimulus sensitive gel 210 and the shrunken stimulus sensitive gel 220 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 210 and 220 used in all the embodiments of the stimulus indicating device 200 discussed herein can be made to occur with either heating or cooling beyond a specific stimulus. For example, some stimulus sensitive gels 210 and 220 such as and by way of example only, PAAm gels, collapse or shrink when cooled below a predetermined or trigger temperature, and are said to have an "Upper Critical Solution Temperature" or UCST. Conversely, other stimulus sensitive gels 210 and 220 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933, the predetermined stimulus, such as temperature at which a stimulus sensitive gel 210 and 220 undergoes its phase transition and changes volume, can be "tuned" to a particular value by adding salts, surfactants, or other substances to the gel matrix.

One of ordinary skill in the art will understand that although the stimulus sensitive gel 210 and 220 discussed herein in regard to all embodiments of the stimulus indicating device 200 may have been of the LCST type of gel, in that the swollen stimulus sensitive gel 210 collapsed or shrank to become the shrunken stimulus sensitive gel 220 upon exposure to its predetermined stimulus of a warmer temperature, the range and scope of this invention includes and envisions the swollen stimulus sensitive gel 210 and the shrunken stimulus sensitive gel also being of the UCST type of gel. Moreover, it should be noted that all the variations of the different embodiments discussed herein can be combined with the variations of other embodiments described herein and that are known in the art, as would be understood to one of ordinary skill in the art.

At Least Two Compartments with a Permeable Membrane

Figure 3A:
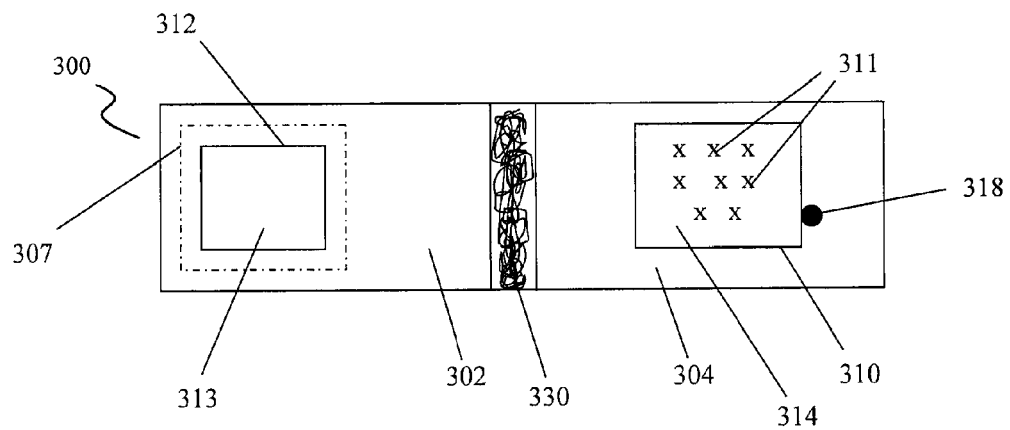
FIG. 3A is a top view of a multi-compartment embodiment of the invention wherein the compartments are connected by a membrane, before exposure to a predetermined stimulus.
Figure 3B:
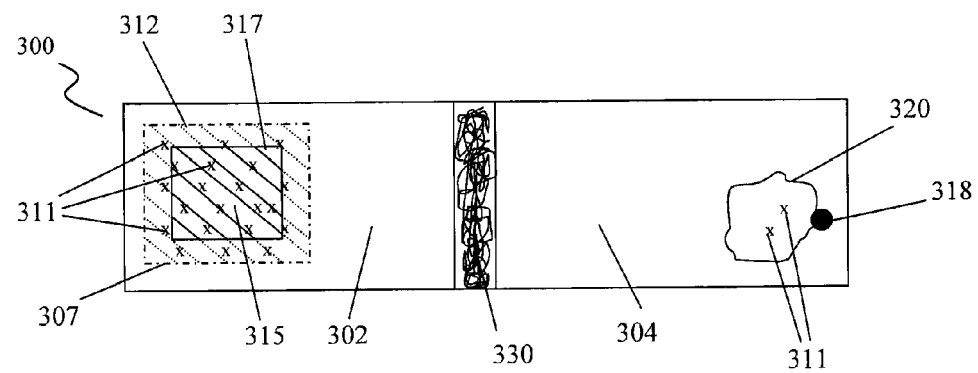
FIG. 3B is a top view of a multi-compartment embodiment of the invention in FIG. 3A after exposure to a predetermined stimulus extreme.

In an alternative embodiment, as shown in FIG. 3A and. FIG. 3B, a multi-compartment device could be used to keep the color changing absorbent material 307 and the liquid 314 and constituent parts 311 contained in the swollen stimulus sensitive gel 310, separate from each other. More specifically, as shown in FIG. 3A and FIG. 3B, the color changing absorbent material 307 is in the first compartment 302 and can be viewed through an indicator window 312. The swollen stimulus sensitive gel 310 is in the second compartment 304. The first compartment 302 and the second compartment 304 are formed by the backing layer 325 on the bottom of the stimulus indicating device 300 and an upper layer 326 on the top of the stimulus indicating device 300. The first compartment 302 and the second compartment 304 are additionally formed and differentiated from one another by a permeable membrane 330. The permeable membrane is designed to allow the expelled liquid 315 and constituent parts 311 to pass from the second compartment 304 into the first compartment 302, and from the first compartment 302 to the second compartment 304.

Figure 3C:
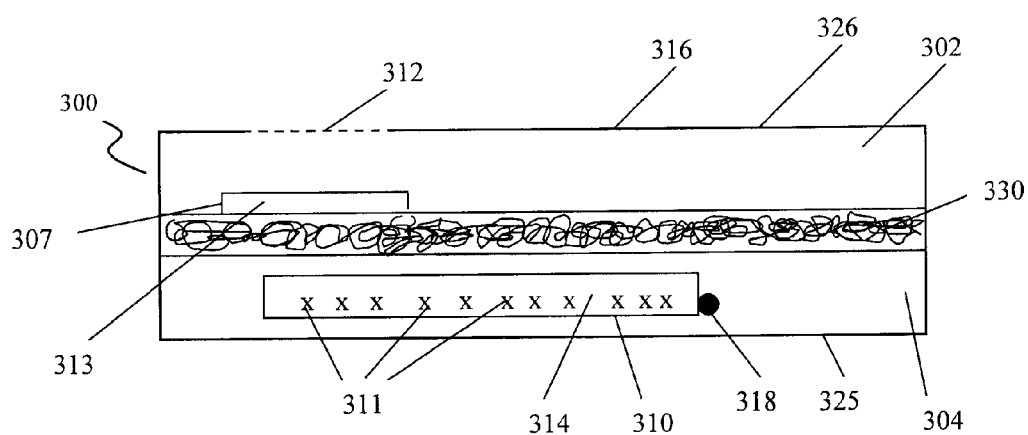
FIG. 3C is a side cross-sectional view of an alternate structure of the embodiment in FIG. 3A, before exposure to a predetermined stimulus extreme.

Alternately, as shown in FIG. 3C an alternate embodiment could position the first compartment 302 above the second compartment 304 separated by the permeable membrane 330. Other shapes are contemplated within the scope of the invention as previously described in prior applications.

Prior to exposure to a predetermined stimulus, in this embodiment a swollen stimulus sensitive gel 310 is contained in only the second compartment 304. And prior to exposure of the stimulus indicating device 300 to a predetermined stimulus, the color changing absorbent material 307 is a first color 313, visible through the indicator window 312 or display portion 312.

Both the backing layer 325 and the upper layer 326 may be constructed of a strong, resilient leak-proof material, such as plastic or other polymer material, so as to provide for the twisting or bending that might occur during transportation of the stimulus sensitive product without tearing, breaking or leaking. The backing layer 325 and the upper layer 326 may also be made of a material that preferably allows them to be joined and sealed together, such as by heat stamping or other suitable means. The backing layer 325 and the upper layer 326 can both approximate the length and width of the first compartment 302, although variations in these dimensions are within the scope of the present invention. The upper layer 326 can preferably be made of a clear material, such as plastic, so that the user of the stimulus indicating device 300 can view at least some portion of the backing material or color changing absorbent material 307. The upper layer 326 can also be able to accept paint or ink so as to allow for coloring or concealing at least some portion of the first compartment 302.

Although some portion of the upper layer 326 can also accept paint or ink for coloring, it is preferable that the indicator window 312 portion of the upper layer 326 remain free from ink or coloring so that the user of the stimulus indicating device 300 can observe the first compartment 302 through the indicator window 312 as explained herein. The backing layer 325 should also be able to accept paste, glue or other suitable adhesive on the surface not facing the first compartment 302, so as to allow it to be directly or indirectly attached to a stimulus sensitive product.

By way of example only color changing absorbent material 307 could be cationic paper, litmus paper or any equivalent absorbent material that is reactive to a certain ion, element or similar substance. In regard to all the embodiments of the stimulus indicating device discussed herein being "reactive", what is meant is that the color changing absorbent material 307 should change its observable properties (by way of example only, its size, its color, etc.) in reaction to coating into contact with the constituent parts 311 expelled from the swollen stimulus sensitive gel 310 as described herein. Thus it is important that the color changing absorbent material 307 has both an affinity for the expelled liquid 315 and constituent parts 311 previously contained in, and expelled from, the swollen stimulus sensitive gel 310; and that at least a portion of the color changing absorbent material 307 changes properties upon coming into contact with the expelled liquid 315 and constituent parts 311, so as to change from a first color 313 to a second color 317. Preferably the color changing absorbent material 307 can operate in a semi-quantitative capacity.

In this alternative embodiment, the color changing absorbent material 307 is a divalent cationic paper that is reactive to constituent parts 311 such as by way of example only, divalent cations (by way of example only, $Mg^{2+}$ or $Ca^{2+}$). As discussed herein, a suitable color changing absorbent material 307, such as a total-hardness indicator paper or test stick will indicate a change from a first color 313 to a second color 317 upon exposure to constituent parts 311 carried by the expelled liquid 315 after both are expelled from the swollen stimulus sensitive gel 310. Examples of such divalent cationic paper that can be used as the color changing absorbent material 307 includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid 315 containing the constituent parts 311 (by way of example only, $Mg^{2+}$ or $Ca^{2+}$). Preferably the color changing absorbent material 307 operates in at least a semi-quantitative capacity.

As discussed herein, one method for incorporating the constituent parts 311 that are reactive with the color changing absorbent material 307 is to swell the swollen stimulus sensitive gel 310 in a bath containing constituent parts 311 that are specifically reactive with the selected color changing absorbent material 307, including by way of example only, divalent cation salts (by way of example only $Mg^{2+}$ or $Ca^{2+}$ salts), and/or varying concentrations of $H^+$.

In this alternative embodiment, as the swollen stimulus sensitive gel 310 undergoes its phase transition in reaction to exposure to a predetermined stimulus, its volume changes by collapsing or shrinking due at least to a portion of the liquid 314 and constituent parts 311 (by way of example only $Mg^{2+}$) contained in the polymer network of the swollen stimulus sensitive gel 310 being expelled. As the swollen stimulus sensitive gel 310 expels even a portion of the liquid 314 and the constituent parts 311, it collapses and shrinks so that it resembles the shrunken stimulus sensitive gel 320 shown in FIG. 3B. Once a portion of the liquid 314 and the constituent parts 311 are expelled from the swollen stimulus sensitive gel 310, the expelled liquid 315 and the expelled constituent parts 311 subsequently come into contact with and are absorbed by the color changing absorbent material 307.

Once the liquid 314 and the constituent parts 311 are expelled from the swollen stimulus sensitive gel 310, they pass through the permeable membrane 330 of the stimulus indicating device 300, they come into contact with and are absorbed by the color changing absorbent material 307. Because of the design of the color changing absorbent material 307, as the constituent parts 311 are absorbed by the color changing absorbent material 307, the color changing absorbent material 307 changes from a first color 313 to a second color 317 due to the reaction between chemical moieties on the color changing absorbent material 307 and the constituent parts 311 carried by the expelled liquid 315. Because of the design of the color changing absorbent material 307, at least part of the color changing absorbent material 307, and preferably all of the color changing absorbent material 307 will change from a first color 313 to a second color 317 upon coming into contact with the constituent parts 311.

Moreover, upon being absorbed by the color changing absorbent material 307, the constituent parts 311 are permanently bound to the color changing absorbent material 307 thereafter. Thus, even if the predetermined stimulus is removed and the expelled liquid 315 is subsequently reabsorbed by the shrunken stimulus sensitive gel 320 so as to become a partially or fully re-swollen stimulus sensitive gel 310, those constituent parts 311 remain bound to or trapped in the color changing absorbent material 307, and thus that color changing absorbent material 307 permanently remains colored the second color 317.

It should be noted that by manipulating the permeability of the permeable membrane 330 connecting the first compartment 302 to the second compartment 304, the time required for the expelled liquid 315 to move from the second compartment 304 into the first compartment 302 can be varied. Such manipulation of the permeable membrane 330 includes increasing or decreasing its thickness and/or increasing or decreasing its surface area facing the first compartment 302 and/or second compartment 304 and/or increasing or, decreasing its wicking ability, so as to control the speed at which the expelled liquid 315 and the constituent parts 311 travel from the second compartment 304, through the permeable membrane 330, and enter the first compartment 302.

An advantage of using such an embodiment of the stimulus indicating device 300 is that both the exposure to a predetermined stimulus as well as the time of exposure can be indicated. As an example, if the predetermined stimulus occurs for just a short period of time, and is removed before the expelled liquid 315 and constituent parts 311 have completely moved from the second compartment 304 through the permeable membrane 330 and into the first compartment 302, then the expelled liquid 315 and constituent parts 311 will be wicked or drawn back into the second compartment 304 by the shrunken stimulus sensitive gel 320 as the shrunken stimulus sensitive gel 320 re-expands or swells as a result of undergoing hysteresis or simply removing the predetermined stimulus. The reason this happens is because the permeable membrane 330 allows the expelled liquid and expelled constituent parts to pass in both directions. And so in this case, no irreversible indication of exposure to the predetermined stimulus will be indicated by color changing absorbent material 307 because the time of exposure to the predetermined stimulus was too brief to enable enough expelled liquid 315 and enough constituent parts 311 to pass completely through the permeable membrane 330, react with the color changing absorbent material 307, and cause it to change from a first color 313 to a second color 317.

Although the decrease in volume of the swollen stimulus sensitive gel 310 in all of the embodiments of the stimulus indicating device 300 discussed herein can be by any amount so long as it is noticeable, preferably the decrease in volume of the swollen stimulus sensitive gel 310 would be between at least a 1/10 reduction in original volume, and up to a 500 times decrease in original volume. In regard to all embodiments of the stimulus indicating device 300 discussed herein as they pertain to the decrease in the volume being "noticeable" what is meant is that the volume change of the swollen stimulus sensitive gel 310 expels enough liquid 314 and constituent parts 311 to permanently cause at least a partial color change in the color changing absorbent material 307 from a first color 313 to a second color 317.

In an alternative of this embodiment with a permeable membrane 330, the color changing absorbent material 307 could be pH-indicator strips manufactured by EMD Chemicals Inc. These pH-indicator strips can react to and indicate exposure to constituent parts 311 such as and by way of example only, $H^+$ ions, by permanently changing from a first color 313 to a second color 317. Preferably the pH-indicator strips are manufactured in such a way that there is a noticeable spectrum of colors that match the range of possible pH concentrations. For example, the first color 313 of the color changing absorbent material 307 could be colored red prior to the stimulus indicating device 300 being exposed to a predetermined stimulus. Then upon exposure to the predetermined stimulus, the swollen stimulus sensitive gel 310 would expel liquid 314 and constituent parts 311 (by way of example only $H^+$) which, upon contact with the color changing absorbent material 307, causes the color changing absorbent material 307 to change to a second color 317, such as blue. Altering the pH of the expelled liquid 315 and the content of the constituent parts 311 (by way of example only $H^+$) will allow the first color 313 and second color 317 of the color changing absorbent material 307 to be manipulated. For example, if the swollen stimulus sensitive gel 310 was manufactured so that it was swollen with an aqueous solution of either high pH (for example a pH of 14), or low pH (for example a pH of 1), the most significant color contrast can be achieved between the first color 313 and second color 317 of the color changing absorbent material 307.

As shown in FIG. 3A and discussed herein, this embodiment of the irreversible stimulus indicating device 300 would have at least two compartments 302 and 304. In this alternative embodiment the color changing absorbent material 307 is preferably located within the first compartment 302 and is positioned below the indicator window 312, so that at least a portion of the color changing absorbent material 307 can be seen through the indicator window 312. Preferably the swollen stimulus sensitive gel 310 is located in the second compartment 304 and is kept separate from the color changing absorbent material 307 by the permeable membrane 330. Although the swollen stimulus sensitive gel 310 is preferably hidden from the user below the paint applied to the top portion 316 of the stimulus sensitive device 300, it could also be visible to the user. If the swollen stimulus sensitive gel 310 were visible to the user, it is preferred that it be the same color as the color changing absorbent material 307 prior to the color changing absorbent material 307 coming into contact with the constituent parts 311. If the color changing absorbent material 307 has the ability to wick liquid 314 and/or constituent parts 311 from the swollen stimulus sensitive gel 310 simply by the color changing absorbent material 307 being in contact with the swollen stimulus sensitive gel 310, then it is preferred that the permeable membrane 330 be used to keep the color changing absorbent material 307 and the swollen stimulus sensitive gel 310 physically apart from each other. Thus, in this alternative embodiment the swollen stimulus sensitive gel 310 is physically separated from the color changing absorbent material 307 by the permeable membrane 330 to prevent the liquid 314 and the constituent parts 311 contained in the swollen stimulus sensitive gel 310 from being wicked into the color changing absorbent material 307. Doing so prevents the stimulus sensitive device 300 from giving a false indication of exposure to a predetermined stimulus.

Although employing an embodiment with a permeable membrane 330 reduces, or depending on the size of the shrunken stimulus sensitive gel 320, eliminates the need for attaching or securing the stimulus sensitive gel 310 and 320 within the stimulus indicating device 300, it may still be preferable for the stimulus sensitive gel 310 and 320 to be fixed or secured at the attachment point 318 in the second compartment 304, or at more than one attachment point if desired. Preferably, the stimulus sensitive gel 310 and 320 would be fixed or secured at the attachment point 318, or at more than one attachment point if desired. The stimulus sensitive gel 310 and 320 may be fixed to the attachment point 318 with a suitable epoxy, glue, or it could be heat stamped upon creation of the stimulus indicating device 300. Attaching the stimulus sensitive gel 310 and 320 to the attachment point 318 helps to ensure that the stimulus sensitive gel 310 and 320 collapses or shrinks in a desired direction—preferably away from the color changing absorbent material 307 and the indicator window 312. Moreover, by securing or fixing the stimulus sensitive gel 310 and 320 to the attachment point ensures that the stimulus sensitive gel 310 and 320 does not cover the color changing absorbent material 307 after it had changed from a first color to a second color. Securing or fixing the stimulus sensitive gel 310 and 320 to the attachment point 318 prevents the stimulus sensitive gel 310 and 320 from floating or moving within the compartment and covering up the color changing absorbent material 307 at all times.

All embodiments discussed herein of the stimulus indicating device 300 containing the swollen stimulus sensitive gel 310 and the shrunken stimulus sensitive gel 320 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 310 and 320 used in all the embodiments of the stimulus indicating device 300 discussed herein can be made to occur with either heating or cooling beyond a specific stimulus. For example, some stimulus sensitive gels 310 and 320 such as and by way of example only, PAAm gels, collapse or shrink when cooled below a predetermined or trigger temperature, and are said to have an "Upper Critical Solution Temperature" or UCST. Conversely, other stimulus sensitive gels 310 and 320 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933, the predetermined stimulus, such as temperature at which a stimulus sensitive gel 310 and 320 undergoes its phase transition and changes volume, can be "tuned" to a particular value by adding salts, surfactants, or other substances to the gel matrix.

One of ordinary skill in the art will understand that although the stimulus sensitive gel 310 and 320 discussed herein in regard to all embodiments of the stimulus indicating device 300 may have been of the LCST type of gel, in that the swollen stimulus sensitive gel 310 collapsed or shrank to become the shrunken stimulus sensitive gel 320 upon exposure to its predetermined stimulus of a warmer temperature, the range and scope of this invention includes and envisions the swollen stimulus sensitive gel 310 and the shrunken stimulus sensitive gel also being of the UCST type of gel. Moreover, it should be noted that all the variations of the different embodiments discussed herein can be combined with, the variations of other embodiments described herein and that are known in the art, as would be understood to one of ordinary skill in the art.

At Least Two Compartments with a Semi-Permeable Membrane

Figure 4A:
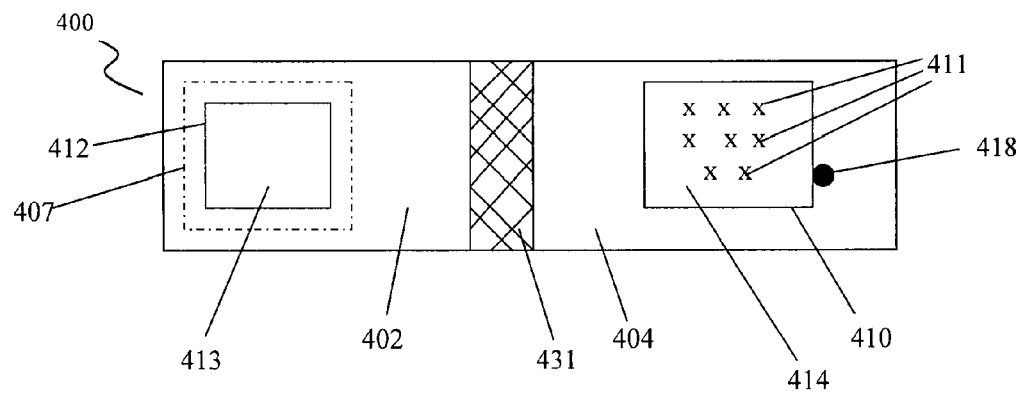
FIG. 4A is a top view of a multi-compartment embodiment of the invention wherein the compartments are connected by a membrane portion, before exposure to a predetermined stimulus.
Figure 4B:
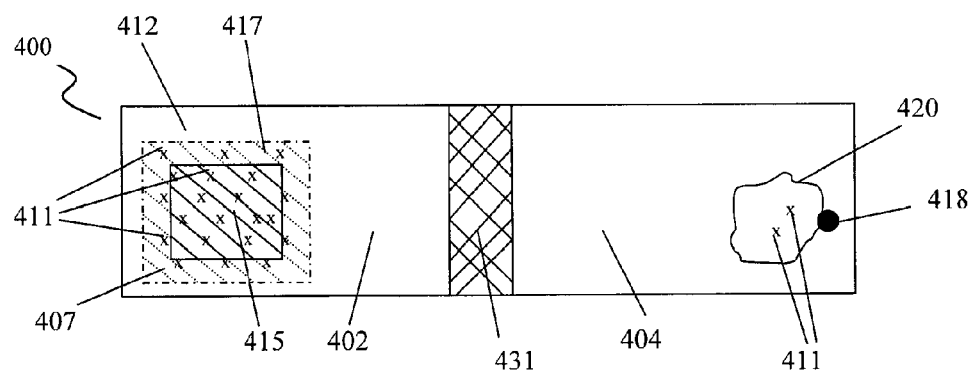
FIG. 4B is a top view of a multi-compartment embodiment of the invention in FIG. 4A after exposure to a predetermined stimulus extreme.

In an alternative embodiment, as shown in FIG. 4A and FIG. 4B, a multi-compartment device could be used to keep the color changing absorbent material 407 and the liquid 414 and constituent parts 411 contained in the swollen stimulus sensitive gel 410, separate from each other. More specifically, as shown in FIG. 4A and FIG. 4B, the color changing absorbent material 407 is in the first compartment 402 and can be viewed through an indicator window 412. The swollen stimulus sensitive gel 410 is in the second compartment 404. The first compartment 402 and the second compartment 404 are formed by the backing layer 425 on the bottom of the stimulus indicating device 400 and an upper layer 426 on the top of the stimulus indicating device 400. The first compartment 402 and the second compartment 404 are additionally formed and differentiated from one another by a semi-permeable membrane 431. The semi-permeable membrane is designed to allow the expelled liquid 415 and constituent parts 411 to pass from the second compartment 404 into the first compartment 402, but as explained herein, only allow the expelled liquid 415 to return to the second compartment 404 from the first compartment 404, thereby trapping the constituent parts 411 in the first compartment 402.

Figure 4C:
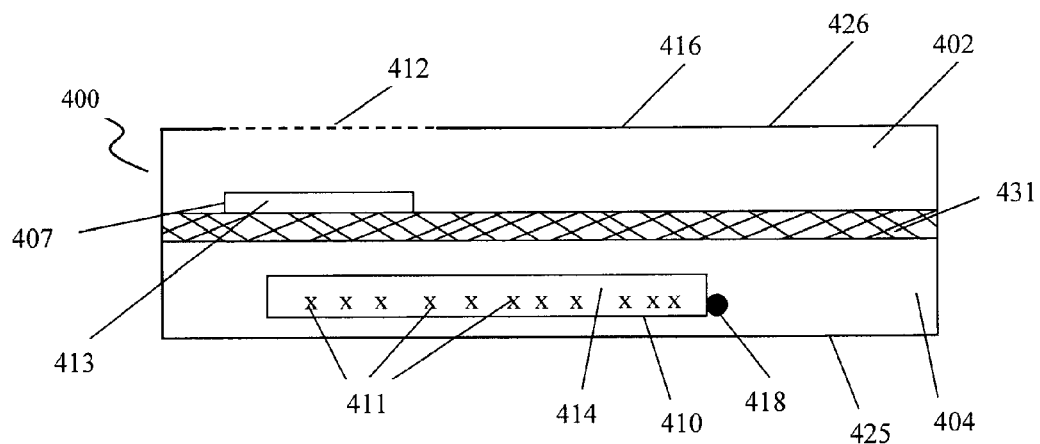
FIG. 4C is a side cross-sectional view of an alternate structure of the embodiment in FIG. 4A before exposure to a predetermined stimulus extreme.

As shown in FIG. 4C an alternate embodiment could position the first compartment 402 above the second compartment 404 separated by the semi-permeable membrane 431. Other shapes are contemplated within the scope of the invention as previously described in prior applications.

Prior to exposure to a predetermined stimulus, in this embodiment a swollen stimulus sensitive gel 410 is contained in only the second compartment 404. And prior to exposure of the stimulus indicating device 400 to a predetermined stimulus, the color changing absorbent material 407 is a first color 413, visible through the indicator window 412 or display portion 412.

Both the backing layer 425 and the upper layer 426 may be constructed of a strong, resilient leak-proof material, such as plastic or other polymer material, so as to provide for the twisting or bending that might occur during transportation of the stimulus sensitive product without tearing, breaking or leaking. The backing layer 425 and the upper layer 426 may also be made of a material that preferably allows them to be joined and sealed together, such as by heat stamping or other suitable means. The backing layer 425 and the upper layer 426 can both approximate the length and width of the first compartment 402, although variations in these dimensions are within the scope of the present invention. The upper layer 426 can preferably be made of a clear material, such as plastic, so that the user of the stimulus indicating device 400 can view at least some portion of the backing material or color changing absorbent material 407. The upper layer 426 can also be able to accept paint or ink so as to allow for coloring or concealing at least some portion of the first compartment 402.

Although some portion of the upper layer 426 can also accept paint or ink for coloring, it is preferable that the indicator window 412 portion of the upper layer 426 remain free from ink or coloring so that the user of the stimulus indicating device 400 can observe the first compartment 402 through the indicator window 412 as explained herein. The backing layer 425 should also be able to accept paste, glue or other suitable adhesive on the surface not facing the first compartment 402, so as to allow it to be directly or indirectly attached to a stimulus sensitive product.

By way of example only, the color changing absorbent material 407 could be cationic paper, litmus paper or any equivalent absorbent material that is reactive to a certain ion, element or similar substance. In regard to all the embodiments of the stimulus indicating device discussed herein being "reactive", what is meant is that the color changing absorbent material 407 should change its observable properties (by way of example only, its size, its color, etc.) in reaction to coming into contact with the constituent parts 411 expelled from the swollen stimulus sensitive gel 410 as described herein. Thus it is important that the color changing absorbent material 407 has both an affinity for the expelled liquid 415 and constituent parts 411 previously contained in, and expelled from, the swollen stimulus sensitive gel 410; and that at least a portion of the color changing absorbent material 407 changes properties upon coming into contact with the expelled liquid 415 and constituent parts 411, so as to change from a first color 413 to a second color 417. Preferably the color changing absorbent material 407 can operate in a semi-quantitative capacity.

In this alternative embodiment, the color changing absorbent material 407 is a divalent cationic paper that is reactive to constituent parts 411 such as by way of example only, divalent cations (by way of example only, $Mg^{2+}$ or $Ca^{2+}$). As discussed herein, a suitable color changing absorbent material 407, such as a total-hardness indicator paper or test stick will indicate a change from a first color 413 to a second color 417 upon exposure to constituent parts 411 carried by the expelled liquid 415 after both are expelled from the swollen stimulus sensitive gel 410. Examples of such divalent cationic paper that can be used as the color indicator absorbent material 407 includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid 415 containing the constituent parts 411 (by way of example only, $Mg^{2+}$ or $Ca^{2+}$). Preferably the color changing absorbent material 407 operates in at least a semi-quantitative capacity.

As discussed herein, one method for incorporating the constituent parts 411 that are reactive with the color changing absorbent material 407 is to swell the swollen stimulus sensitive gel 410 in a bath containing constituent parts 411 that are specifically reactive with the selected color changing absorbent material 407, including by way of example only, divalent cation salts (by way of example only $Mg^{2+}$ or $Ca^{2+}$ salts), and/or varying concentrations of $H^+$.

In this alternative embodiment, as the swollen stimulus sensitive gel 410 undergoes its phase transition in reaction to exposure to a predetermined stimulus, its volume changes by collapsing or shrinking due at least to a portion of the liquid 414 and constituent parts 411 (by way of example only $Mg^{2+}$) contained in the polymer network of the swollen stimulus sensitive gel 410 being expelled. As the swollen stimulus sensitive gel 410 expels even a portion of the liquid 414 and the constituent parts 411, it collapses and shrinks so that it resembles the shrunken stimulus sensitive gel 420 shown in FIG. 4B. Once a portion of the liquid 414 and the constituent parts 411 are expelled from the swollen stimulus sensitive gel 410, the expelled liquid 415 and the expelled constituent parts 411 subsequently come into contact with and are absorbed by the color changing absorbent material 407.

Once the liquid 414 and the constituent parts 411 are expelled from the swollen stimulus sensitive gel 410, they pass through the semi-permeable membrane 431 of the stimulus indicating device 400, they come into contact with and are absorbed by the color changing absorbent material 407. Because of the design of the color changing absorbent material 407, as the constituent parts 411 are absorbed by the color changing absorbent material 407, the color changing absorbent material 407 changes from a first color 413 to a second color 417 due to the reaction between chemical moieties on the color changing absorbent material 407 and the constituent parts 411 carried by the expelled liquid 415. Because of the design of the color changing absorbent material 407, at least part of the color changing absorbent material 407, and preferably all of the color changing absorbent material 407, will change from a first color 413 to a second color 417 upon coming into contact with the constituent parts 411.

Moreover, upon being absorbed by the color changing absorbent material 407, the constituent parts 411 are permanently bound to the color changing absorbent material 407 thereafter. Thus, even if the predetermined stimulus is removed and the expelled liquid 415 is subsequently reabsorbed by the shrunken stimulus sensitive gel 420 so as to become a partially or fully re-swollen stimulus sensitive gel 410, those constituent parts 411 remain bound to or trapped in the color changing absorbent material 407, and thus that color changing absorbent material 407 permanently remains colored the second color 417.

It should be noted that by manipulating the permeability of the semi-permeable membrane 431 connecting the first compartment 402 to the second compartment 404, the time required for the expelled liquid 415 to move from the second compartment 404 into the first compartment 402 can be varied. Such manipulation of the semi-permeable membrane 431 includes increasing or decreasing its thickness and/or increasing or decreasing its surface area facing the first compartment 402 and/or second compartment 404 and/or increasing or decreasing its wicking ability, so as to control the speed at which the expelled liquid 415 and the constituent parts 411 travel from the second compartment 404, through the semi-permeable membrane 431, and enter the first compartment 402.

There is a difference between the permeable membrane 330 discussed herein and depicted in at least FIG. 3A and FIG. 3B, and the semi-permeable membrane 431 discussed herein and depicted in at least FIG. 4A and FIG. 4B, that needs to be appreciated. The permeable membrane 330 allows the expelled liquid 315 and constituent parts 311 to repeatedly travel freely from the second compartment 304 into the first compartment 302, and then back again into the second compartment 304. In comparison, the semi-permeable membrane 431 would preferably be designed so that it not only allows the constituent parts 411 (by way of example only, the Mg2+) contained in the expelled liquid 415 to pass from the at least second compartment 404 into the first compartment 402, but it would prevent the constituent parts 411 (by way of example only, the Mg2+) from passing back into the at least second compartment 404 from the first compartment 402. The semi-permeable membrane 431 could also prohibit the expelled liquid 415 from traveling back into the second compartment 404, but doing so is not as important as trapping the constituent parts 411 in the first compartment 402.

An advantage of using such an embodiment of the stimulus indicating device 400 is that both the exposure to a predetermined stimulus as well as the time of exposure can be indicated. As an example, if the predetermined stimulus occurs for just a short period of time, and is removed before the expelled liquid 415 and constituent parts 411 have completely moved from the second compartment 404 through the semi-permeable membrane 431 and into the first compartment 402, semi-permeable membrane 431 will not allow the expelled liquid 415 and constituent parts 411 to be wicked or drawn back into the second compartment 404 by the shrunken stimulus sensitive gel 420 as the shrunken stimulus sensitive gel 420 re-expands or swells as a result of the predetermined stimulus being removed.

The reason this happens is because the semi-permeable membrane 431 does not allow the expelled liquid 415 and expelled constituent parts 411 to pass in both directions. And so in this case, an irreversible indication of exposure to the predetermined stimulus will be indicated by color changing absorbent material 407, even though the entire amount of constituent parts 411 did not pass entirely through the semi-permeable membrane 431, react with the color changing absorbent material 407, and cause it to change from a first color 413 to a second color 417.

Although the decrease in volume of the swollen stimulus sensitive gel 410 in all of the embodiments of the stimulus indicating device 400 discussed herein can be by any amount so long as it is noticeable, preferably the decrease in volume of the swollen stimulus sensitive gel 410 would be between at least a 1/10 reduction in original volume, and up to a 500 times decrease in original volume. In regard to all embodiments of the stimulus indicating device 400 discussed herein as they pertain to the decrease in the volume being "noticeable" what is meant is that the volume change of the swollen stimulus sensitive gel 410 expels enough liquid 414 and constituent parts 411 to permanently cause at least a partial color change in the color changing absorbent material 407 from a first color 413 to a second color 417.

In an alternative of this embodiment with a semi-permeable membrane 431, the color changing absorbent material 407 could be pH-indicator strips manufactured by EMD Chemicals Inc. These pH-indicator strips can react to and indicate exposure to constituent parts 411 such as and by way of example only, $H^+$ ions, by permanently changing from a first color 413 to a second color 417. Preferably the pH-indicator strips are manufactured in such a way that there is a noticeable spectrum of colors that match the range of possible pH concentrations. For example, the first color 413 of the color changing absorbent material 407 could be colored red prior to the stimulus indicating device 400 being exposed to a predetermined stimulus. Then upon exposure to the predetermined stimulus, the swollen stimulus sensitive gel 410 would expel liquid 414 and constituent parts 411 (by way of example only $H^+$) which, upon contact with the color changing absorbent material 407, causes the color changing absorbent material 407 to change to a second color 417, such as blue. Altering the pH of the expelled liquid 415 and the content of the constituent parts 411 (by way of example only $H^+$) will allow the first color 413 and second color 417 of the color changing absorbent material 407 to be manipulated. For example, if the swollen stimulus sensitive gel 410 was manufactured so that it was swollen with an aqueous solution of either high pH (for example a pH of 14), or low pH (for example a pH of 1), the most significant color contrast can be achieved between the first color 413 and second color 417 of the color changing absorbent material 407.

As shown in FIG. 4A and discussed herein; this embodiment of the irreversible stimulus indicating device 400 would have at least two compartments 402 and 404. In this alternative embodiment the color changing absorbent material 407 is preferably located within the first compartment 402 and is positioned below the indicator window 412, so that at least a portion of the color changing absorbent material 407 can be seen through the indicator window 412. Preferably the swollen stimulus sensitive gel 410 is located in the second compartment 404 and is kept separate from the color changing absorbent material 407 by the semi-permeable membrane 431. Although the swollen stimulus sensitive gel 410 is preferably hidden from the user below the paint applied to the top portion 416 of the stimulus sensitive device 400, it could also be visible to the user. if the swollen stimulus sensitive gel 410 were visible to the user, it is preferred that it be the same color as the color changing absorbent material 407 prior to the color changing absorbent material 407 coming into contact with the constituent parts 411.

If the color changing absorbent material 407 has the ability to wick liquid 414 and/or constituent parts 411 from the swollen stimulus sensitive gel 410 simply by the color changing absorbent material 407 being in contact with the swollen stimulus sensitive gel 410, then it is preferred that the semi-permeable membrane 431 be used to keep the color changing absorbent material 407 and the swollen stimulus sensitive gel 410 physically apart from each other. Thus, in this alternative embodiment the swollen stimulus sensitive gel 410 is physically separated from the color changing absorbent material 407 by the semi-permeable membrane 431 to prevent the liquid 414 and the constituent parts 411 contained in the swollen stimulus sensitive gel 410 from being wicked into the color changing absorbent material 407. Doing so prevents the stimulus sensitive device 400 from giving a false indication of exposure to a predetermined stimulus.

Although employing an embodiment with a semi-permeable membrane 431 reduces, or depending on the size of the shrunken stimulus sensitive gel 420, eliminates the need for attaching or securing the stimulus sensitive gel 410 and 420 within the stimulus indicating device 400, it may still be preferable for the stimulus sensitive gel 410 and 420 to be fixed or secured at the attachment point 418 in the second compartment 404, or at more than one attachment point if desired. Preferably, the stimulus sensitive gel 410 and 420 would be fixed or secured at the attachment point 418, or at more than one attachment point if desired. The stimulus sensitive gel 410 and 420 may be fixed to the attachment point 418 with a suitable epoxy, glue, or it could be heat stamped upon creation of the stimulus indicating device 400. Attaching the stimulus sensitive gel 410 and 420 to the attachment point 418 helps to ensure that the stimulus sensitive gel 410 and 420 collapses or shrinks in a desired direction—preferably away from the color changing absorbent material 407 and the indicator window 412. Moreover, by securing or fixing the stimulus sensitive gel 410 and 420 to the attachment point ensures that the stimulus sensitive gel 410 and 420 does not cover the color changing absorbent material 407 after it had changed from a first color to a second color. Securing or fixing the stimulus sensitive gel 410 and 420 to the attachment point 418 prevents the stimulus sensitive gel 410 and 420 from floating or moving within the compartment and covering up the color changing absorbent material 407 at all times.

All embodiments discussed herein of the stimulus indicating device 400 containing the swollen stimulus sensitive gel 410 and the shrunken stimulus sensitive gel 420 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 410 and 420 used in all the embodiments of the stimulus indicating device 400 discussed herein can be made to occur with either heating or cooling beyond a specific stimulus. For example, some stimulus sensitive gels 410 and 420 such as and by way of example only, PAAm gels, collapse or shrink when cooled below a predetermined or trigger temperature, and are said to have an "Upper Critical Solution Temperature" or UCST. Conversely, other stimulus sensitive gels 410 and 420 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933, the predetermined stimulus, such as temperature at which a stimulus sensitive gel 410 and 420 undergoes its phase transition and changes volume, can be "tuned" to a particular value by adding salts, surfactants, or other substances to the gel matrix.

One of ordinary skill in the art will understand that although the stimulus sensitive gel 410 and 420 discussed herein in regard to all embodiments of the stimulus indicating device 400 may have been of the LCST type of gel, in that the swollen stimulus sensitive gel 410 collapsed or shrank to become the shrunken stimulus sensitive gel 420 upon exposure to its predetermined stimulus of a warmer temperature, the range and scope of this invention includes and envisions the swollen stimulus sensitive gel 410 and the shrunken stimulus sensitive gel 420 also being of the UCST type of gel. Moreover, it should be noted that all the variations of the different embodiments discussed herein can be combined with the variations of other embodiments described herein and that are known in the art, as would be understood to one of ordinary skill in the art.

At Least Two Compartments with Capillaries

Figure 5A:
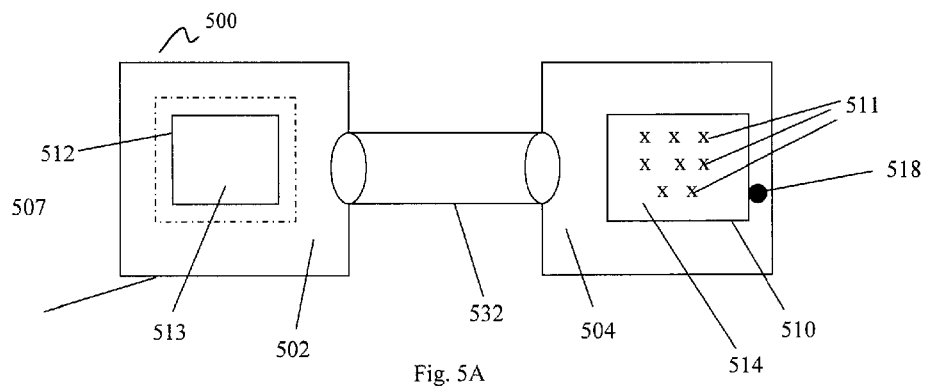
FIG. 5A is a top view of a multi-compartment embodiment of the invention wherein the compartments are connected by a capillary or tube, before exposure to a predetermined stimulus.
Figure 5B:
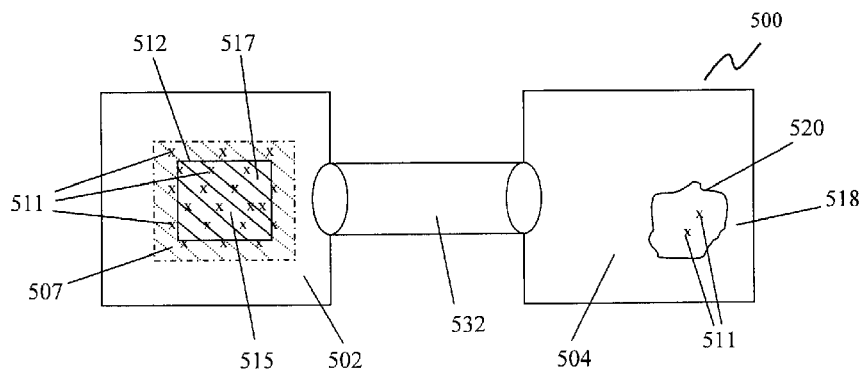
FIG. 5B is a top view of a multi-compartment embodiment of the invention in FIG. 5A after exposure to a predetermined stimulus extreme.

In an alternative embodiment, as shown in FIG. 5A and FIG. 5B, a multi-compartment device could be used to keep the color changing absorbent material 507 and the liquid 514 and constituent parts 511 contained in the swollen stimulus sensitive gel 510, separate from each other. More specifically, as shown in FIG. 5A and FIG. 5B, the color changing absorbent material 507 is in the first compartment 502 and can be viewed through an indicator window 512. The swollen stimulus sensitive gel 510 is in the second compartment 504. The first compartment 502 and the second compartment 504 are formed by the backing layer 525 on the bottom of the stimulus indicating device 500 and an upper layer 526 on the top of the stimulus indicating device 500. The first compartment 502 and the second compartment 504 are additionally formed and differentiated from one another by small channel(s) 532, capillary(-ies) 532 or tube(s) 532, such as capillary tube(s) 532 that are strong and resilient to twisting, bending and breaking. The capillary tube(s) 532 is/are designed to allow the expelled liquid 515 and constituent parts 511 to pass from the second compartment 504 into the first compartment 502, and from the first compartment 502 to the second compartment 504.

Figure 5C:
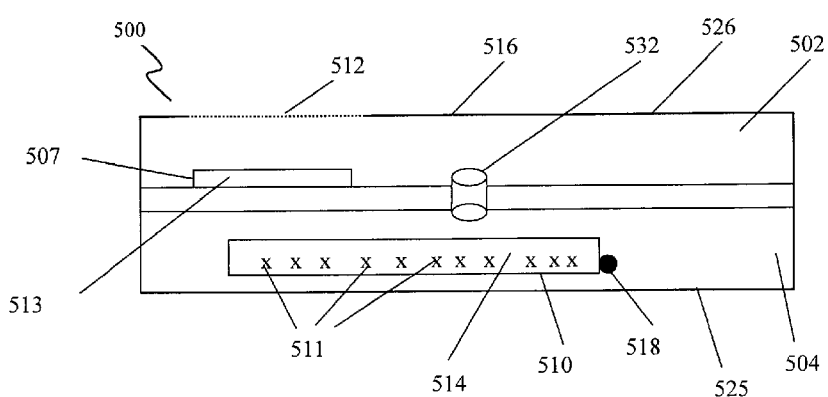
FIG. 5C is a side cross-sectional view of an alternate structure of the embodiment in FIG. 5A, before exposure to a predetermined stimulus extreme.

As shown in FIG. 5C an alternate embodiment could position the first compartment 502 above the second compartment 504 separated by the permeable membrane 530. Other shapes are contemplated within the scope of the invention as previously described in prior applications.

Prior to exposure to a predetermined stimulus, in this embodiment a swollen stimulus sensitive gel 510 is contained in only the second compartment 504. And prior to exposure of the stimulus indicating device 500 to a predetermined stimulus, the color changing absorbent material 507 is a first color 513, visible through the indicator window 512 or display portion 512.

Both the backing layer 525 and the upper layer 526 may be constructed of a strong, resilient leak-proof material, such as plastic or other polymer material, so as to provide for the twisting or bending that might occur during transportation of the stimulus sensitive product without tearing, breaking or leaking. The backing layer 525 and the upper layer 526 may also be made of a material that preferably allows them to be joined and sealed together, such as by heat stamping or other suitable means. The backing layer 525 and the upper layer 526 can both approximate the length and width of the first compartment 502, although variations in these dimensions are within the scope of the present invention. The upper layer 526 can preferably be made of a clear material, such as plastic, so that the user of the stimulus indicating device 500 can view at least some portion of the backing material or color changing absorbent material 507. The upper layer 526 can also be able to accept paint or ink so as to allow for coloring or concealing at least some portion of the first compartment 502.

Although some portion of the upper layer 526 can also accept paint or ink for coloring, it is preferable that the indicator window 512 portion of the upper layer 526 remain free from ink or coloring so that the user of the stimulus indicating device 500 can observe the first compartment 502 through the indicator window 512 as explained herein. The backing layer 525 should also be able to accept paste, glue or other suitable adhesive on the surface not facing the first compartment 502, so as to allow it to be directly or indirectly attached to a stimulus sensitive product.

By way of example only, the color changing absorbent material 507 could be cationic paper, litmus paper or any equivalent absorbent material that is reactive to a certain ion, element or similar substance. In regard to all the embodiments of the stimulus indicating device discussed herein being "reactive", what is meant is that the color changing absorbent material 507 should change its observable properties (by way of example only, its size, its color, etc.) in reaction to coming into contact with the constituent parts 511 expelled from the swollen stimulus sensitive gel 510 as described herein. Thus it is important that the color changing absorbent material 507 has both an affinity for the expelled liquid 515 and constituent parts 511 previously contained in, and expelled from, the swollen stimulus sensitive gel 510; and that at least a portion of the color changing absorbent material 507 changes properties upon coming into contact with the expelled liquid 515 and constituent parts 511, so as to change from a first color 513 to a second color 517. Preferably the color changing absorbent material 507 can operate in a semi-quantitative capacity.

In this alternative embodiment, the color changing absorbent material 507 is a divalent cationic paper that is reactive to constituent parts 511 such as by way of example only, divalent cations, (by way of example only, $Mg^{2+}$ or $Ca^{2+}$). As discussed herein, a suitable color changing absorbent material 507, such as a total-hardness indicator paper or test stick will indicate a change from a first color 513 to a second color 517 upon exposure to constituent parts 511 carried by the expelled liquid 515 after both are expelled from the swollen stimulus sensitive gel 510. Examples of such divalent cationic paper that can be used as the color changing absorbent material 507 includes a total-hardness indicator paper or test stick that is available from Sigma-Aldrich under the tradename QUANTOFIX®, is manufactured by Macherey-Nagel under the trade name Aquadur®, and that changes color from blue to red upon coming into contact with expelled liquid 515 containing the constituent parts 511 (by way of example only, $Mg^{2+}$ or $Ca^{2+}$). Preferably the color changing absorbent material 507 operates in at least a semi-quantitative capacity.

As discussed herein, one method for incorporating the constituent parts 511 that are reactive with the color changing absorbent material 507 is to swell the swollen stimulus sensitive gel 510 in a bath containing constituent parts 511 that are specifically reactive with the selected color changing absorbent material 507, including by way of example only, divalent cation salts (by way of example only $Mg^{2+}$ or $Ca^{2+}$ salts), and/or varying concentrations of $H^+$.

In this alternative embodiment, as the swollen stimulus sensitive gel 510 undergoes its phase transition in reaction to exposure to a predetermined stimulus, its volume changes by collapsing or shrinking due at least to a portion of the liquid 514 and constituent parts 511 (by way of example only $Mg^{2+}$) contained in the polymer network of the swollen stimulus sensitive gel 510 being expelled. As the swollen stimulus sensitive gel 510 expels even a portion of the liquid 514 and the constituent parts 511, it collapses and shrinks so that it resembles the shrunken stimulus sensitive gel 520 shown in FIG. 5B. Once a portion of the liquid 514 and the constituent parts 511 are expelled from the swollen stimulus sensitive gel 510, the expelled liquid 515 and the expelled constituent parts 511 pass through the capillary tube(s) 532 and subsequently come into contact with and are absorbed by the color changing absorbent material 507.

Once the liquid 514 and the constituent parts 511 are expelled from the swollen stimulus sensitive gel 510, they pass through the capillary tube(s) 532 of the stimulus indicating device 500, they come into contact with and are absorbed by the color changing absorbent material 507. Because of the design of the color changing absorbent material 507, as the constituent parts 511 are absorbed by the color changing absorbent material 507, the color changing absorbent material 507 changes from a first color 513 to a second color 517 due to the reaction between chemical moieties on the color changing absorbent material 507 and the constituent parts 511 carried by the expelled liquid 515. Because of the design of the color changing absorbent material 507, at least part of the color changing absorbent material 507, and preferably all of the color changing absorbent material 507, will change from a first color 513 to a second color 517 upon coming into contact with the constituent parts 511.

Moreover, upon being absorbed by the color changing absorbent material 507, the constituent parts 511 are permanently bound to the color changing absorbent material 507 thereafter. Thus, even if the predetermined stimulus is removed and the expelled liquid 515 is subsequently reabsorbed by the shrunken stimulus sensitive gel 520 so as to become a partially or fully re-swollen stimulus sensitive gel 510, those constituent parts 511 remain bound to or trapped in the color changing absorbent material 507, and thus that color changing absorbent material 507 permanently remains colored the second color 517.

It should be noted that by manipulating the permeability of the capillary tube(s) 532 connecting the first compartment 502 to the second compartment 504, the time required for the expelled liquid 515 to move from the second compartment 504 into the first compartment 502 can be varied. Such manipulation of the capillary tube(s) 532 includes increasing or decreasing its thickness and/or increasing or decreasing its surface area facing the first compartment 502 and/or second compartment 504 and/or increasing or decreasing its wicking ability, so as to control the speed at which the expelled liquid 515 and the constituent parts 511 travel from the second compartment 504, through the capillary tube(s) 532, and enter the first compartment 502.

As will be appreciated by one of ordinary skill in the art, the geometry of the capillary tubes 532 can be manipulated so as to control the speed at which the expelled liquid 515 and the constituent parts 511 move from the second compartment 504 into the first compartment 502. Such manipulation of the geometry of the capillary tubes 532 includes increasing or decreasing its/their length and/or increasing or decreasing its/their width and/or increasing or decreasing the wicking ability of the material that makes up the capillary tubes 532, so as to control the speed at which the expelled liquid 515 and the constituent parts 511 travel from the second compartment 504, through the capillary tubes 532, and enter the first compartment 502.

An advantage of using such an embodiment is that both the exposure to a predetermined stimulus as well as the time of exposure can be indicated. As an example, if the predetermined stimulus occurs for just a short period of time, and is removed before the expelled liquid 515 and constituent parts 511 have completely moved from the second compartment 504 through the capillary tubes 532 and into the first compartment 502, then the expelled liquid 515 and constituent parts 511 will be wicked or drawn back into the second compartment 504 by the shrunken stimulus sensitive gel 520 as the shrunken stimulus sensitive gel 520 re-expands or swells as a result of undergoing hysteresis. In this case, no irreversible indication of exposure to the predetermined stimulus will be indicated by color changing absorbent material 507 because the time of exposure to the predetermined stimulus was too brief to enable enough expelled liquid 515 and constituent parts 511 to pass completely through the capillary tubes 532, react with the color changing absorbent material 507, and cause it to change from a first color 513 to a second color 517.

Although the decrease in volume of the swollen stimulus sensitive gel 510 in all of the embodiments of the stimulus indicating device 500 discussed herein can be by any amount so long as it is noticeable, preferably the decrease in volume of the swollen stimulus sensitive gel 510 would be between at least a 1/10 reduction in original volume, and up to a 500 times decrease in original volume. In regard to all embodiments of the stimulus indicating device 500 discussed herein as they pertain to the decrease in the volume being "noticeable" what is meant is that the volume change of the swollen stimulus sensitive gel 510 expels enough liquid 514 and constituent parts 511 to permanently cause at least a partial color change in the color changing absorbent material 507 from a first color 513 to a second color 517.

In an alternative of this embodiment with a capillary tube(s) 532, the color changing absorbent material 507 could be pH-indicator strips manufactured by EMD Chemicals Inc. These pH-indicator strips can react to and indicate exposure to constituent parts 511 such as and by way of example only, $H^+$ ions, by permanently changing from a first color 513 to a second color 517. Preferably the pH-indicator strips are manufactured in such a way that there is a noticeable spectrum of colors that match the range of possible pH concentrations. For example, the first color 513 of the color changing absorbent material 507 could be colored red prior to the stimulus indicating device 500 being exposed to a predetermined stimulus. Then upon exposure to the predetermined stimulus, the swollen stimulus sensitive gel 510 would expel liquid 514 and constituent parts 511 (by way of example only $H^+$) which, upon contact with the color changing absorbent material 507, causes the color changing absorbent material 507 to change to a second color 517, such as blue. Altering the pH of the expelled liquid 515 and the content of the constituent parts 511 (by way of example only $H^+$) will allow the first color 513 and second color 517 of the color changing absorbent material 507 to be manipulated. For example, if the swollen stimulus sensitive gel 510 was manufactured so that it was swollen with an aqueous solution of either high pH (for example a pH of 14), or low pH (for example a pH of 1), the most significant color contrast can be achieved between the first color 513 and second color 517 of the color changing absorbent material 507.

As shown in FIG. 5A and discussed herein, this embodiment of the irreversible stimulus indicating device 500 would have at least two compartments 502 and 504. In this alternative embodiment the color changing absorbent material 507 is preferably located within the first compartment 502 and is positioned below the indicator window 512, so that at least a portion of the color changing absorbent material 507 can be seen through the indicator window 512. Preferably the swollen stimulus sensitive gel 510 is located in the second compartment 504 and is kept separate from the color changing absorbent material 507 by the capillary tube(s) 532. Although the swollen stimulus sensitive gel 510 is preferably hidden from the user below the paint applied to the top portion 516 of the stimulus sensitive device 500, it could also be visible to the user. If the swollen stimulus sensitive gel 510 were visible to the user, it is preferred that it be the same color as the color changing absorbent material 507 prior to the color changing absorbent material 507 coming into contact with the constituent parts 511.

If the color changing absorbent material 507 has the ability to wick liquid 514 and/or constituent parts 511 from the swollen stimulus sensitive gel 510 simply by the color changing absorbent material 507 being in contact with the swollen stimulus sensitive gel 510, then it is preferred that the capillary tube(s) 532 be used to keep the color changing absorbent material 507 and the swollen stimulus sensitive gel 510 physically apart from each other. Thus, in this alternative embodiment the swollen stimulus sensitive gel 510 is physically separated from the color changing absorbent material 507 by the capillary tube(s) 532 to prevent the liquid 514 and the constituent parts 511 contained in the swollen stimulus sensitive gel 510 from being wicked into the color changing absorbent material 507. Doing so prevents the stimulus sensitive device 500 from giving a false indication of exposure to a predetermined stimulus.

Although employing an embodiment with a capillary tube(s) 532 reduces, or depending on the size of the shrunken stimulus sensitive gel 520, eliminates the need for attaching or securing the stimulus sensitive gel 510 and 520 within the stimulus indicating device 500, it may still be preferable for the stimulus sensitive gel 510 and 520 to be fixed or secured at the attachment point 518 in the second compartment 504, or at more than one attachment point if desired. Preferably, the stimulus sensitive gel 510 and 520 would be fixed or secured at the attachment point 518, or at more than one attachment point if desired. The stimulus sensitive gel 510 and 520 may be fixed to the attachment point 518 with a suitable epoxy, glue, or it could be heat stamped upon creation of the stimulus indicating device 500. Attaching the stimulus sensitive gel 510 and 520 to the attachment point 518 helps to ensure that the stimulus sensitive gel 510 and 520 collapses or shrinks in a desired direction—preferably away from the color changing absorbent material 507 and the indicator window 512. Moreover, by securing or fixing the stimulus sensitive gel 510 and 520 to the attachment point ensures that the stimulus sensitive gel 510 and 520 does not cover the color changing absorbent material 507 after it had changed from a first color to a second color. Securing or fixing the stimulus sensitive gel 510 and 520 to the attachment point 518 prevents the stimulus sensitive gel 510 and 520 from floating or moving within the compartment and covering up the color changing absorbent material 507 at all times.

All embodiments discussed herein of stimulus indicating device 500 containing the swollen stimulus sensitive gel 530 and the shrunken stimulus sensitive gel 520 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 510 and 520 used in all the embodiments of the stimulus indicating device 500 discussed herein can be made to occur with either heating or cooling beyond a specific stimulus. For example, some stimulus sensitive gels 510 and 520 such as and by way of example only, PAAm gels, collapse or shrink when cooled below a predetermined or trigger temperature, and are said to have an "Upper Critical Solution Temperature" or UCST. Conversely, other stimulus sensitive gels 510 and 520 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933, the predetermined stimulus, such as temperature at which a stimulus sensitive gel 510 and 520 undergoes its phase transition and changes volume, can be "tuned" to a particular value by adding salts, surfactants, or other substances to the gel matrix.

One of ordinary skill in the art will understand that although the stimulus sensitive gel 510 and 520 discussed herein in regard to all embodiments of the stimulus indicating device 500 may have been of the LCST type of gel, in that the swollen stimulus sensitive gel 510 collapsed or shrank to become the shrunken stimulus sensitive gel 520 upon exposure to its predetermined stimulus of a warmer temperature, the range and scope of this invention includes and envisions the swollen stimulus sensitive gel 510 and the shrunken stimulus sensitive gel also being of the UCST type of gel. Moreover, it should be noted that all the variations of the different embodiments discussed herein can be combined with the variations of other embodiments described herein and that are known in the art, as would be understood to one of ordinary skill in the art.

Semi-Permeable Membrane is the Color Changing Absorbent Material

Figure 6A:
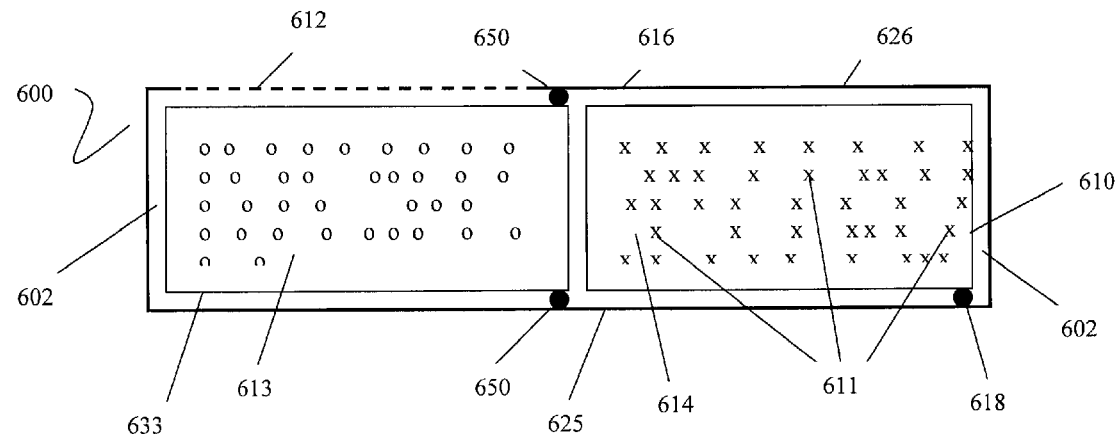
FIG. 6A is a side cross-sectional view of an embodiment of the invention before exposure to a predetermined stimulus extreme.
Figure 6B:
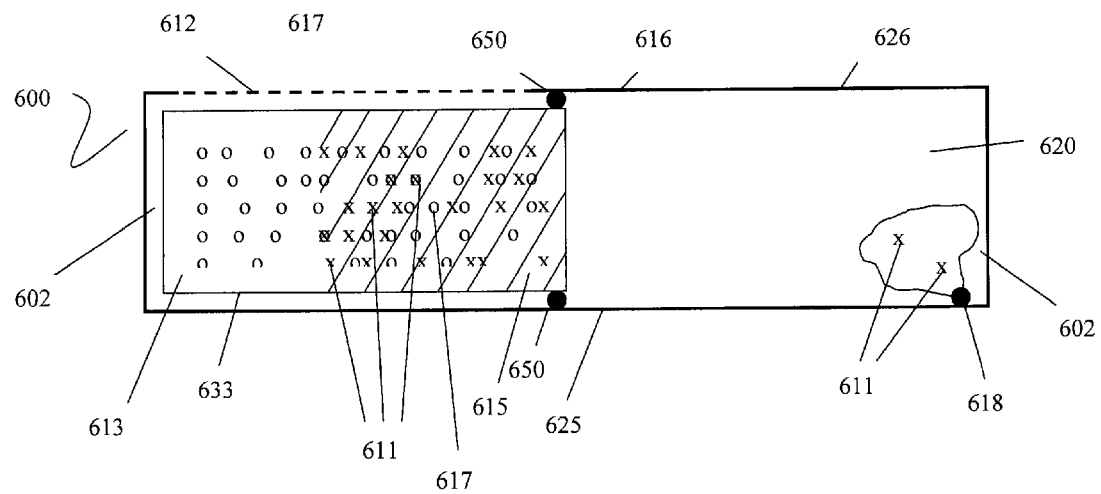
FIG. 6B is a side cross-sectional view of the embodiment in FIG. 6A after exposure to a predetermined stimulus extreme.
Figure 6C:
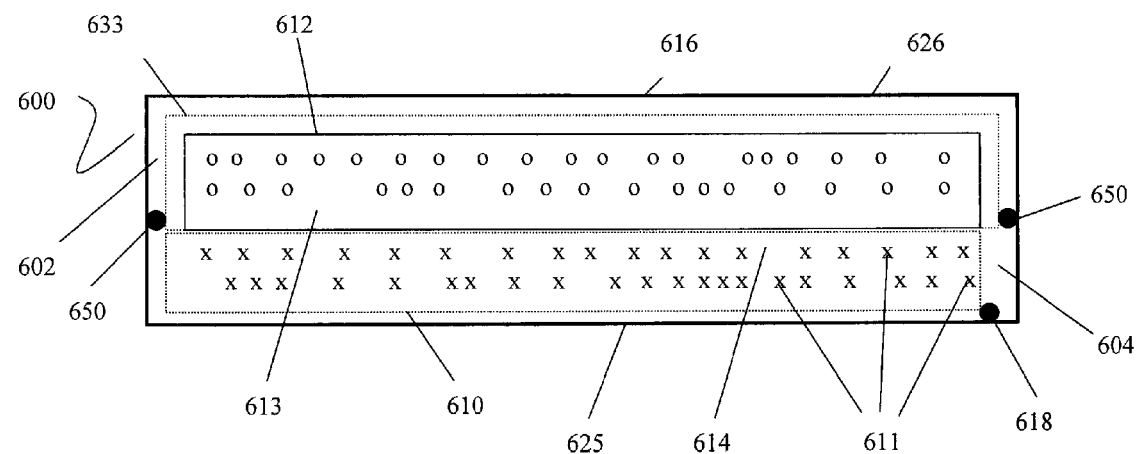
FIG. 6C is a side cross-sectional view of an alternate structure of the embodiment in FIG. 6A, before exposure to a predetermined stimulus extreme.

In an alternate embodiment, as shown in FIG. 6A and FIG. 6B, the semi-permeable membrane 633 could act as the color changing absorbent material in that its wicking ability could be set so as to allow the expelled liquid 615 and constituent parts 611 to not only migrate through it at a controlled pace, but to signal exposure to a predetermined stimulus by having the semi-permeable membrane 633 change color as well, either due to reacting to the expelled liquid 615 or due to reacting to the constituent parts 611 or due to absorbing the colored constituent parts 611 that results in a change in the color of the semi-permeable membrane 633 from a first color 613 to a second color 617, even if it is only a partial change in color as shown in FIG. 6B. An example of such an embodiment, which is incorporated herein by reference, is U.S. Pat. No. 3,962,920.

In this alternative embodiment, a device with at least a first compartment could contain the color changing absorbent material in the form of a semi-permeable membrane 633. As discussed herein the semi-permeable membrane 633 only allows the constituent parts 611 and/or expelled liquid 615 to pass in one direction.

Preferably the semi-permeable membrane 633 fits snugly within the at least first compartment 602 of the stimulus indicating device 600 so as to prevent the expelled liquid 615 and constituent parts 611 (both of which are expelled from the swollen stimulus sensitive gel 610 as it undergoes its phase transition in response to exposure to a predetermined stimulus) from passing onto the top of the semi-permeable membrane 633 and prematurely turning the semi-permeable membrane 633 to its second color 617. Preferably, the end of the semi-permeable membrane 633 that faces away from the indicator window 612 will be large enough so as to create a water-tight seal 650 between the top of the semi-permeable membrane 633 with the upper layer 616, and between the bottom of the semi-permeable membrane 633 with the backing layer 625.

As shown in FIG. 6A and FIG. 6B, the semi-permeable membrane 633 in the at least first compartment 602 is initially a first color and can be viewed through an indicator window 612. The first compartment 602 is formed by the backing layer 625 on the bottom of the stimulus indicating device 600 and an upper layer 626 on the top of the stimulus indicating device 600. Preferably the semi-permeable membrane 633 does not wick the liquid 614 or the constituent parts 611 out of the swollen stimulus sensitive gel 610; alternately the semi-permeable membrane 633 is not in physical contact with the swollen stimulus sensitive gel 610 and thus cannot wick the liquid 614 or the constituent parts 611 out of the swollen stimulus sensitive gel 610.

The semi-permeable membrane 633 in both structures of this embodiment is designed to allow the expelled liquid 615 and constituent parts 611 to migrate through the semi-permeable membrane 633 and in doing so cause the semi-permeable membrane to change from a first color to a second color as discussed herein.

Prior to exposure of the stimulus indicating device 600 to a predetermined stimulus, the color changing absorbent material 607 is a first color 613, visible through the indicator window 612 or display portion 612.

Both the backing layer 625 and the upper layer 626 may be constructed of a strong, resilient leak-proof material, such as plastic or other polymer material, so as to provide for the twisting or bending that might occur during transportation of the stimulus sensitive product without tearing, breaking or leaking. The backing layer 625 and the upper layer 626 may also be made of a material that preferably allows them to be joined and sealed together, such as by heat stamping or other suitable means. The backing layer 625 and the upper layer 626 can both approximate the length and width of the at least first compartment 602, although variations in these dimensions are within the scope of the present invention. The upper layer 626 can preferably be made of a clear material, such as plastic, so that the user of the stimulus indicating device 600 can view at least some portion of the backing material or color changing absorbent material 607. The upper layer 626 can also be able to accept paint or ink so as to allow for coloring or concealing at least some portion of the first compartment 602.

Although some portion of the upper layer 626 can also accept paint or ink for coloring, it is preferable that the indicator window 612 portion of the upper layer 626 remain free from ink or coloring so that the user of the stimulus indicating device 600 can observe the semi-permeable membrane 633 through the indicator window 612 as explained herein. The backing layer 625 should also be able to accept paste, glue or other suitable adhesive on the surface not facing the first compartment 602, so as to allow it to be directly or indirectly attached to a stimulus sensitive product.

By way of example only, the semi-permeable material 633 (which is equivalent to the color changing absorbent material discussed herein) could be any material so long as it is reactive to the constituent parts 611 expelled from the swollen stimulus sensitive gel 610 as it undergoes its phase transition. In regard to all the embodiments of the stimulus indicating device discussed herein being "reactive", what is meant is that the semi-permeable membrane 633 should change its observable properties (by way of example only, its size, its color, etc.) in reaction to coming into contact with the constituent parts 611 expelled from the swollen stimulus sensitive gel 610 as described herein. Thus it is important that the semi-permeable membrane 633 has both an affinity for the expelled liquid 615 and constituent parts 611 previously contained in, and expelled from, the swollen stimulus sensitive gel 610; and that at least a portion of the semi-permeable membrane 633 changes properties upon coming into contact with the expelled liquid 615 and constituent parts 611, so as to change from a first color 613 to a second color 617, as shown by the partial color change in FIG. 6B. Preferably the semi-permeable membrane 633 can operate in a semi-quantitative capacity.

In this alternative embodiment, as the swollen stimulus sensitive gel 610 undergoes its phase transition in reaction to exposure to a predetermined stimulus, its volume changes by collapsing or shrinking due at least to a portion of the liquid 614 and constituent parts 611 contained in the polymer network of the swollen stimulus sensitive gel 610 being expelled. As the swollen stimulus sensitive gel 610 expels even a portion of the liquid 614 and the constituent parts 611, it collapses and shrinks so that it resembles the shrunken stimulus sensitive gel 620 shown in FIG. 6B. Once a portion of the liquid 614 and the constituent parts 611 are expelled from the swollen stimulus sensitive gel 610, the expelled liquid 615 and the expelled constituent parts 611 subsequently come into contact with and are absorbed by the semi-permeable membrane 633.

Upon being absorbed by the semi-permeable membrane 633, the constituent parts 611 are permanently bound to the semi-permeable membrane 633 thereafter. Thus, even if the predetermined stimulus is removed and the expelled liquid 615 is subsequently reabsorbed by the shrunken stimulus sensitive gel 620 so as to become a partially or fully re-swollen stimulus sensitive gel 610, those constituent parts 611 remain bound to or trapped in the color changing absorbent material 607, and thus that color changing absorbent material 607 permanently remains colored the second color 617.

It should be noted that by manipulating the permeability of the semi-permeable membrane 633, the time required for the expelled liquid 615 to move the length of the semi-permeable membrane 633 into the indicator window 612 can be varied. Such manipulation of the semi-permeable membrane 633 includes increasing or decreasing its thickness and/or increasing or decreasing its surface area facing the indicator window 612 by increasing or decreasing its wicking ability, so as to control the speed at which the expelled liquid 615 and the constituent parts 611 travel through the semi-permeable membrane 633.

The semi-permeable membrane 633 would preferably be designed so that it not only allows the constituent parts 611 contained in the expelled liquid 615 through the semi-permeable membrane 633, but also would prevent the constituent parts 611 from being re-absorbed by the shrunken stimulus sensitive gel 620.

An advantage of using such an embodiment of the stimulus indicating device 600 is that both the exposure to a predetermined stimulus as well as the time of exposure can be indicated. As an example, if the predetermined stimulus occurs for just a short period of time, and is removed before the all of the constituent parts 611 contained in the swollen stimulus sensitive gel 610 have been completely expelled, then only a portion of the semi-permeable membrane 633 will have changed from a first color 613 to a second color 617.

One reason this happens is because the semi-permeable membrane 633 does not allow the expelled liquid 615 and expelled constituent parts 611 to pass in both directions. And so in this case, an irreversible indication of exposure to the predetermined stimulus will be indicated by the semi-permeable membrane 633 even though the time of exposure to the predetermined stimulus was brief, it will still result in a color change because enough expelled liquid 615 and enough constituent parts 611 passed through the semi-permeable membrane 633 to become visible in the indicator window 612 to indicate a change from a first color 613 to a second color 617.

Although the decrease in volume of the swollen stimulus sensitive gel 610 in all of the embodiments of the stimulus indicating device 600 discussed herein can be by any amount so long as it is noticeable, preferably the decrease in volume of the swollen stimulus sensitive gel 610 would be between at least a 1/10 reduction in original volume, and up to a 500 times decrease in original volume. In regard to all embodiments of the stimulus indicating device 600 discussed herein as they pertain to the decrease in the volume being "noticeable" what is meant is that the volume change of the swollen stimulus sensitive gel 610 expels enough liquid 614 and constituent parts 611 to permanently cause at least a partial color change in the semi-permeable membrane 633 from a first color 613 to a second color 617.

As shown in FIG. 6A and discussed herein, this embodiment of the irreversible stimulus indicating device 600 would have at least one compartment 602, but could have others. In this alternative embodiment the semi-permeable membrane 633 is preferably located within the first compartment 602 and is positioned below the indicator window 612, so that at least a portion of the semi-permeable membrane 633 can be seen through the indicator window 612. Preferably the swollen stimulus sensitive gel 610 is located in the back half of the first compartment 602 and is kept separate from the semi-permeable membrane 633. Although the swollen stimulus sensitive gel 610 is preferably hidden from the user below the paint applied to the top portion 616 of the stimulus sensitive device 600, it could also be visible to the user. If the swollen stimulus sensitive gel 610 were visible to the user, it is preferred that it be the same color as the semi-permeable membrane 633 prior to the semi-permeable membrane 633 coming into contact with the constituent parts 611.

If the semi-permeable membrane 633 has the ability to wick liquid 614 and/or constituent parts 611 from the swollen stimulus sensitive gel 610 simply by the semi-permeable membrane 633 being in contact with the swollen stimulus sensitive gel 610, then it is preferred that the semi-permeable membrane 633 and the swollen stimulus sensitive gel 610 be physically kept apart from each other. Thus, in this alternative embodiment the swollen stimulus sensitive gel 610 is physically separated from the semi-permeable membrane 633 to prevent the liquid 614 and the constituent parts 611 contained in the swollen stimulus sensitive gel 610 from being wicked into the semi-permeable membrane 633. Doing so prevents the stimulus sensitive device 600 from giving a false indication of exposure to a predetermined stimulus. If the semi-permeable membrane 633 does not wick the constituent parts 611 out of the swollen stimulus sensitive gel 610, then the semi-permeable membrane 633 can be in physical contact with the swollen stimulus sensitive gel 610.

Preferably, the stimulus sensitive gel 610 and 620 would be fixed or secured at the attachment point 618, or at more than one attachment point if desired. The stimulus sensitive gel 610 and 620 may be fixed to the attachment point 618 with a suitable epoxy, glue, or it could be heat stamped upon creation of the stimulus indicating device 600. Attaching the stimulus sensitive gel 610 and 620 to the attachment point 618 helps to ensure that the stimulus sensitive gel 610 and 620 collapses or shrinks in a desired direction—preferably away from the color changing absorbent material 607 and the indicator window 612. Moreover, by securing or fixing the stimulus sensitive gel 610 and 620 to the attachment point ensures that the stimulus sensitive gel 610 and 620 does not cover the semi-permeable membrane 633 after it had changed from a first color to a second color. Securing or fixing the stimulus sensitive gel 610 and 620 to the attachment point 618 prevents the stimulus sensitive gel 610 and 620 from floating or moving within the compartment and covering up the semi-permeable membrane 633 at all times.

All embodiments discussed herein of the stimulus indicating device 600 containing the swollen stimulus sensitive gel 610 and the shrunken stimulus sensitive gel 620 may be based on any type of stimulus sensitive gel that undergoes a phase transition upon exposure of the stimulus sensitive gel to a predetermined stimulus. The preferred types of stimulus sensitive gels include polyacrylic acid (PAA) gel, a polyacrylamide (PAAm) gel, and/or its variations such as poly(n-isopropylacrylamide) (PNIPAAm) gels, and/or their derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the volume change in the stimulus sensitive gel 610 and 620 used in all the embodiments of the stimulus indicating device 600 discussed herein can be made to occur with either heating or cooling beyond a specific stimulus. For example, some stimulus sensitive gels 610 and 620 such as and by way of example only, PAAm gels, collapse or shrink when cooled below a predetermined or trigger temperature, and are said to have an "Upper Critical Solution Temperature" or UCST. Conversely, other stimulus sensitive gels 610 and 620 such as and by way of example only, PNIPAAm gels, collapse or shrink when heated above a predetermined or trigger temperature. These latter gels are said to show a "Lower Critical Solution Temperature" or LCST. The behavior of the UCST gels and the LCST gels depends on their chemical structure. Many examples of both kinds of polymers are known in the literature. Moreover, as described in U.S. Pat. No. 5,100,933, the predetermined stimulus, such as temperature at which a stimulus sensitive gel 610 and 620 undergoes its phase transition and changes volume, can be "tuned" to a particular value by adding salts, surfactants, or other substances to the gel matrix.

One of ordinary skill in the art will understand that although the stimulus sensitive gel 610 and 620 discussed herein in regard to all embodiments of the stimulus indicating device 600 may have been of the LCST type of gel, in that the swollen stimulus sensitive gel 610 collapsed or shrank to become the shrunken stimulus sensitive gel 620 upon exposure to its predetermined stimulus of a warmer temperature, the range and scope of this invention includes and envisions the swollen stimulus sensitive gel 610 and the shrunken stimulus sensitive gel 620 also being of the UCST type of gel. Moreover, it should be noted that all the variations of the different embodiments discussed herein can be combined with the variations of other embodiments described herein and that are known in the art, as would be understood to one of ordinary skill in the art.

Ingredients and Method for Making a Swollen Stimulus Sensitive Gel

For all the embodiments of the swollen stimulus sensitive gel 110 and 210 and 310 and 410 and 510 and 610 discussed herein, the swollen stimulus sensitive gel 110 and 210 and 310 and 410 and 510 and 610 can be manufactured to undergo its phase transition at any predetermined stimulus. By way of example only, the swollen stimulus sensitive gel 110 and 210 and 310 and 410 and 510 and 610 discussed herein could be of the UCST type and could be made to trigger or undergo its phase transition (i.e., collapse or shrink and expel the constituent parts 111 and 211 and 311 and 411 and 511 and 611) upon exposure to a temperature of less than 2° C. Alternatively, and by way of example only, the swollen stimulus sensitive gel 110 and 210 and 310 and 410 and 510 and 610 discussed herein could be of the LCST type and could be made to trigger or undergo its phase transition (i.e., collapse or shrink and expel the constituent parts 111 and 211 and 311 and 411 and 511 and 611) upon exposure to a temperature greater than 8° C. It will be understood by one of ordinary skill in the art that other temperatures and/or stimuli can be set as the predetermined stimulus by varying the method and/or ingredients disclosed herein.

By way of example only, the discussion below will disclose how to make a swollen stimulus sensitive gel of the LCST type, which undergoes its phase transition (i.e., collapses or shrinks and thereby expels the liquid and constituent parts contained in the swollen stimulus sensitive gel) upon being exposed to a temperature warmer than 8° C.

The method of manufacturing such a swollen stimulus sensitive gel comprises three steps. In the first step, NIPAAm and N,N'-methylenebisacrylamide (BIS) are polymerized to form a PNIPAAm gel. The gel as synthesized exhibits a transition temperature of 37° C. In the second step, the transition temperature of the gel is adjusted to the desired transition temperature via the addition of salts, surfactants or solvents. Once the amounts of additives required to obtain gel formulations that trigger at the desired transition temperatures are well established, these need not be repeated for all gels. In the third step, the PNIPAAm gels are dried and immersed in solutions containing salts, surfactants or solvents required for the desired transition temperature as well as simultaneously doped with the constituent parts. The purpose of such doping is to impregnate the gel 110 and 210 and 310 and 410 and 510 and 610 and 120 and 220 and 320 and 420 and 520 and 620 with constituent parts 111 and 211 and 311 and 411 and 511 and 611, so that the constituent parts 111 and 211 and 311 and 411 and 511 and 611 will permanently cause the color changing absorbent material 107 and 207 and 307 and 407 and 507 and 633 to change from a first color 113 and 213 and 313 and 413 and 513 and 613 to a second color 117 and 217 and 317 and 417 and 517 and 617. The resulting polymer gel (i.e, the doped swollen stimulus sensitive gel 110 and 210 and 310 and 410 and 510 and 610) will initially have a transition temperature of 37° C. Thus in the third step, the transition temperature of the resulting polymer gel (i.e., the doped swollen stimulus sensitive gel 110 and 210 and 310 and 410 and 510 and 610) is shifted to the desired temperature (e.g., 8° C.).

Taken together, all these steps comprise the process of preparing a swollen stimulus sensitive gel that will undergo its volume transition upon being exposed to a predetermined stimulus as well as provide foolproof, permanent and irreversible indication of the stimulus sensitive product's exposure to such stimulus.

1. Preparation of Polymer Gels by Polymerization. of NIPAAm

By way of example only, the swollen stimulus sensitive gel 110 and 210 and 310 and 410 and 510 and 610 is prepared as a LCST type of polymer gel, and by way of example only, this LCST type of polymer gel created via the polymerization of NIPAAm. This polymerization of NIPAAm is accomplished by employing the following ingredients, although one of ordinary skill in the art will recognize that certain of the following ingredients can be replaced by other similar types of ingredients, and recognizes/understands that the amounts of the ingredients are exemplary only. Accordingly, the amounts of the ingredients can be varied by any amount so long as the desired gel is created. Moreover, the amounts can be increased or decreased proportionally so that larger or smaller amounts of swollen stimulus sensitive gel 110 and 210 and 310 and 410 and 510 and 610 can be created. The ingredients include:

i) 1 grams of n-isopropylacrylamide (preferably 97% purity from Aldrich);
ii) 10 milliliters of distilled and deionized water;
iii) 0.0133 grams of N,N'-methylenebisacrylamide (preferably electrophoresis grade from Aldrich);
iv) 0.02 grams of ammonium persulfate (preferably 98% purity from Aldrich); and
v) 24 microliters of N,N,N',N'-tetramethylethylenediamine (abbreviated TEMED, preferably 98% purity from Aldrich).

TEMED catalyzes the polymerization reaction such that the reaction may occur at low temperatures (near 0° C.) although one of ordinary skill in the art will recognize that TEMED may be substituted with another redox polymerization catalyst such as Sodium Metabisulfite.

In order to manufacture the swollen stimulus sensitive gel 110 and 210 and 310 and 410 and 510 and 610, the following method is preferably followed, although one of ordinary skill in the art will recognize that certain steps can be performed in varying order, one of ordinary skill in the art will recognize that other materials could be substituted for the listed materials, and one of ordinary skill in the art will recognize that the amounts can be varied:

1. The distilled and deionized water is purged with nitrogen gas for 15 to 20 minutes so as to remove all possible amounts of oxygen.
2. Using a disposable 10 ml plastic pipette, 10 milliliters of distilled and deionized water are added into a 20 milliliter glass scintillation vial.
3 The entire 1 gram of n-isopropylacrylamide is added into the scintillation vial and that mixture is stirred thoroughly for about 5 minutes.
4. The entire 0.0133 grams of N,N-methylenebisacrylamide is added to the scintillation vial and extensively stirred for 5 minutes or until all the components in the scintillation vial are completely dissolved.
5. The 0.02 grams of ammonium persulfate is added to the scintillation vial and extensively stirred for 5 minutes or until all the components in the scintillation vial are completely dissolved.
6. The mixture is then cooled down to 0° C. by placing it in an iced water bath for 5 minutes.
7. The mixture is taken out from the iced water bath and the entire 24 microliters of TEMED are added.

TEMED catalyzes the polymerization reaction such that the reaction may occur at low temperatures (near 0° C.) although one of ordinary skill in the art will recognize that TEMED may be substituted with another redox polymerization catalyst such as sodium metabisulfite.

Performing the above mentioned steps results in a pre-gel mixture that will form pNIPA-BIS gels.

The pre-gel mixture of pNIPA-BIS gel is rapidly (within 10 minutes of addition of TEMED) transferred from the scintillation vial into molds so as to allow gels of desired shapes to form. The pre-gel mixture is preferably cast into glass molds since the pre-gel does not stick on glass surfaces and hence can be removed from the molds easily. Some of the types of molds employed are described below although one of ordinary skill in the art will recognize that the gels can be cast in variety of shapes and sizes. Glass pipettes can be used which preferably have an inner diameter of either about 7 mm or about ⅓ inch. Similarly, rectangular or round glass capillaries (e.g., from Fiber Optic Center New Bedford, Mass.) having an inner diameter of 0.4 mm or 1/64 inches could be used as well. In addition, the pre-gel may be cast between glass plates in a protein electrophoresis gel casting unit (for example, a Mini PROTEAN® 3 system from Bio-Rad). The space between two glass plates can be 1.0 mm or 1.5 mm.

As is known and appreciated by one of ordinary skill in the art, there is an inverse relation between transition speed and the smallest dimension of the gel: the larger a stimulus sensitive gel is, the longer it requires to undergo its phase transition after exposure to the predetermined stimulus. For example, a gel cast in 1.0 mm mold will completely undergo its phase transition in approximately ½ the time as required for a gel cast in a 2.0 mm mold. Moreover, the molds employed can vary in length and width in addition to thickness, and as will be appreciated by one of ordinary skill in the art, the desired speed with which the transition of the resulting gel occurs is limited by the smallest dimension of the final gel.

Next the ends of the glass molds are sealed, either by flame sealing or by putting epoxy at the ends. The reason for sealing the pre-gel mixture in the glass molds is to prevent the pre-gel mixture from coming in contact with air during the polymerization process. It is important to prevent the pre-gel mixture from coming into contact with oxygen in the air during the polymerization process, because oxygen retards and may even stop the polymerization reaction. This is the same reason that the distilled and deionized water is purged with nitrogen at the beginning of the manufacture of the gel.

After adding TEMED and casting the pre-gel into the desired mold, the polymerization is allowed to proceed for roughly one hour. The polymerized gels are then taken out from the glass molds by breaking the glass molds or by removing the glass plates if using a protein electrophoresis gel casting unit. The polymerized gels are washed extensively by immersing the gels in distilled and deionized water for seven days, with the water changed at least every other day. Immersing the polymerized gels in deionized water is a necessary step so as to remove unreacted components. During the gel forming process, there is always the possibility that some NIPAAm and BIS do not incorporate into the polymer chains that form the gel.

During polymerization, some polymer chains are formed that are not connected to the gel network and as such can be washed from the gel. TEMED also needs to be removed from the polymerized gel. The removal of TEMED, unbound polymer chains and unreacted monomers is achieved, as mentioned above, by simply immersing the polymerized gel in distilled and deionized water. Doing so completes the method for manufacturing PNIPAAm-BIS gels, although any gel that exhibits LCST qualities would work.

2. Shifting the Transition Temperature of the Gel to the Required Temperature

Because of the ingredients and method used to prepare the PNIPAAm swollen stimulus sensitive gel discussed above, that polymerized gel will undergo its phase transition at the predetermined stimulus of warming to and/or exceeding 37° C. That predetermined stimulus can be altered, however, so as to cause the swollen stimulus sensitive gel to collapse or shrink upon warming to any temperature. This altering of the predetermined stimulus can be accomplished because of the underlying physical interactions that govern the volume phase transition in stimulus sensitive gels. Various forces have been recognized as responsible for the swelling of polymer gels: polymer-solvent interactions, polymer chain elasticity and monomer counterion pressure. Whether a gel is shrunken or collapsed depends on the competition amongst the three interactions. PNIPAAm gels swell to a large extent in room temperature water because water is a good solvent for PNIPAAm. In water, PNIPAAm polymer chains become greatly extended such that the contact between polymer chain and water is maximized, thereby resulting in a swollen gel. In order to induce PNIPAAm gels to undergo a volume transition, the gel solvent needs to be made a poor solvent such that PNIPAAm polymer chains contract to avoid contact with the surrounding solvent and lead the gel to shrink. This can be accomplished by heating the PNIPAAm gel above 37° C. since warm water is a poor solvent for the PNIPAAm gel.

A further concept inherent in these polymer gels is the directionality of the temperature-induced volume changes. As discussed herein, certain polymer gels (e.g., PNIPAAm) shrink when heated above a trigger temperature. These polymer gels are said to show a "Lower Critical Solution Temperature" or LCST. LCST behavior depends on the chemical structure. Many examples of LCST polymer gels are known in the literature. In polymer physics, LCST polymer-solvent systems are those in which the solubility of the polymer is enhanced at low temperatures and diminished at high temperatures, Because PNIPAAm gels are LCST gels, when the PNIPAAm gel is below its predetermined stimulus (i.e., its transition temperature), it is swollen; but above its predetermined stimulus the PNIPAAm gel is in the collapsed state.

However, there are certain polymer gels (e.g., PAAm) that shrink when cooled below a trigger temperature. These polymer gels are said to show an "Upper Critical Solution Temperature" or UCST. UCST behavior depends on the chemical structure. Many examples of UCST polymer gels are known in the literature. In polymer physics, UCST polymer-solvent systems are those in which the solubility of the polymer is enhanced at high temperatures and diminished at low temperatures. Because PAAm gels are UCST gels, when the PAAm gel is below its predetermined stimulus (i.e., its transition temperature), it is shrunken; but above its predetermined stimulus the PAAm gel is in the swollen state.

As is known in the art, the transition temperature of PNIPAAm can be changed significantly by immersing the gel in solutions of salt and water. See for example Tae Gwan Park et al "Sodium Chloride-induced phase transition in nonionic Poly(n-isopropylacrylamide) gels", Macromolecules 1993 or Yanhie Zhang et al "Specific Ion Effects on the Water Solubility of Macromolecules: PNIPAAm and the Hofmeister Series" Journal of the American Chemical Society 2005. The salt used in these solutions can be, by way of example only, sodium chloride although one of ordinary skill in the art will recognize that sodium chloride may be substituted with other sodium salts.

Temperature and salt concentration play a similar role in dictating whether the gel is swollen or not: increasing temperature and/or increasing salt concentration decreases the affinity of the PNIPAAm gels for their solvent. Thus, by keeping the salt concentration of the PNIPAAm gel fixed during manufacture, so long as the stimulus sensitive gel is not exposed to a predetermined stimulus, for example the stimulus sensitive gel is kept below a certain temperature, the stimulus sensitive gel will remain swollen. But when the stimulus sensitive gel is exposed to a stimulus that equals or exceeds its predetermined stimulus, for example a higher temperature, the swollen stimulus sensitive gel will undergo its phase transition and collapse or shrink. Alternatively, by keeping the temperature of the stimulus sensitive gel fixed during its manufacture, so long as the stimulus sensitive gel is not exposed to a predetermined stimulus, for example the swollen stimulus sensitive gel is kept at a constant salt concentration, the swollen stimulus sensitive gel will remain swollen. When the concentration surrounding the swollen stimulus sensitive gel changes to such a degree that it equals the predetermined stimulus for that swollen stimulus sensitive gel, for example, the concentration of the solution surrounding the swollen stimulus sensitive gel rises to a predetermined level, at that point the solution surrounding the swollen stimulus sensitive gel becomes such a poor solvent for the swollen stimulus sensitive gel that the swollen stimulus sensitive gel collapses or shrinks. This relationship between certain types of stimuli, such as salt concentration and transition temperature, is what allows for the control of the phase transition of the stimulus sensitive gel at its predetermined stimulus, by way of example only, its transition temperature.

One of the embodiments of this invention is a swollen stimulus sensitive gel 110 and 210 and 310 and 410 and 510 and 610 that goes through its phase transition at a predetermined level of stimulus. By way of example only, malaria vaccine spoils after exposure to a temperature greater than 8° C. Therefore, a swollen stimulus sensitive gel 110 and 210 and 310 and 410 and 510 and 610 used in conjunction with any embodiment of the stimulus indicating device 100 and 200 and 300 and 400 and 500 and 600 described herein, can be set to trigger at 8° C. or warmer. By way of example only, a PNIPAAm gel as the swollen stimulus sensitive gel 110 and 210 and 310 and 410 and 510 and 610 can be manufactured so that as the phase transition of the swollen stimulus sensitive gel 110 and 210 and 310 and 410 and 510 and 610, and therefore the expulsion of the expelled liquid 115 and 215 and 315 and 415 and 515 and 615 and the constituent parts 111 and 211 and 311 and 411 and 511 and 611 in the form of a salt solution, occurs at 8° C. As one of ordinary skill in the art can appreciate, the solution salt concentration that causes a swollen stimulus sensitive gel to trigger or undergo its phase transition at a predetermined level of stimulus, can be determined for any stimulus, and more particularly at any level of stimulus.

To determine the salt concentration that is needed to cause a given swollen stimulus sensitive gel to trigger or undergo its phase transition at a predetermined stimulus such as temperature, one needs to first start with gross variations of salt concentration then determine from those gross variations the level of stimulus that causes the swollen stimulus sensitive gel to trigger or go through its phase transition. Then by narrowing that variation of salt concentration and again noting the level of stimulus that caused the swollen stimulus sensitive gel to trigger or undergo its phase transition, the swollen stimulus sensitive gel with the proper or desired trigger or phase transition characteristics will become evident. Once the salt concentrations required to obtain gels that trigger at the desired transition temperatures are well established, this procedure needs not be repeated for all manufactured gels.

By way of illustration only, to determine the solution salt concentration required for a swollen stimulus sensitive gel to trigger at 8° C., similarly sized pieces of washed swollen stimulus sensitive gel are dried completely and immersed in sodium chloride solutions prepared with concentrations ranging from 0 molar to 4.0 molar, with the concentrations varying by 0.5 molar increments. By using similarly sized pieces of washed gels, the determination is much more reliable. Next all the similarly sized pieces of gel which were immersed in salt solutions prepared with concentrations ranging from 0 molar to 4.0 molar in 0.5 molar increments, are placed in a constant temperature environment (such as a constant temperature water bath) at 8° C. After some time it will be observed that all the swollen stimulus sensitive gels that were prepared in salt solutions with a concentration between 2.5 molar and 4.0 molar triggered and underwent their phase transition. But the swollen stimulus sensitive gels that were prepared in salt solutions with a concentration between 0 molar and 2.0 molar failed to trigger and undergo their phase transition. Accordingly, it is known that the desired salt concentration for a swollen stimulus sensitive gel that will trigger and undergo its phase transition at 8° C. lies between 2.0 molar and 2.5 molar sodium chloride.

Thus, the next round of similarly sized pieces of washed swollen stimulus sensitive gel are dried completely and immersed in sodium chloride solutions having concentration ranges of between 2.0 molar and 2.5 molar, wherein the sodium chloride solution concentrations were varied in 0.1 molar increments. Upon being exposed to the predetermined stimulus, for example a temperature of 8° C., it is observed that the swollen stimulus sensitive gels that were previously immersed in sodium chloride solutions containing concentrations ranging 2.1 molar through 2.5 molar triggered and underwent their respective phase transition. But the swollen stimulus sensitive gels that were prepared in salt solutions with a concentration of 2.0 molar failed to trigger and undergo its phase transition. Accordingly, it is known that the desired salt concentration for a swollen stimulus sensitive gel that will trigger and undergo its phase transition at 8° C. lies between 2.0 molar and 2.1 molar sodium chloride.

Thus, the next round of similarly sized pieces of washed swollen stimulus sensitive gel are dried completely and immersed in sodium chloride solutions having concentration ranges of between 2.0 molar and 2.1 molar, wherein the sodium chloride solution concentrations were varied in 0.02 molar increments. Upon being exposed to the predetermined stimulus, for example a temperature of 8° C., it is observed that the swollen stimulus sensitive gels that were previously immersed in sodium chloride solutions containing concentrations ranging 2.04 molar through 2.1 molar triggered and underwent their respective phase transition But the swollen stimulus sensitive gels that were prepared in salt solutions with a concentration of 2.0 through 2.02 molar failed to trigger and undergo its phase transition. Accordingly, it is known that the desired salt concentration for a swollen stimulus sensitive gel that will trigger and undergo its phase transition at 8° C. lies between 2.02 molar and 2.04 molar sodium chloride. At this point, it may not be necessary to determine with any more specificity the molar sodium chloride concentration necessary to cause the swollen stimulus sensitive gel to undergo its phase transition at 8° C., although following this method would allow such additional specificity.

3. Method to Dope the Gels with Constituent Parts

As discussed herein the swollen stimulus sensitive gel expels, among other things, constituent parts as it undergoes its phase transition in reaction to a predetermined stimulus. To ensure the color change occurs, the stimulus sensitive gel must be doped with constituent parts that are known to be reactive with and permanently bind to the color changing absorbent material. By way of example only, if cationic paper is selected as the color changing absorbent material, then the stimulus sensitive gel must be doped with cations, such as $Mg^{2+}$ or $Ca^{2+}$. Similarly, if litmus paper is selected as the color changing absorbent material, then the stimulus sensitive gel must be doped with ions, such as $H^+$.

In order to dope the gels with the constituent parts that will react with the color changing absorbent material, once the salt concentrations required to obtain gels that trigger at the desired transition temperatures are well established, this procedure needs not be repeated for all manufactured gels. Then washed swollen pieces of gel are completely dried and swollen in a solution containing both the necessary salt concentration to achieve the desired transition temperature and the constituent parts. That is, after washing the polymerized PNIPAAm-BIS gel with distilled and deionized water as discussed above, the swollen stimulus sensitive gel is completely dried, and then soaked overnight in a solution containing 30 mM $MgCl_2$ and the required salt concentration for the desired transition temperature. For example, if the stimulus indicating device was to trigger and have the color changing absorbent material change from a first color to a second color upon exposure to a temperature of about 8° C. or warmer, the required salt concentration would be between 2.02 molar and 2.04 molar sodium chloride, as described herein. Then the swollen, doped and stimulus sensitive gel is removed from the doping solution and is patted dry with Kimwipes tissue. In this way the doped, swollen stimulus sensitive gel contains the constituent parts (e.g., $Mg^{2+}$) that will be expelled from the swollen stimulus sensitive gel and react with the color changing absorbent material (e.g., cationic paper) once the swollen stimulus sensitive gel undergoes its phase transition upon being exposed to a predetermined stimulus, thereby causing the color changing absorbent material to change from a first color to a second color. Alternatively, the swollen stimulus sensitive gel can be doped with $H^+$ by completely drying the stimulus sensitive gel and submerging and soaking the stimulus sensitive gel overnight in a pH 10 solution containing the required salt concentration for the desired transition temperature. Then the swollen and doped stimulus sensitive gel is removed from the doping solution and is patted dry with Kimwipes tissue. In this way the doped, swollen stimulus sensitive gel contains the constituent parts (e.g., $H^+$) that will react with the color changing absorbent material (e.g., litmus paper) once the swollen stimulus sensitive gel undergoes its phase transition upon being exposed to a predetermined stimulus.

We claim:

1. A stimulus indicating device comprising:
   a first compartment;
   a stimulus sensitive gel contained in said first compartment that is capable of contracting in volume in response to exposure to a predetermined stimulus;
   at least one of several constituent parts contained in said stimulus sensitive gel that is capable of being expelled from said stimulus sensitive gel into said first compartment when said stimulus sensitive gel contracts in volume in response to exposure to a predetermined stimulus;
   an indication changing absorbent material contained in said first compartment that is capable of permanently changing from a first indication to a second indication upon coming into contact with and reacting with said at least one of several constituent parts expelled from said stimulus sensitive gel; and
   an indicator window positioned above said first compartment and positioned above said indication changing absorbent material, through which said indication changing absorbent material in said first compartment can be viewed.

2. The stimulus-indicating device as claimed in claim 1 wherein said stimulus sensitive gel is attached to an at least one attachment point.

3. A stimulus indicating device according to claim 1, further comprising:
   a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus;

wherein said stimulus sensitive gel is attached to an at least one attachment point.

4. The stimulus indicating device as claimed in claim 3, wherein said liquid that is expelled is water.

5. The stimulus indicating device of claim 1,
wherein the permanent absorption of said at least one of several constituent parts by said indication changing absorbent material is capable of causing the indication of exposure of the stimulus indicating device to a predetermined stimulus visible through said indicator window to be a permanent indication.

6. A stimulus-indicating device comprising:
a stimulus sensitive gel that is capable of changing volume in response to exposure to a predetermined stimulus;
a first compartment containing said stimulus sensitive gel;
a second compartment separated from said first compartment by a membrane;
at least one constituent part, contained within said stimulus sensitive gel, that is capable of being expelled from said stimulus sensitive gel when said stimulus sensitive gel changes volume in response to exposure to a predetermined stimulus, and that is capable of passing from said first compartment through said membrane and into said second compartment; and
an indication changing absorbent material contained in said second compartment that is capable of permanently reacting with said at least one constituent part so as to permanently change from a first indication to a second indication upon coming into contact with and reacting with said at least one constituent part; and
an indicator window positioned above said second compartment and positioned above said indication changing absorbent material that is capable of allowing said indication changing absorbent material to be viewed.

7. A stimulus indicating device according to claim 6 further comprising:
a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus,
wherein said stimulus sensitive gel is attached to at least one attachment point.

8. The stimulus indicating device as claimed in claim 7, wherein said liquid that is expelled is water.

9. A stimulus indicating device comprising:
a stimulus sensitive gel that is capable of changing volume in response to exposure to a predetermined stimulus;
a first compartment containing said stimulus sensitive gel;
a second compartment connected to said first compartment via a nozzle portion;
at least one constituent part contained within said stimulus sensitive gel that is capable of being expelled from said stimulus sensitive gel when said stimulus sensitive gel changes volume in response to exposure to a predetermined stimulus, and that is capable of passing from said first compartment through said nozzle portion and into said second compartment;
an indication changing absorbent material contained in said second compartment that is capable of permanently changing indication from a first indication to a second indication upon coming into contact with and reacting with said at least one constituent part upon it being expelled from said stimulus sensitive gel; and
an indicator window positioned above said second compartment and positioned above said indication changing absorbent material, to allow said indication changing absorbent material to be viewed.

10. A stimulus indicating device according to claim 9 further comprising:
a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus,
wherein said stimulus sensitive gel is attached to at least one attachment point.

11. A stimulus indicating device comprising:
at least a first compartment;
a stimulus sensitive gel that is capable of changing volume in response to exposure to a predetermined stimulus, that is positioned in said at least first compartment that is capable of reacting to a predetermined stimulus;
at least one constituent part contained in said stimulus sensitive gel that is capable of being expelled from said stimulus sensitive gel when said stimulus sensitive gel changes volume in response to exposure to a predetermined stimulus;
a semi-permeable membrane also positioned in said at least first compartment that is capable of acting as a color changing absorbent material in that it is capable of permanently reacting to and permanently binding with said at least one constituent part; and
an indicator window positioned above said semi-permeable membrane, through which a permanent color change can be seen in said semi-permeable membrane when said semi-permeable membrane permanently reacts with said at least one constituent part expelled from said stimulus sensitive gel.

12. A stimulus indicating device according to claim 11, further comprising:
a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus,
wherein said stimulus sensitive gel is attached to at least one attachment point.

13. A stimulus indicating device comprising:
a first compartment;
a stimulus sensitive gel that is capable of changing a predetermined amount of volume in a predetermined period of time in response to exposure to a predetermined stimulus contained in said first compartment;
a second compartment connected to said first compartment via a connecting portion;
at least one constituent part contained within said stimulus sensitive gel that is capable of being expelled from said stimulus sensitive gel when said stimulus sensitive gel changes volume in response to exposure to a predetermined stimulus, and that is capable of passing from said first compartment through said connecting portion and into said second compartment;
an indication changing absorbent material contained in said second compartment that is capable of permanently changing indication from a first indication to a second indication upon coming into contact with and reacting with said at least one constituent part upon it being expelled from said stimulus sensitive gel; and an indicator window positioned above said second compartment and positioned above said indication changing absorbent material, to allow said indication changing absorbent material to be viewed.

14. The stimulus indicating device according to claim 13, further comprising:

said connecting portion is a nozzle portion; and a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus, and that is capable of carrying at least one of several constituent parts into said second compartment, wherein said stimulus sensitive gel is attached to at least one attachment point.

15. The stimulus indicating device according to claim 13, further comprising:

said connecting portion is a permeable membrane portion; and a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus, and that is capable of carrying at least one of several constituent parts into said second compartment, wherein said stimulus sensitive gel is attached to at least one attachment point.

16. The stimulus indicating device according to claim 13, further comprising:

said connecting portion is a semi-permeable membrane portion; and a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to the predetermined stimulus, and that is capable of carrying at least one of several constituent parts into said second compartment, wherein said stimulus sensitive gel is attached to at least one attachment point.

17. The stimulus indicating device according to claim 13, further comprising:

said connecting portion is at least one capillary tube; and wherein said stimulus sensitive gel is attached to at least one attachment point.

18. A stimulus indicating device comprising:

a first compartment;

a stimulus sensitive gel contained in said first compartment that is capable of contracting in volume in response to exposure to a predetermined stimulus;

at least one of several constituent parts contained in said stimulus sensitive gel that is capable of being expelled from said stimulus sensitive gel into said first compartment when said stimulus sensitive gel contracts in volume in response to exposure to a predetermined stimulus;

a color changing absorbent material contained in said first compartment that is capable of permanently changing from a first color to a second color upon coming into contact with and reacting with said at least one of several constituent parts expelled from said stimulus sensitive gel; and an indicator window positioned above said first compartment and positioned above said color changing absorbent material, through which said color changing absorbent material in said first compartment can be viewed.

19. The stimulus indicating device of claim 18, wherein the permanent color change from a first color to a second color that occurs in said color changing absorbent material is capable of providing a permanent indication of exposure of the stimulus indicating device to a predetermined stimulus that is capable of being viewed through said indicator window.

20. The stimulus indicating device of claim 19, wherein said stimulus sensitive gel is attached to at least one attachment point.

21. The stimulus indicating device of claim 20, wherein the permanent color change from a first color to a second color that occurs in said color changing absorbent material is capable of providing a permanent indication of exposure of the stimulus indicating device to a predetermined stimulus can be viewed through said indicator window.

22. The stimulus indicating device of claim 18, further comprising:

a liquid contained in said stimulus sensitive gel that is capable of being expelled from said stimulus sensitive gel and that is capable of carrying said at least one of several constituent parts out of said stimulus sensitive gel when said stimulus sensitive gel changes volume in response to exposure to a predetermined stimulus, wherein said stimulus sensitive gel is attached to at least one attachment point.

\* \* \* \* \*